March 18, 1952 W. F. GLASER ET AL 2,589,242
ELEVATOR DISPATCHING AND CONTROL SYSTEM
Filed April 12, 1950 22 Sheets-Sheet 1

INVENTORS
William Frank Glaser
Stephen Anthony Hornung
BY Lou H. Emrick ATTORNEY March 18, 1952  W. F. GLASER ET AL  2,589,242
ELEVATOR DISPATCHING AND CONTROL SYSTEM
Filed April 12, 1950  22 Sheets-Sheet 2

William Frank Glaser
Stephen Anthony Hornung } INVENTORS
BY Leon H. Emmick ATTORNEY March 18, 1952 W. F. GLASER ET AL 2,589,242
ELEVATOR DISPATCHING AND CONTROL SYSTEM
Filed April 12, 1950 22 Sheets-Sheet 3

William Frank Glaser
Stephen Anthony Hornung } INVENTORS
BY Leon H. Emrick ATTORNEY March 18, 1952     W. F. GLASER ET AL     2,589,242
ELEVATOR DISPATCHING AND CONTROL SYSTEM
Filed April 12, 1950     22 Sheets-Sheet 5

William Frank Glaser
Stephen Anthony Hornung } INVENTORS

BY Leon H. Emmick ATTORNEY

March 18, 1952 — W. F. GLASER ET AL — 2,589,242
ELEVATOR DISPATCHING AND CONTROL SYSTEM
Filed April 12, 1950 — 22 Sheets-Sheet 7

William Frank Glaser
Stephen Anthony Hornung } INVENTORS
BY Leon H. Emrick ATTORNEY March 18, 1952    W. F. GLASER ET AL    2,589,242
ELEVATOR DISPATCHING AND CONTROL SYSTEM
Filed April 12, 1950                 22 Sheets-Sheet 8

William Frank Glaser
Stephen Anthony Horning } INVENTORS
BY     ATTORNEY

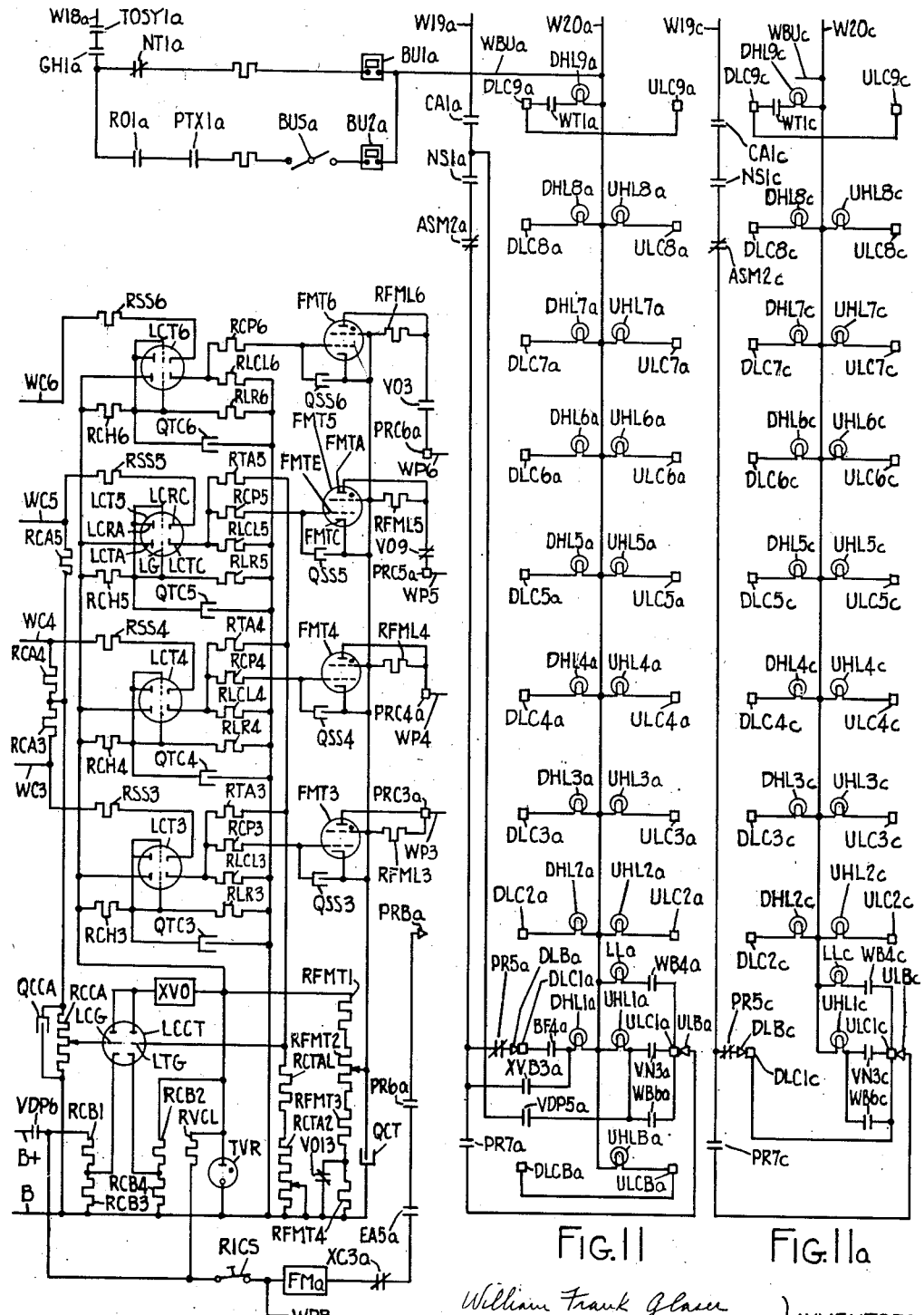

March 18, 1952 W. F. GLASER ET AL 2,589,242
ELEVATOR DISPATCHING AND CONTROL SYSTEM
Filed April 12, 1950 22 Sheets-Sheet 12

William Frank Glaser
Stephen Anthony Hornung } INVENTORS

BY *Leon H. Emrick* ATTORNEY

March 18, 1952 W. F. GLASER ET AL 2,589,242
ELEVATOR DISPATCHING AND CONTROL SYSTEM
Filed April 12, 1950 22 Sheets-Sheet 13

March 18, 1952 — W. F. GLASER ET AL — 2,589,242
ELEVATOR DISPATCHING AND CONTROL SYSTEM
Filed April 12, 1950 — 22 Sheets-Sheet 15

March 18, 1952 W. F. GLASER ET AL 2,589,242
ELEVATOR DISPATCHING AND CONTROL SYSTEM
Filed April 12, 1950 22 Sheets-Sheet 18

FIG. 16e

INVENTORS
William Frank Glaser
Stephen Anthony Hornung
BY ATTORNEY

FIG. 16f

March 18, 1952 W. F. GLASER ET AL 2,589,242
ELEVATOR DISPATCHING AND CONTROL SYSTEM
Filed April 12, 1950 22 Sheets-Sheet 21

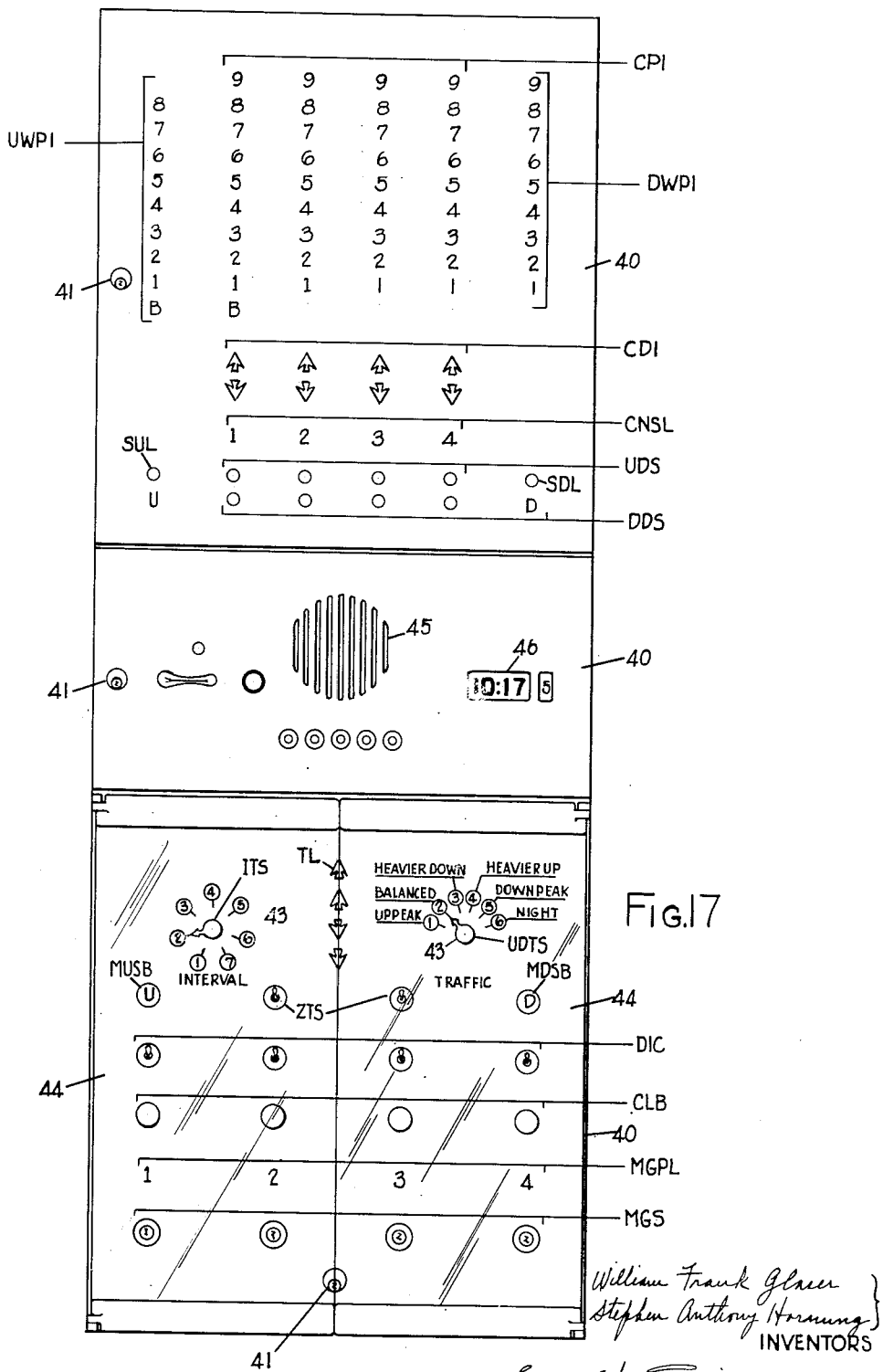

Patented Mar. 18, 1952

2,589,242

UNITED STATES PATENT OFFICE 2,589,242

ELEVATOR DISPATCHING AND CONTROL SYSTEM

William Frank Glaser, Eastchester, and Stephen Anthony Hornung, New York, N. Y., assignors to Otis Elevator Company, New York, N. Y., a corporation of New Jersey Application April 12, 1950, Serial No. 155,462

94 Claims. (Cl. 187—29)

The invention relates to dispatching and control systems for elevators.

The invention is applicable to elevator systems in which the starting of the cars is under the control of attendants in the cars and to systems in which the cars are operated without attendants in which case the starting of the cars is automatic. When operated with attendants, the cars are dispatched by signalling the attendants. When operated without attendants, the cars are dispatched by automatically starting the cars. Certain features of the invention are applicable to both "with attendant" operation and "without attendant" operation while other features are especially applicable to but one of these operations. The invention is especially applicable to installations in which the cars are stopped at the landings in response to calls registered from within the cars and from the landings and the invention will be described as applied to such an installation.

There are certain advantages in systems in which the cars are operated with attendants and there are advantages in systems in which the cars are operated without attendants. In some installations it is desirable under certain conditions to provide attendant operation and under other conditions to operate without attendants. The dispatching and control system of the present invention will be described as applied to an installation in which either type of operation may be provided.

The system is arranged so that it may be set for different traffic conditions. These are up peak conditions where substantially all of the traffic is in the up direction as when the building is being filled, down peak conditions where substantially all of the traffic is in the down direction as when the building is being emptied, and interim periods where there is traffic in both directions which may be approximately equal or predominant in one or the other direction. Under up and down traffic conditions, the dispatching of the cars in both directions is initiated at regular intervals of time by timing mechanism. Under up peak traffic conditions, the dispatching of the cars in the up direction is initiated by the timing mechanism and the cars are dispatched in the down direction immediately after answering their highest calls. Under down peak traffic conditions, dispatching of the cars in the down direction is initiated by the timing mechanism and the cars are dispatched in the up direction when they reach the bottom terminal. The cars are selected in advance for dispatching when the dispatching is initiated by timing mechanism.

In dispatching the cars in the up direction under up peak traffic conditions, the timing interval is started from the time of departure of the preceding car. If two cars are at the bottom terminal at the expiration of the timing interval, the selected car is dispatched immediately. If not, the selected car is not dispatched until the expiration of a further given timing interval or the arrival of another car, whichever occurs first. If after the departure of the preceding car no car arrives at the bottom terminal at the expiration of the timing interval plus this further interval, the next car to arrive is dispatched immediately.

In dispatching the cars in the down direction under down peak traffic conditions, so long as the down traffic does not become excessive, the cars are assigned to all floors. When the down traffic at certain floors becomes excessive, the system is automatically switched over to "zone return" operation in which certain cars are assigned to a low zone and other cars are assigned to a high zone. If a low zone car be on an up trip in the high zone at the time of switch-over, it is stopped at the next floor and started on its downward trip. The low zone cars serve down traffic in the low zone and the high zone cars serve down traffic in the high zone and, if they have room, also serve down traffic in the low zone to help out the low zone cars. In the preferred arrangement, the high zone cars serve all up traffic. When traffic at such certain floors subsides, the system is restored to the condition where all cars serve all floors. It is also preferred under down peak conditions to have the cars which handle all up traffic during "zone return" operation, do so also when not on "zone return" operation.

The hall lantern for the direction in which a car is to be dispatched is lighted when the car is selected for dispatching and is extinguished as the car is dispatched. When a car is late in arriving at the bottom terminal under up and down traffic conditions or up peak traffic conditions, its up hall lantern is maintained lighted for a sufficient time interval to properly advise the incoming passengers.

Basement service may be provided by one of the cars. If the car while under dispatching is selected at the bottom terminal, a trip to the basement is prevented. However, the previous registration of a basement car call and on "without attendant" operation of a basement landing call or down landing call at the bottom terminal prevents the selection of the car and enables the car to travel to the basement.

As each stop is made the doors open automatically. When operating with attendants, the attendant effects the closing of the doors incident to the starting operation by operating a starting switch in the car. When operating without attendants, the doors close automatically after a time delay and the car starts as the doors reach closed position. When the dispatching of the cars from a terminal on "without attendant" operation is subject to the timing mechanism, the door closing operation at that terminal is also dependent on the timing mechanism. If the dispatching timing interval has expired when a car arrives at the terminal, the doors are closed upon expiration of the time delay. When the cars are being time dispatched from the top terminal, if the dispatching timing interval has not expired when a car arrives at that terminal, the doors are retained in open position until the timing interval does expire. When the cars are being time dispatched from the bottom terminal, if the dispatching timing interval has not expired when a car arrives at that terminal and the car is selected immediately for dispatching, the doors are retained in open position until the timing interval expires. If the car is not selected, the doors close automatically upon expiration of the time delay. As soon as the car is selected, the doors automatically reopen and remain so until the expiration of the dispatching timing interval. A door close button is provided in each car to effect the closing of the doors before the expiration of the time delay. This button is not effective at the bottom terminal and may not be at the top terminal.

When operating without attendants, a soft buzzer is sounded in the car at the initiation of the door closing operation and if the closing operation is delayed for a considerable period, a harsh buzzer is sounded. A position indicator is provided for each car at the starter's station. When a car is being held up, its position indicator light for the floor at which the car is positioned is caused to flicker to advise the starter of this condition. When a car is unduly held up it is automatically removed from the dispatching system until the condition is corrected.

The mode of carrying out the invention which is at present preferred and various features and advantages thereof will be gained from the above statements and from the following description and appended claims.

Figures 7, 8:
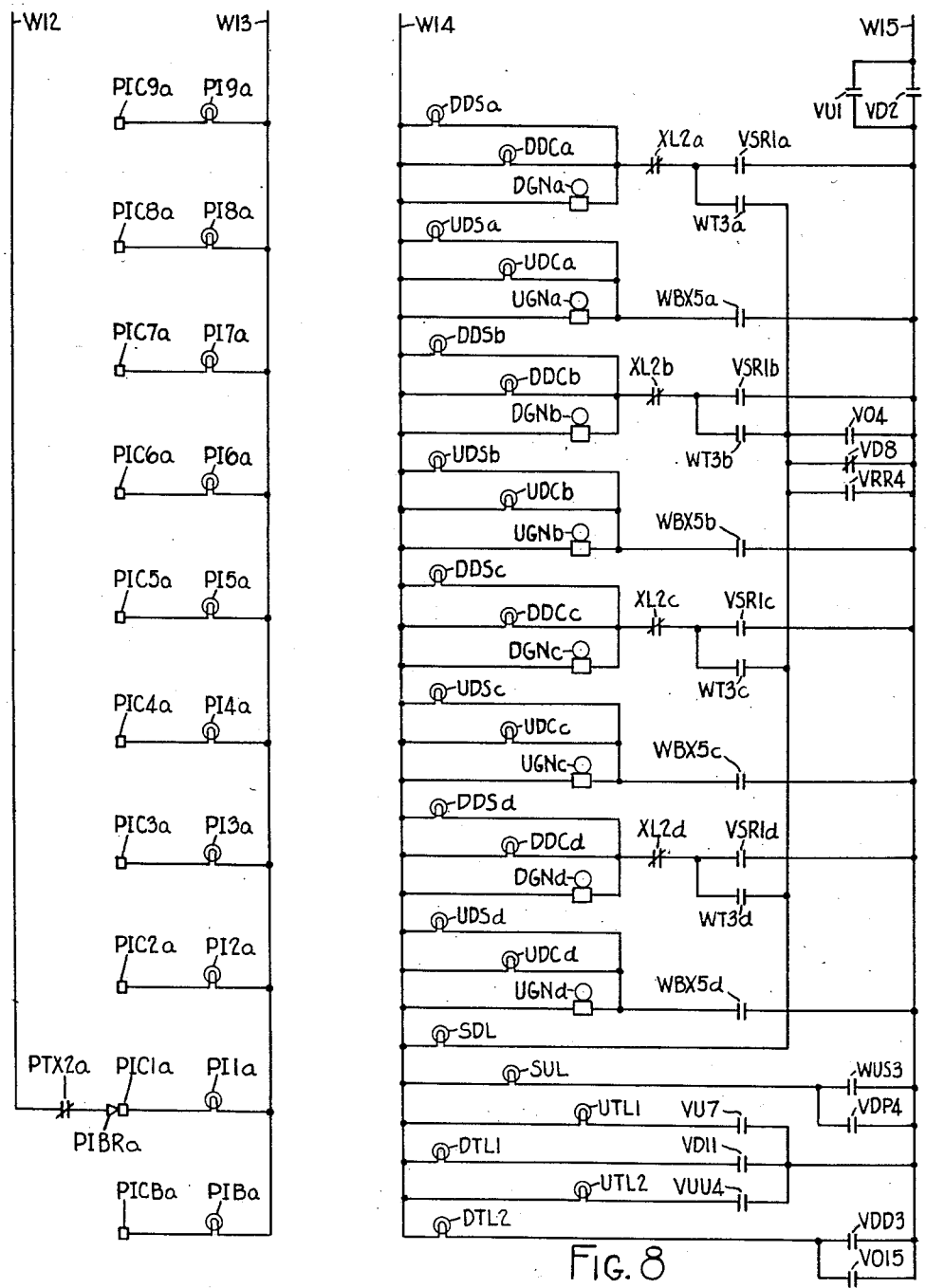
Figure 9:
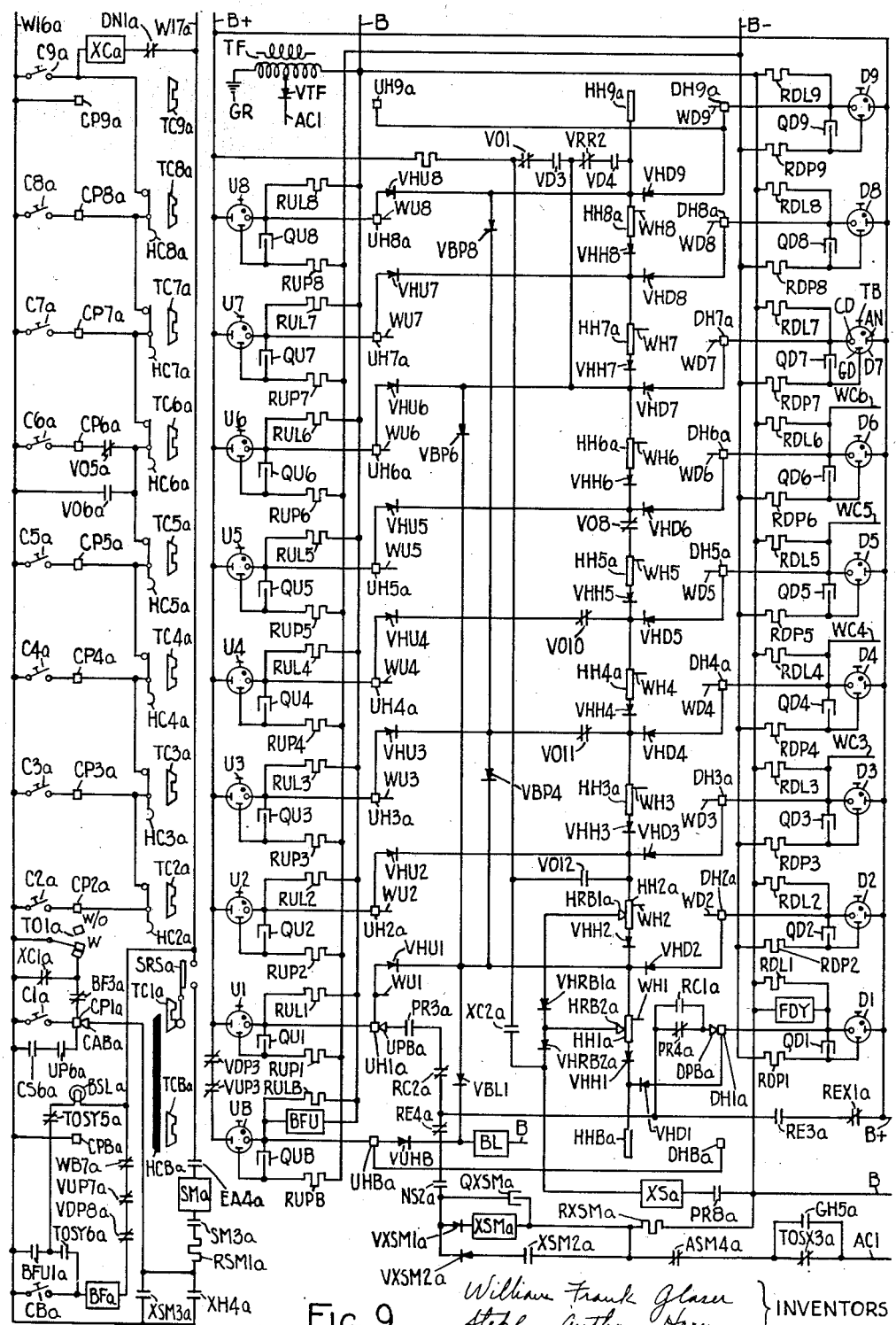
Figure 9A:
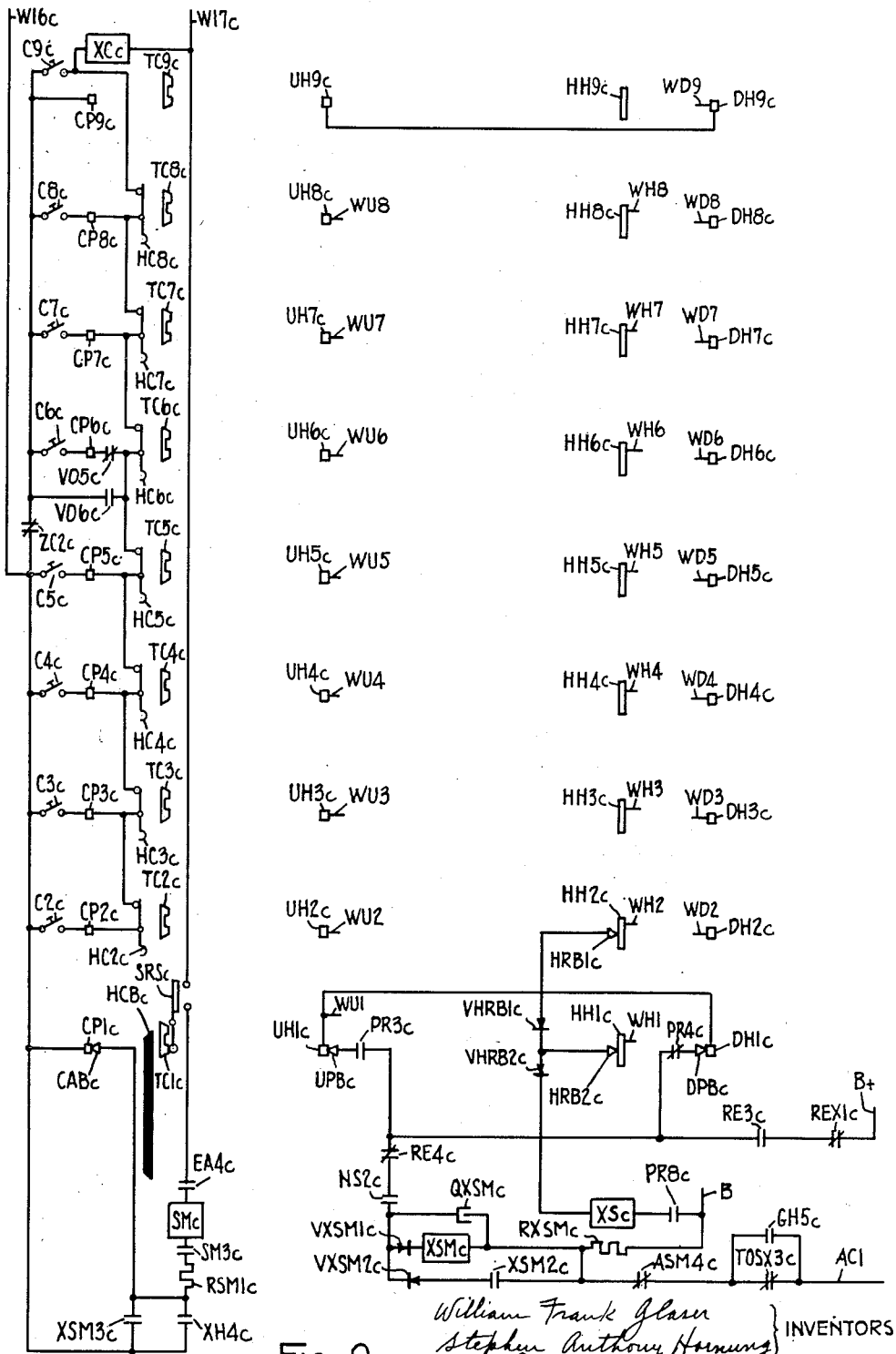
Figure 12:
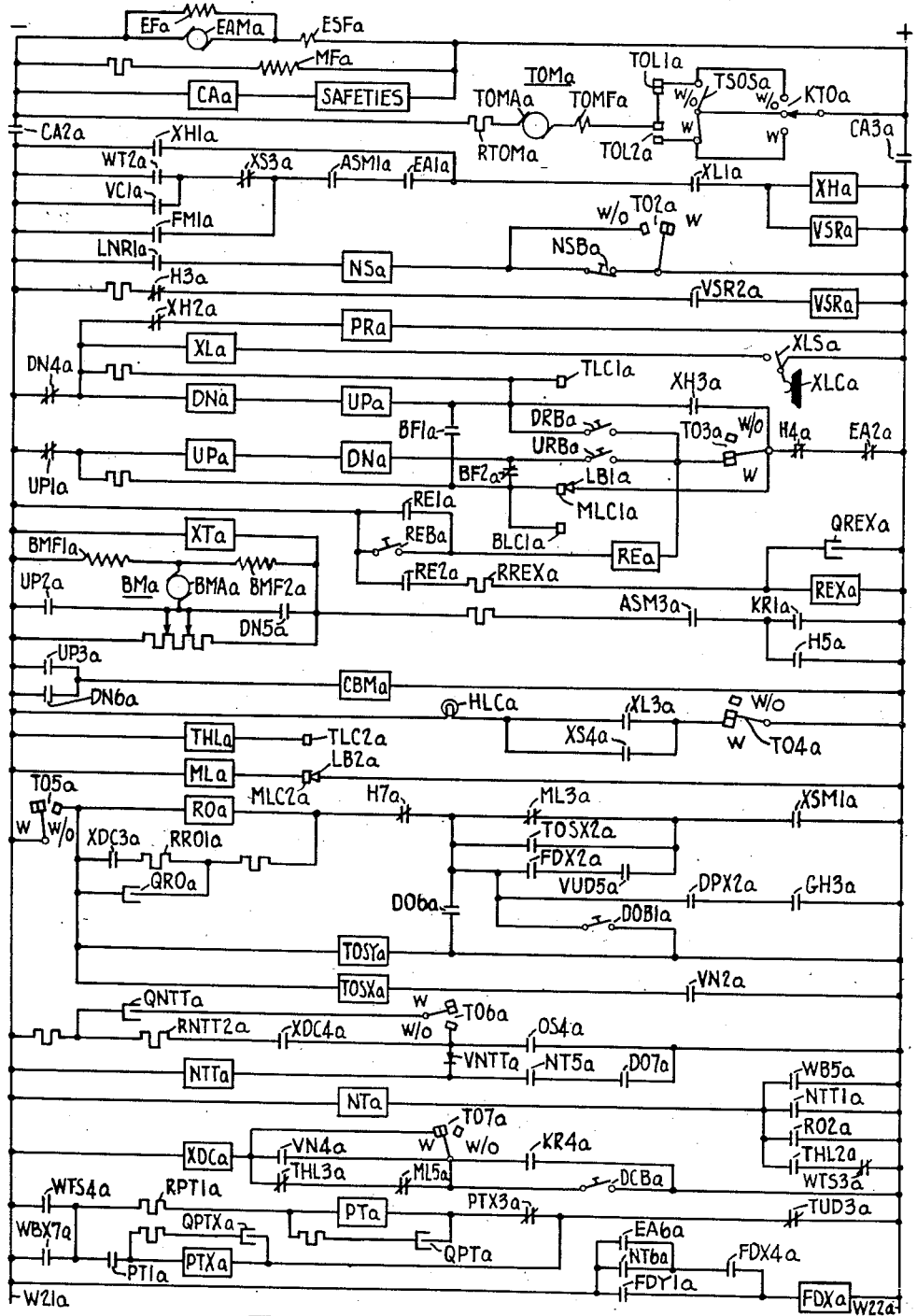
Figure 14:
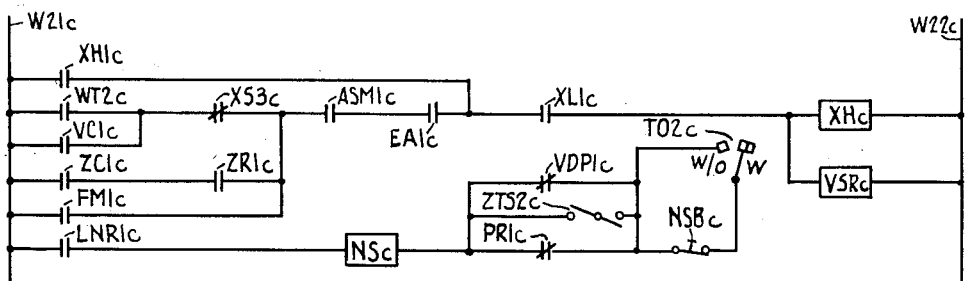

Figures 3, 4, 5, 6 and 8 taken together constitute a simplified schematic wiring diagram of dispatching circuits for a four elevator installation;

Figure 7 is a simplified schematic wiring diagram showing position indicator circuits for one of the elevators;

Figures 9, 10, 12, 13 and 15 taken together constitute a simplified schematic wiring diagram of power and control circuits for one of the elevators, certain circuits being common to the elevators;

Figure 9a is a simplified schematic wiring diagram of the control circuit for another of the elevators, corresponding to those of Figure 9;

Figure 11 is a simplified schematic wiring diagram of the hall lantern circuits for one of the elevators;

Figure 11a is a simplified schematic wiring diagram of the hall lantern circuits for another of the elevators;

Figure 14 is a simplified schematic wiring diagram of a portion of the control circuits for another of the elevators, replacing certain of the control circuits of Figure 12;

Figures 16a to 16h are key sheets for Figures 3, 4, 5, 6, 7, 8, 9, 9a, 10, 11, 11a, 12, 13, 14 and 15, showing the electromagnetic switches in spindle form; and Figure 17 is a front view of the starter's panel for a four car elevator installation.

Figure 1:
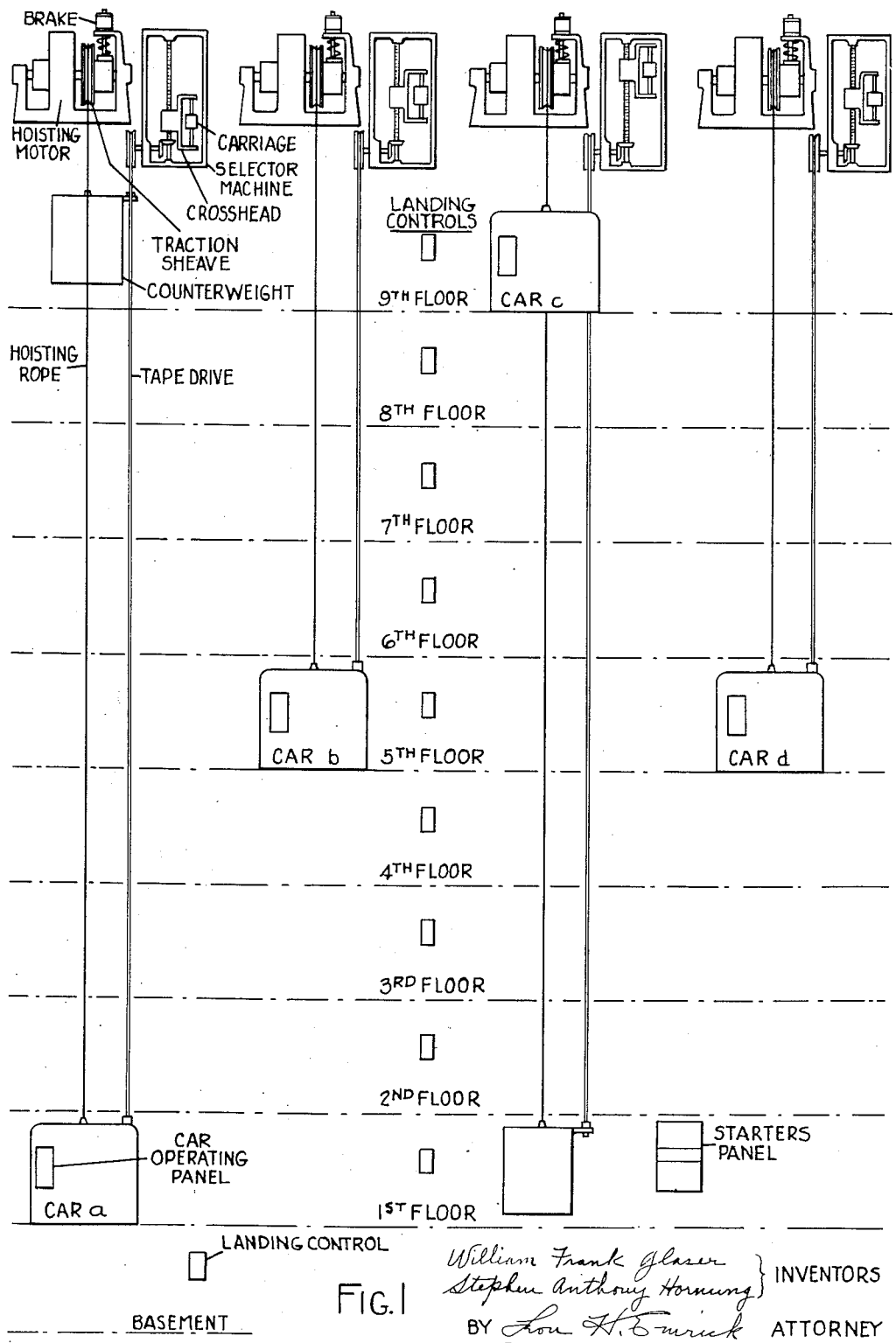
Figure 1 is a schematic diagram of an elevator installation illustrating relative positions of the cars, four cars being illustrated.

For a general understanding of the invention reference may be had to Figure 1, wherein various parts of the system chosen to illustrate the principles of the invention are indicated by legend. The arrangement is the same for each elevator. Each car is raised and lowered by means of a hoisting motor, which motor drives a traction sheave over which pass hoisting ropes for the car and counterweight. An electromagnetic brake is provided and is applied to effect the final stopping operation and to hold the car when at rest.

Each elevator car is provided with a car operating panel on which are located a plurality of control switches, certain of them for operation by the car attendant on "with attendant" operation and certain of them including some of those effective for "with attendant" operation for operation by the passengers themselves on "without attendant" operation. A cover may be provided for the switches not being used on "without attendant" operation. Also a panel having duplicate switches for "without attendant" operation may be provided in the rear of the car. These switches include among others a start control button for "with attendant" operation and a plurality of push buttons, one for each floor above the lower terminal, hereinafter termed car buttons, for registering car calls for both "with attendant" operation and "without attendant" operation. These buttons are individual to the elevators and are shown for one elevator in the wiring diagrams of Figures 9 and 13. Other switches on the operating panel will be referred to later.

Controls are provided at the floors to enable intending passengers to register landing calls, an up control and a down control being provided at each intermediate floor and the lower terminal floor and one control at the top terminal floor and the basement. These call registering controls, which will hereinafter be termed landing buttons, are common to the cars and are shown in Figure 9.

Figure 13:
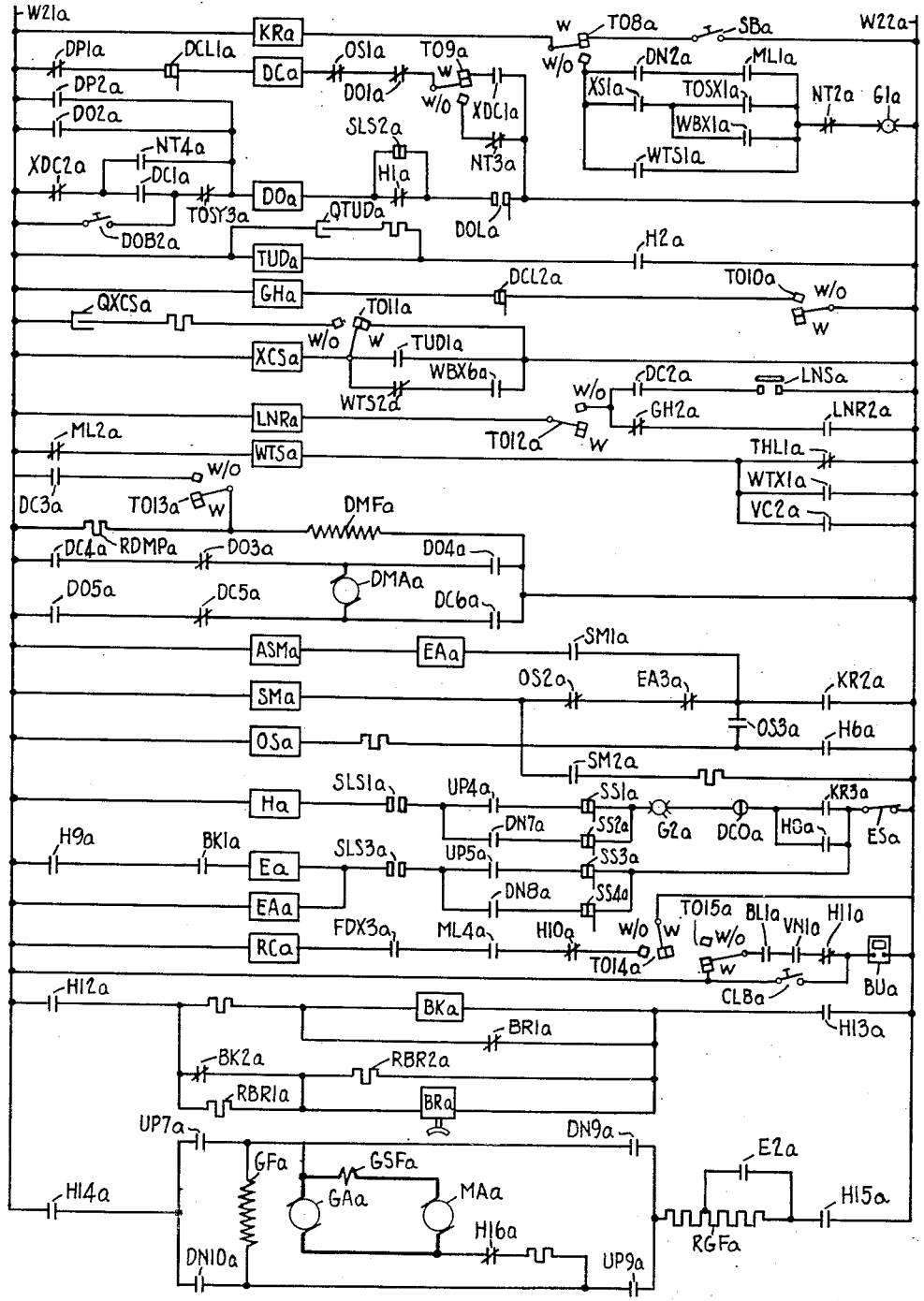
Figure 15:
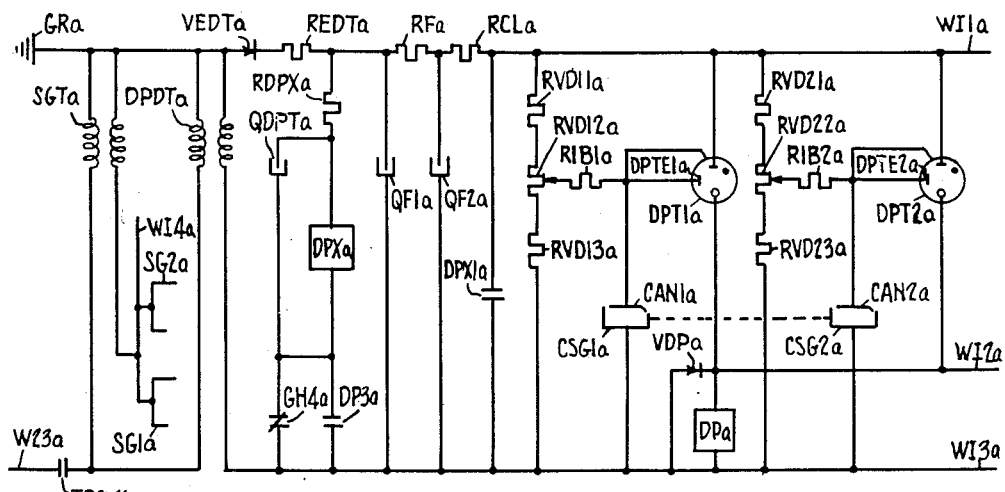
Figure 16A:
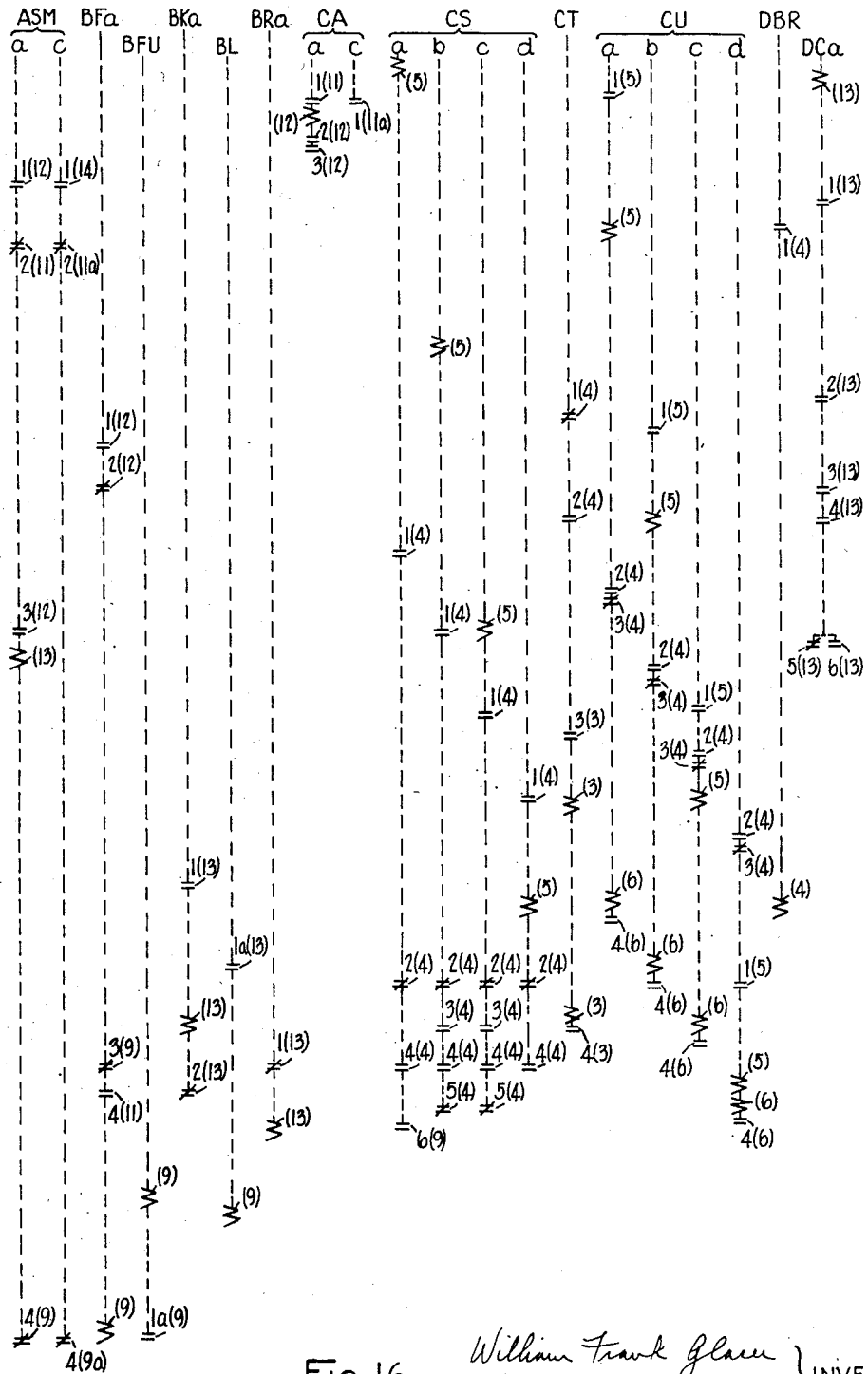
Figure 16B:
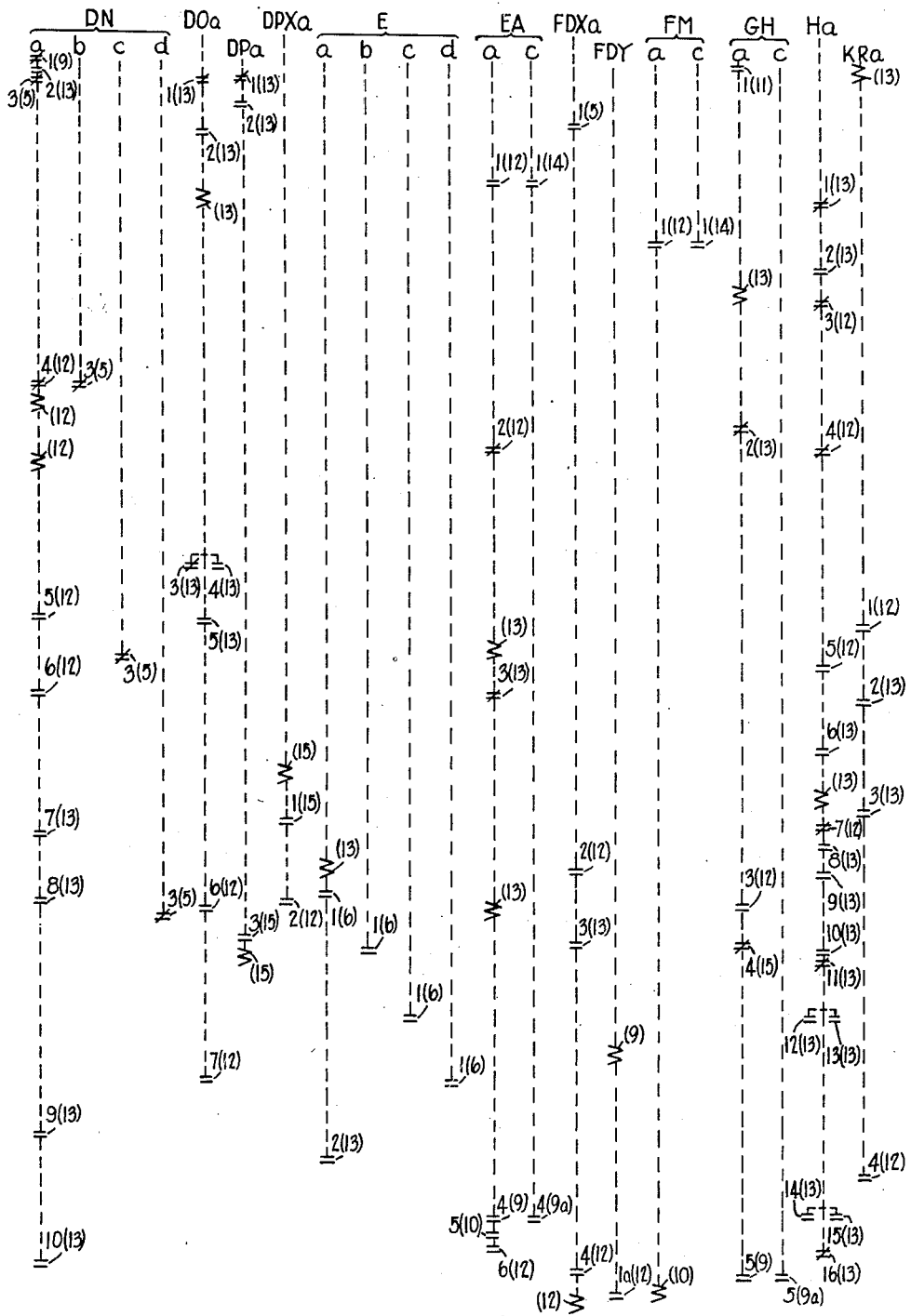
Figure 16C:
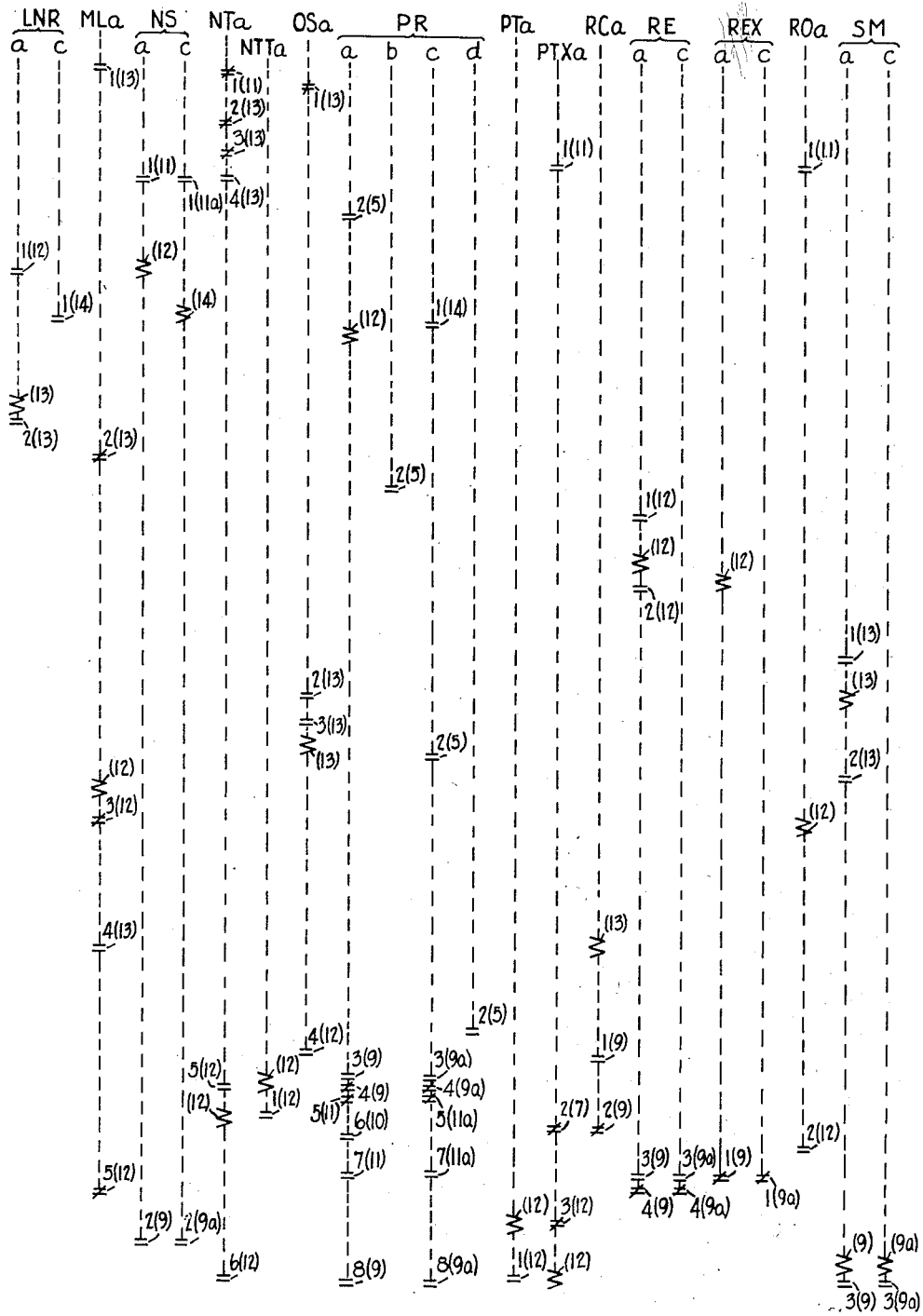
Figure 16D:
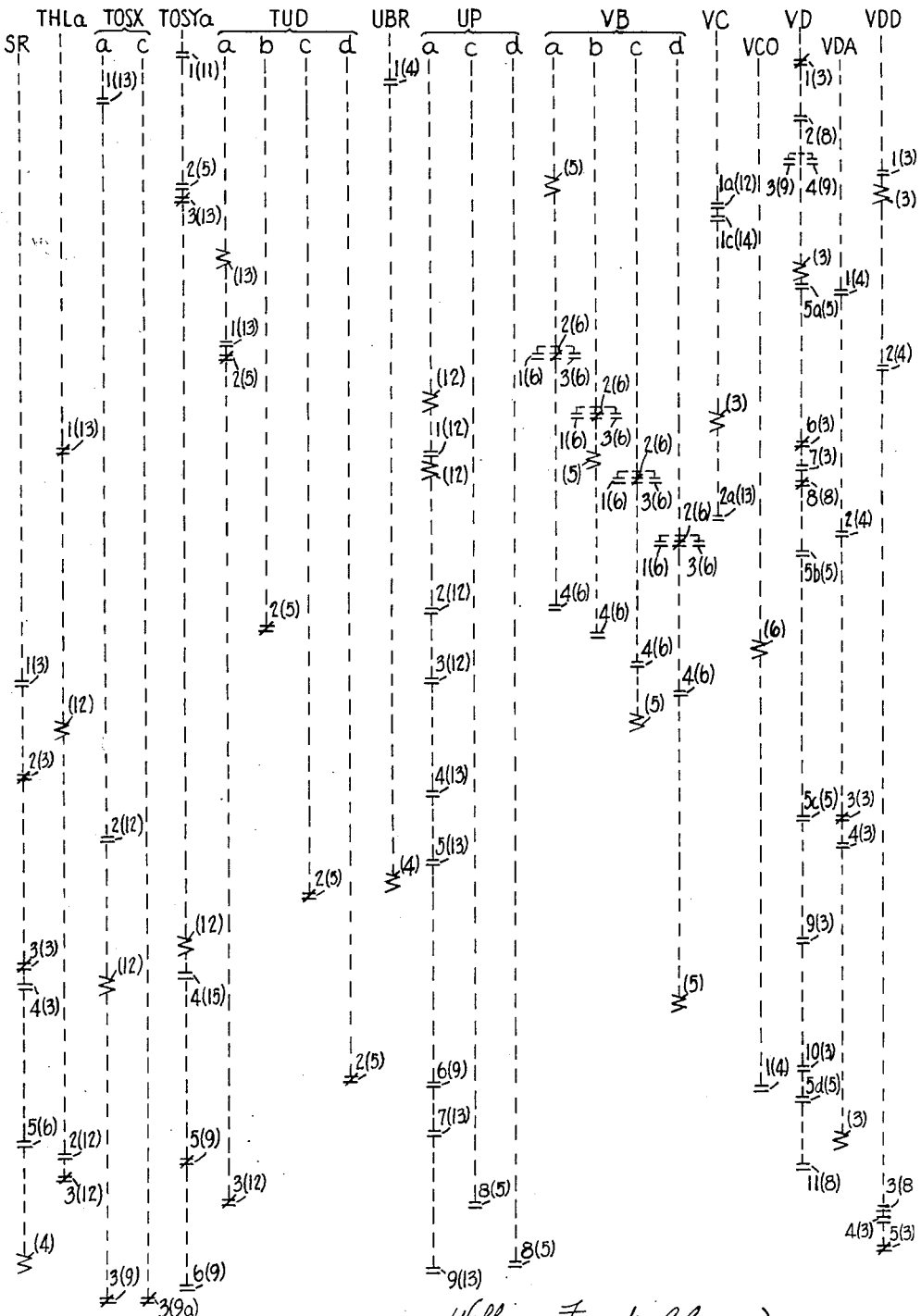
Figure 16G:
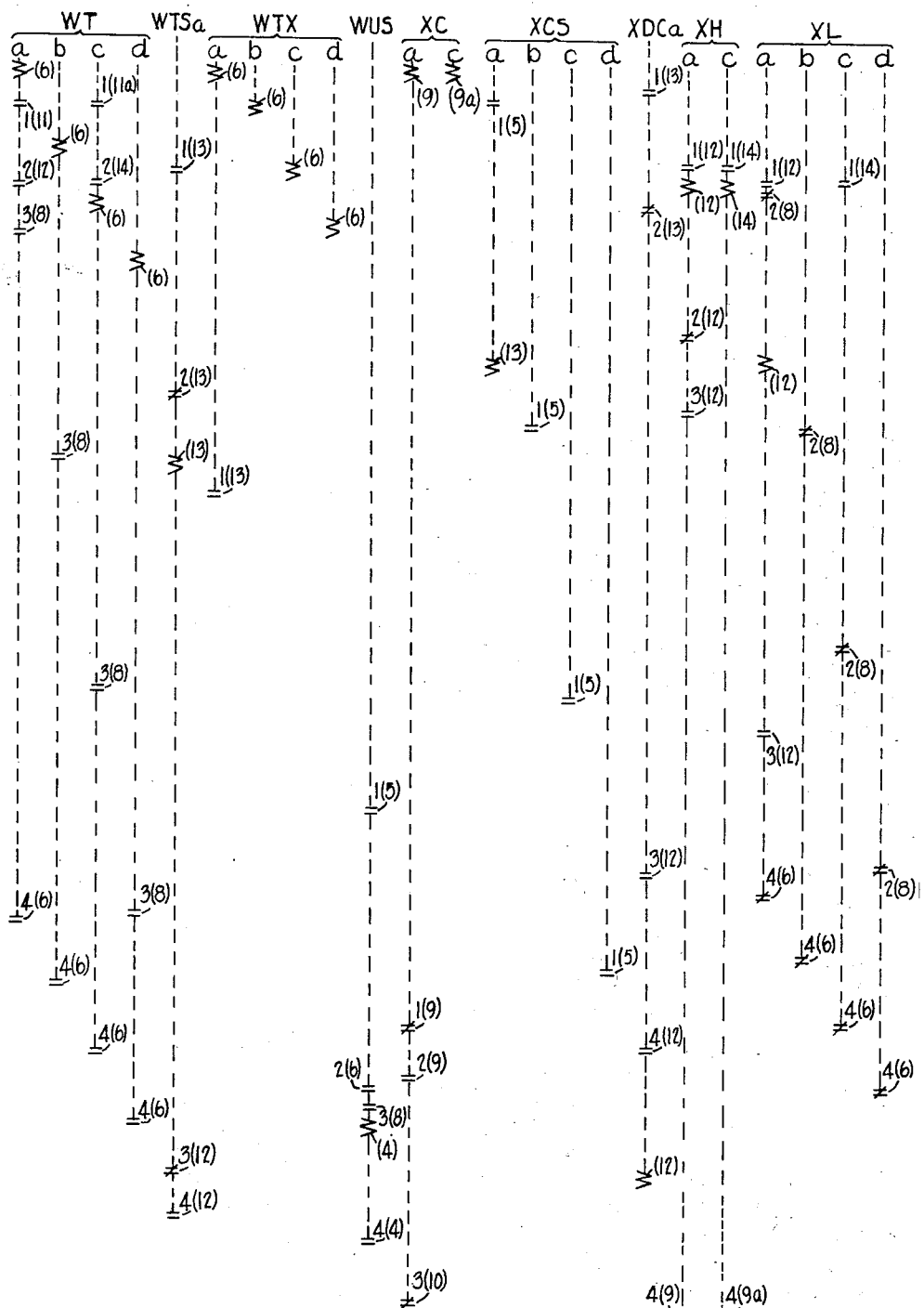
Figure 16H:
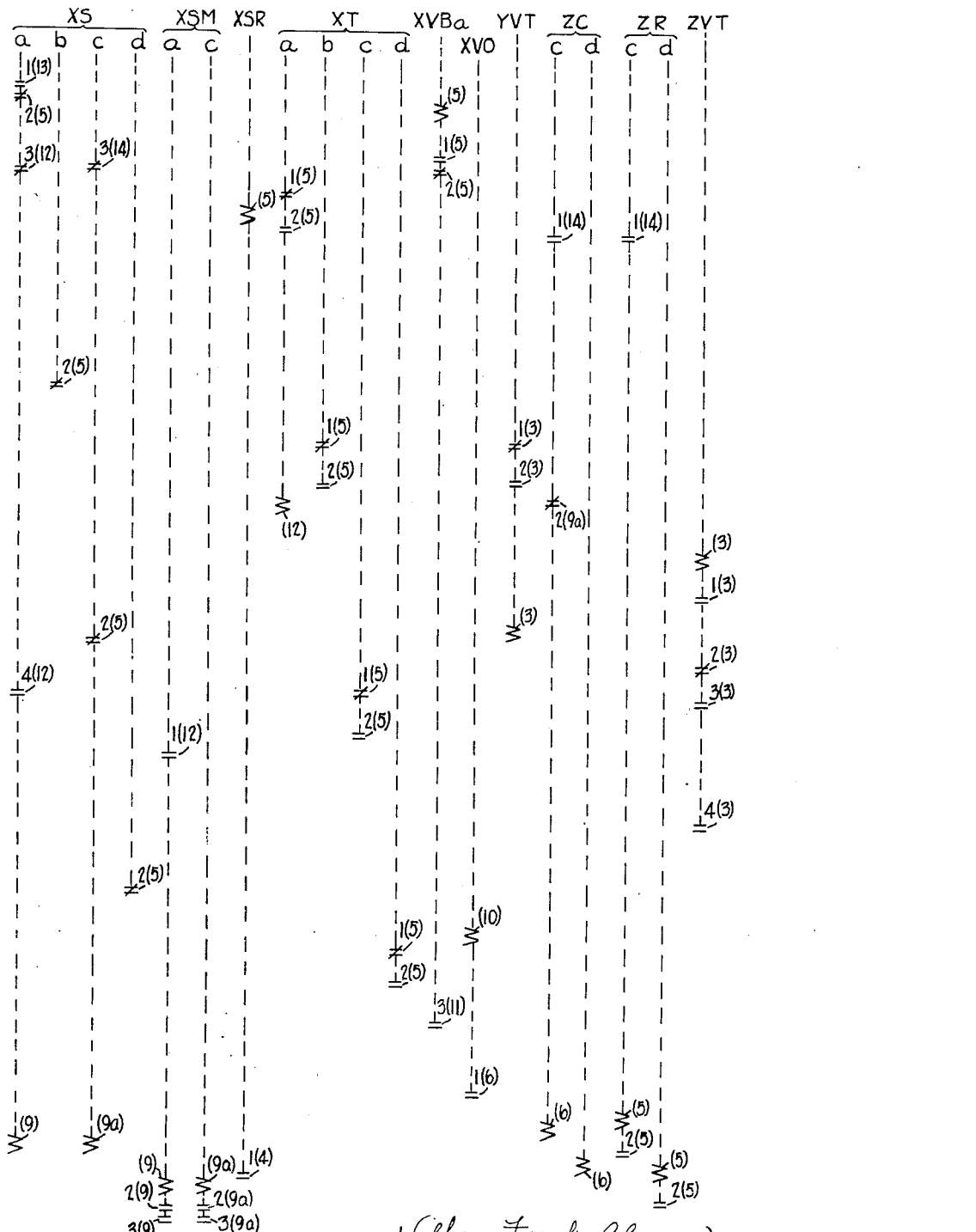

Referring to the wiring diagrams, Figures 3, 4, 5, 6 and 8 show principally the dispatching circuits, these circuits being for four elevators but, as will be seen, corresponding circuits are provided for other elevators. Various manually operable switches, signals and indicating devices in the circuits of these figures are on a panel at the starter's station, usually at the lower terminal floor. This panel will hereinafter be termed "Starter's Panel" and is indicated in Figure 1 and shown in detail in Figure 17. It will be described later. The circuits of Figures 3, 4, 5 and 6 are joined by the vertical feed lines W10 and W11 and in the case of Figures 3 and 4 also by wire W11VO. Figure 7 shows position indicator circuits for one elevator. Figure 9 shows the car call registering, car and landing call pick-up, automatic landing call cancelling, highest car call and highest landing call circuits for one elevator, this elevator being a high zone elevator and also being arranged to serve the basement. This figure also shows the landing call registering circuits. Like car call registering circuits, highest car call circuits and car call pick-up circuits are provided for each of the other elevators with certain changes in circuits, as shown in Figure 9a, where the elevator is a low zone elevator and does not serve the basement. As regards the highest landing call circuits, landing call pick-up and automatic landing call cancelling circuits, like circuits are provided for each of the elevators by interconnection of the selectors as indicated by cross connecting wires WU, WD and WH for the various floors in Figures 9 and 9a. Figure 10 shows the preference return and cumulative call seconds totalizing circuits, these circuits being connected by cross connecting wires WC with the circuits of Figure 9. Like preference return circuits are provided for each elevator by interconnection of the selectors as indicated by cross connecting wires WP and WPB in Figure 10. Figures 11 and 11a show the hall lantern circuits for high and low zone cars. Figures 12 and 13 show additional control circuits and the power circuits for a high zone elevator, it being understood that such circuits are provided also for the other elevators, except for certain changes in the case of a low zone elevator. The circuits of Figure 12 are joined with those of Figure 13 by vertically extending feed wires W21 and W22. Figure 14 shows a portion of the circuits of Figure 12 for a low zone elevator. Figure 15 shows the door protective circuits for one elevator.

The feed lines W10 and W11 supply direct current which may be derived through rectifiers from the main source of supply (not shown) when this source is three phase alternating current. Line W11 is the positive side as indicated by the plus sign in Figure 3. The feed lines W12 and W13 for the position indicator circuits, the feed lines W14 and W15 for the dispatching signal circuits of Figure 8, and the feed lines W18, W19 and W20 for the hall lantern and buzzer circuits supply single phase alternating current which may be taken from the above mentioned alternating current supply mains, either directly or through transformers. The feed lines W16 and W17 for the car button circuits supply direct current which may be derived from the supply mains as above. The lines B+, B and B— of Figure 9 supply direct current. The primary of transformer TF of Figure 9 may be supplied with alternating current from the main source of supply. Alternating current is provided across wire W23 and ground of Figure 15, and may be from the main source of supply.

To facilitate disclosure of an application of the invention, the control system illustrated has been considerably simplified as compared with control systems utilized in commercial installations. It is to be understood that in applying the invention to control systems used commercially, many changes may be made, especially in adapting the invention to the more comprehensive circuits and to control features and apparatus not here shown.

The electromagnetic switches employed in the system illustrated are designated as follows:

ASM—Auxiliary stopping switch
BF—Basement service relay
BFU—Auxiliary basement service relay
BK—Brake switch
BL—Buzzer relay
CA—Potential switch
CS—Car cut-out relay
CT—Interval relation switch
CU—Car direction switch
DBR—Down balancing relay
DC—Door close switch
DN—Down direction switch
DO—Door open switch
DP—Door protective relay
DPX—Auxiliary door protective relay
E—Speed switch
EA—Auxiliary speed relay
FDX—Basement service indication relay
FDY—Auxiliary basement service indication relay
FM—Preference return switch
GH—Door limit switch
H—Field and brake switch
KR—Running switch
LNS—Load non-stop switch
ML—Main landing switch
NS—Non-stop relay
NT—Hall time switch
NTT—Auxiliary hall time switch
OS—Operating switch sequence relay
PR—Auxiliary direction relay
PT—Light flicker switch
PTX—Auxiliary light flicker switch
RC—Reversed cut-out switch
RE—Landing call reestablish switch
REX—Auxiliary landing call reestablish switch
RO—Door reopen switch
SM—Stopping magnet (on selector)
SR—Signal recycling switch
THL—Top landing switch
TOSX—1st throw-over switch relay
TOSY—2nd throw-over switch relay
TUD—Time delay switch
UBR—Up balancing relay
UP—Up direction switch
VB—Bottom terminal relay
VC—Return cut-out switch
VCO—Multiple car switch
VD—Down traffic switch
VDA—Auxiliary down signal switch
VDD—Down interim traffic switch
VDE—Detent switch
VDH—Down holding switch
VDM—Down manual signal switch
VDP—Down peak switch
VDR—Down selecting switch
VDS—Down signal switch
VE—Even car switch
VHO—Detent holding switch
VHR—Reset cut-out switch
VL—Instantaneous reset switch
VN—Night service relay
VO—Zone return switch
VRR—Reverse reset relay
VS—Signal relation switch
VSR—Down dispatch reset switch
VT—Top terminal relay
VTC—Interval timing switch
VTO—Interval throwover switch
VTR—Instantaneous transfer switch
VTX—Auxiliary instantaneous transfer switch
VU—Up traffic switch
VUA—Auxiliary up signal switch VUD—Interim traffic switch
VUH—Up holding switch
VUM—Up manual signal switch
VUP—Up peak switch
VUR—Up selecting switch
VUS—Up signal switch
VUU—Up interim traffic switch
WB—Bottom selection switch
WBX—Up signal holding switch
WT—Top selection switch
WTS—Top starting switch
WTX—Auxiliary top selection switch
WUS—Up group signal switch
XC—Highest car call relay
XCS—Auxiliary car cut-out relay
XDC—Door close switch relay
XH—Automatic return relay
XL—Car signal direction relay
XS—Highest landing call relay
XSM—Auxiliary stopping relay
XSR—Signal recycling relay
XT—Auxiliary reset switch
XVB—Auxiliary bottom terminal relay
XVO—Zone return relay
YVT—Delayed timing relay
ZC—Low zone cut-out switch
ZR—Zone reversal switch
ZVT—Timing relay Throughout the description which follows, these letters will be applied to the coils of the above designated switches. Also, with reference numerals appended thereto, they will be applied to the contacts of these switches. The release coil of the electromechanical brake is similarly designated BR and this coil and the contacts operated by the brake are included on the spindle sheets. Differentiation will be made between the different elevators by appending to the characters employed to designate the various elements of the system small case letters a, b, c and d, indicative of the different elevators.

The circuits are shown in "straight," i. e., "across-the-line," form in which the coils and contacts of the various switches are separated in such manner as to render the circuits as simple and direct as possible. The relationship of the coils and contacts may be seen from Figures 16a and 16h wherein the switches are arranged in alphabetical order with the coils and contacts of the various switches positioned on spindles. Taking any one of the spindle sheets, each switch thereon has all its contacts and coils on that particular spindle sheet. The coils and contacts are related to the wiring diagrams by applying in brackets to the particular coil or contact the number of the figure in which it occurs, this being appended to the particular designation for the contacts. Each coil and contact is positioned on the spindle sheet in alignment with its position on the particular wiring diagram. Thus a coil or contact of any particular switch may be found by taking the spindle sheet on which the switch is located, noting the number in brackets applied to the coil or contact and aligning that spindle sheet horizontally with the sheet on which the figure indicated is located. The coil or contact will then be found on that figure in horizontal alignment with that coil or contact on that spindle sheet. Thus to locate contacts DO1a for example, referring to spindle sheet 16b it will be found that contacts number 1 of switch DOa has the numeral 13 in brackets appended thereto. This means that these contacts appear in Figure 13. The contacts may then be located by aligning the sheet on which Figure 13 appears with the sheet on which Figure 16b appears and will be found in Figure 13 in alignment with the contacts in Figure 16b.

The electromagnetic switches are illustrated in deenergized condition, switches CT, CU, DN, UP, VDM, VDS, VUM and VUS, which are the latching type, being shown in reset condition. Each of these latching type switches has two coils, one an operating coil and the other a reset coil. Also each of switches EA, VDH, VSR and VUH has two coils, one an operating coil and, in the case of switches VDH, VSR and VUH, the other a holding coil and, in the case of switch EA, the other an assisting coil.

Referring to Figure 9, the up landing buttons are designated U while the down landing buttons are designated D. Numerals and the letter B for basement are appended to these letters indicating the floors for which the landing buttons are provided. Each of these landing buttons in the preferred arrangement comprises an electronic tube and a fixed button connected to the tube envelope with the circuits arranged so that the tube breaks down in response to manual touch of the fixed button and remains conductive, thereby registering the call and enabling the touch to be discontinued. These electronic tubes are cold cathode gas tubes, the type having a wire anode extending to within a short distance to the glass envelope of the tube, such as the RCA 1C21, having been found satisfactory. With such a tube, the button is connected to the tube envelope adjacent the anode. The tubes of the type mentioned are three element tubes having an anode, a cathode and a control electrode designated for landing button D7 for example, as AN, CD and GD respectively, with the fixed button designated TB. RUL and RDL are loading resistors for the tubes, RUP and RDP are control electrode protective resistors for the tubes, and condensers QU and QD are for insuring the putting out of the tubes by automatic call cancelling operations as the calls are answered. For such tubes, the preferred voltage values are 150 volts from line B+ to line B, 30 volts from line B to line B—, 150 volts R. M. S. from line B to the grounded end of the secondary of transformer TF and 95 volts R. M. S. from line B to line AC1. For convenience line AC1 is not extended down the sheet as in the case of lines B+, B and B—, but the connections are indicated by applying reference character AC1 to the circuits to which it is connected.

The car buttons are designated C and, as in the case of the landing buttons, have numerals and the letter B for basement appended thereto as indicative of the floors for which the car buttons are provided. Each car button when pressed is held pressed by a magnet CBM (Figure 12) common to these buttons.

The starting button in the car is designated SB and is shown in Figure 13. Other controls are provided on the car panel along with the starting button and car buttons, namely, reversing buttons designated URB and DRB for changing the direction of travel at any floor, non-stop button designated NSB, landing call reestablish button designated REB, door open button DOB1, door close button designated DCB and a throwover switch operating switch designated TSOS, all in Figure 12, door open button DOB2 and emergency stop switch ES, both in Figure 13, and buzzer cut-out switch designated BUS in Figure 11.

The hall lanterns are designated HL and differentiated by numerals corresponding to the floors for which they are provided and by the letters U and D, in accordance with whether up or down hall lanterns, appended to the letters HL.

Mechanism actuated in accordance with movement of the elevator car is utilized in the circuits of each elevator. Such mechanism may be in the form of a selector machine as indicated in Figure 1. The selector machine is driven preferably by means of a steel tape attached to the car and counterweight and having teeth formed thereon for engaging teeth on the selector driving wheel. An understanding of a selector machine suitable for use in the control system may be had from the schematic illustration of such a machine in Figure 2.

The selector machine comprises a frame formed by a base plate 10, and a top plate 11 supported from the base plate by standards. The operating shaft 12 for the selector machine is rotatably supported on the base plate 10. The toothed tape 9 meshes with the toothed driving wheel 13 which is secured to the outer end of shaft 12 to drive the machine. A vertical screw 14 is driven by shaft 12 through the intermediary of bevel gears 15. The vertical screw 14 drives a crosshead 16 guided in its vertical movement by guide bars 17. With this arrangement the crosshead is moved in accordance with movement of the elevator car.

The crosshead carries a carriage 18 upon which is mounted mechanism for causing slow-down to begin at a certain distance from the floor for which a call has been picked up and for causing the car to be brought to a stop as it arrives at the floor. The carriage is advanced from a neutral position with respect to the crosshead prior to starting the car. This advance is effected by means of a torque motor which will be hereinafter be termed the brush motor and designated BM. The brush motor acts through a chain of gears to rotate a shaft 19. On the end of this shaft is a gear 20 which meshes with a rack 21 to vertically move the carriage either up or down depending upon the direction of rotation of the shaft, thereby advancing the carriage. The brush motor in advancing the carriage also effects the engagement of the contacts of selector switches SLS1, and SLS3 and the separation of the contacts of selector switch SLS2, these switches being operated by cams 22 arranged on shaft 19. If a call is not picked up during the advance of the carriage, the carriage is brought to a stop by one or the other of stopping collars 28. The brush motor then remains energized so that the carriage is thereafter moved with the crosshead until a call is picked up.

The carriage is returned to neutral position by means of pawls 23 which are spring biased to extended position for engaging stopping lugs 24. There are two pawls, one effective for up car travel and the other for down car travel. These pawls are carried by the carriage. A stopping lug is provided for each floor and is arranged on a floor bar 25, these floor bars being arranged on supporting standards for top plate 11 on which they are spaced in accordance with the distance between the floors for which the lugs are provided. An electromagnet is provided for controlling the extension and retraction of the pawls. This magnet, termed a stopping magnet and designated SM, is carried by the crosshead. The stopping magnet has two coils, one an operating coil and the other a reset coil. Upon energization of the operating coil bell crank levers 26 are pulled upwardly to cause a cam 27 to be extended outwardly to push rollers on the ends of the pawls in a direction to force the pawls into retracted positions. In moving outwardly the cam acts through a link to pull a contact lever clockwise about its pivot to close a switch having three pairs of contacts, one pair SM1 of which controls the energization of motor BM. Thus the pawls are released from the stopping collar for the floor at which the car is stopped before the brush motor is energized to advance the carriage. The stopping magnet and its switch contacts are included in key sheet (Figure 16c) to enable them to be readily located in the wiring diagram.

When a call is picked up, the reset coil of the stopping magnet is energized. This neutralizes the operating coil, releasing cam 27 to permit the pawls to be extended for cooperation with the stopping lug for the floor for which the call is registered and to cause opening of switch SM1 to deenergize the brush motor. This may occur either during the advance of the carriage, in which event the advance is immediately stopped, or after the carriage has been fully advanced, in which event the carriage remains in advanced condition with respect to the crosshead. In either event the crosshead either in its initial movement as a result of starting the car or in its continued movement moves the carriage the additional amount sufficient to take up the small amount of pawl clearance for the pawl for the direction in which the car is travelling whereupon the pawl engages the stopping lug, bringing the carriage to a stop. The crosshead continues its movement and, due to the relative movement between the crosshead and the carriage, acts through rack 21 and gear 20 to effect the opening of the selector switches SLS3 and SLS1 in sequence to effect the slow-down and stopping of the car, and the closing of switch SLS2 slightly ahead of the opening of switch SLS1.

A plurality of brushes are carried by a panel on the carriage to cooperate with stationary contacts for the various floors arranged on the floor bars 25. This panel, being advanced with the carriage, will hereinafter be termed the advancer panel. When the car is stopped at a floor, these brushes are in engagement with their cooperating stationary contacts for that floor. Being on the advancer panel, however, the brushes are advanced in starting the car, are latched in engagement with their contacts for a floor by a pawl when a stop is initiated and are maintained in that condition as the advance is taken up as the car comes into the floor. An elongated brush in the form of a cam is also mounted on the advancer panel for engaging hook switches on the floor bars. A switch is also carried by the carriage to be actuated by trough shaped cams, one for each floor, mounted on the floor bars. Another panel is carried by the crosshead which is moved in synchronism therewith and will hereinafter be termed the synchronous panel. Certain brushes are mounted on this panel for engaging stationary contacts mounted on the floor bars. These brushes, cams, stationary contacts and switches are shown in the wiring diagram and occur in Figures 9, 10, 11 and 12. The stationary contacts and hook switches are given general designations and differeniated as to floors by appended numerals and by B in the case of the basement.

Figure 2:
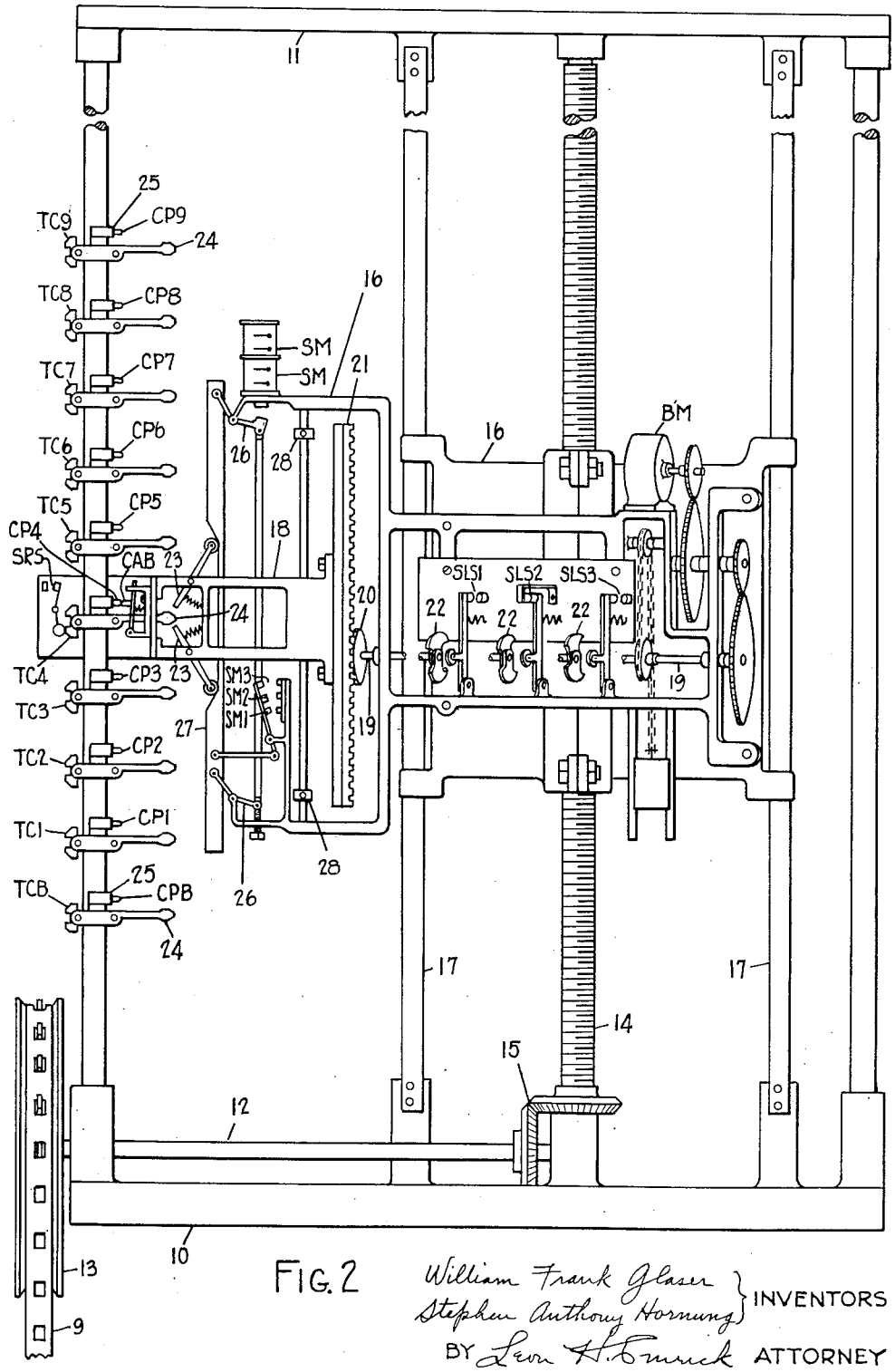
Figure 2 is a schematic representation of the selector machine used in the control system for each of the elevator cars.
Figure 3:
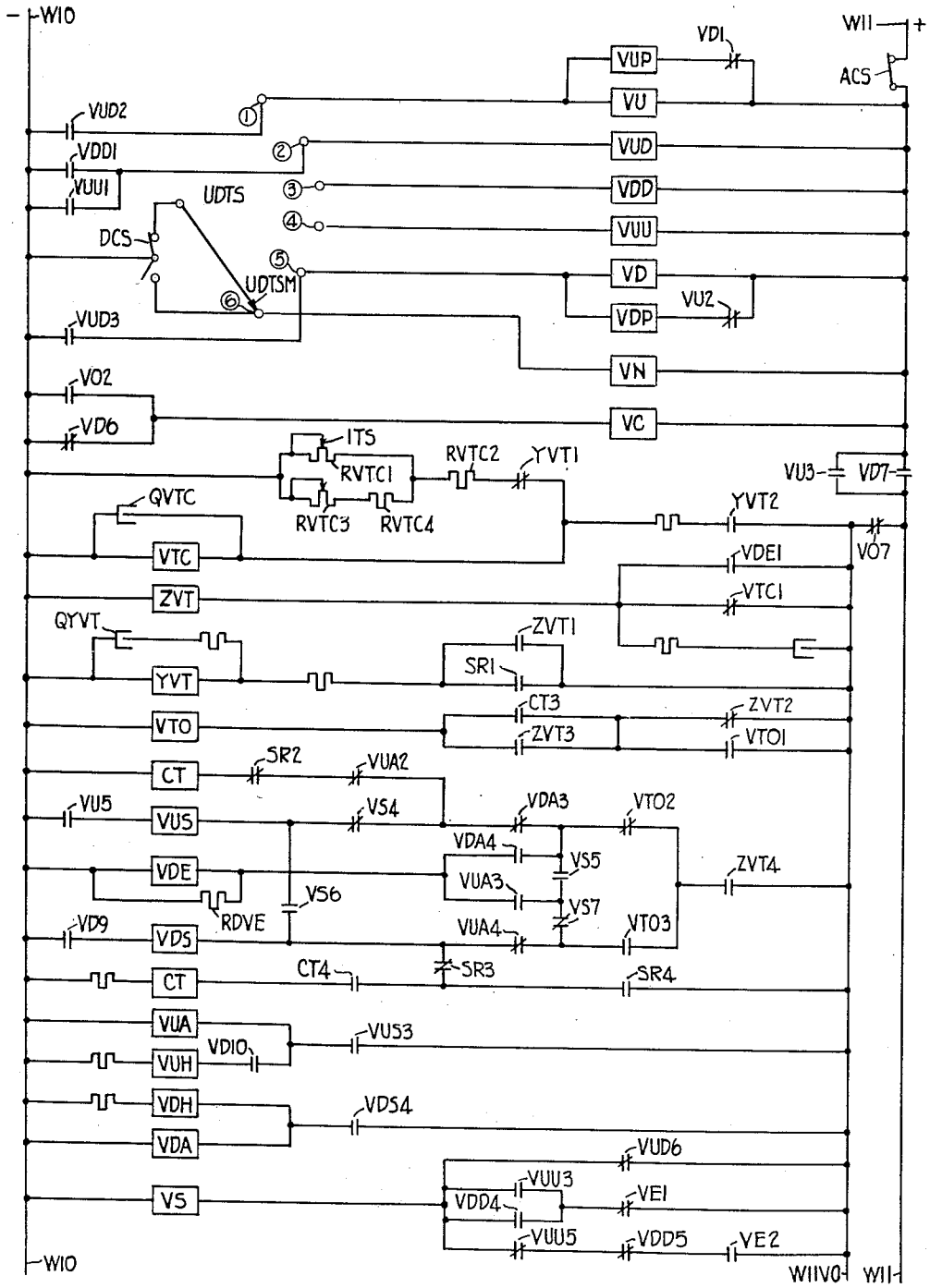

Referring first to Figure 9, one brush carried by the advancer panel and the stationary contacts with which it cooperates have to do with the car call pick-up operation. This brush is designated CAB while the stationary contacts which it engages are designated generally as CP. This brush and the stationary contacts with which it cooperates are indicated in Figure 2. This arrangement is the same for each elevator, except that no stationary contact CPB is provided when the car does not serve the basement (see Figure 9a). Two of the brushes carried by the advancer panel and the stationary contacts with which they cooperate have to do with landing call pick-up and automatic call cancelling operations. This brush for up landing calls is designated UPB while the stationary contacts which it engages are designated generally as UH. The brush for down landing calls is designated DPB while the stationary contacts which it engages are designated generally as DH. This arrangement is the same for each elevator except that no basement contacts UHB and DHB are provided for cars which do not serve the basement (see Figure 9a). A pair of tandem brushes carried by the advancer panel and the stationary contacts with which they cooperate have to do with highest landing call circuits. These brushes are designated HRB1 and HRB2 while the stationary contacts with which they cooperate are designated generally as HH. This arrangement is the same for each elevator except that no basement contact HHB is provided for the cars which do not serve the basement (see Figure 9a).

The elongated brush or cam carried by the advancer panel and the hook switches with which it cooperates have to do with the highest car call operation. This cam is designated HCB while the hook switches are designated generally as HC. This cam is of insulating material and is of a length to engage and open a hook switch for any particular floor slightly ahead of the engagement of the call pick-up brushes with the stationary contacts for that floor when the car is travelling in the up direction and to engage and open the hook switch for the floor below such floor slightly ahead of the engagement of the call pick-up brushes with the stationary contacts for such floor when the car is travelling in the down direction. These hook switches are subject to the control of the car buttons and are arranged in series circuit relationship in the highest car call circuit. This arrangement is the same for each elevator.

The selector switch which is operated by the trough shaped cams is designated SRS while the trough shaped cams are designated generally as TC. As the cams produce a rocking action in actuating this switch, switch SRS will be termed selector rocking switch and the cams TC will be termed rocking cams. These cams and switch are indicated in Figure 2. The arrangement is the same for each elevator except that no basement rocking cam TCB is provided for cars which do not serve the basement (see Figure 9a).

Another brush carried by the advancer panel and the stationary contacts with which they cooperate have to do with the preference return circuits. This brush (see Figure 10) is designated PRB and the stationary contacts are designated generally as PRC. This arrangement is the same for each elevator.

The wires WU, WD, WH and WP which interconnect the selectors connect the corresponding stationary contacts UH, DH, HH and PRC respectively of the selectors as indicated in Figures 9, 9a and 10. Wire WPB of Figure 10 interconnects selector brushes PRB.

Referring now to Figure 11, two additional brushes on the advancer panel are for the hall lantern circuits, one for each direction of travel. The up brush is designated ULB and the down brush is designated DLB. The contacts engaged by brush ULB are designated generally as ULC while those engaged by brush DLB are designated generally as DLC. This arrangement is the same for each elevator except that no basement contacts ULCB and DLCB are provided for cars which do not serve the basement (see Figure 11a).

One of the brushes on the synchronous panel is in the position indicator circuits. This brush is designated PIBR and the stationary contacts which it engages are designated generally as PIC. This brush and its contacts are shown in Figure 7. Like circuits are provided for each of the other elevators except that no basement contact PICB is provided where the car does not serve the basement. Other brushes carried by these panels and their cooperating stationary contacts or switch will be referred to later.

A multi-pole throw-over switch motor switch TSOS, one pole for each car (see Figure 12) is utilized to select either "with attendant" or "without attendant" operation. This switch may be provided at the starter's station and acts to control the throw-over switch motor TOM for each car. Each motor always rotates in the same direction and acts through a plurality of cams to cause the operation of a plurality of throw-over switches TO. Each throw-over switch TO has two operative positions, one for "with attendant" operation and designated w and the other for "without attendant" operation and designated w/o. Limit switches TOL1 and TOL2 act to break the motor circuit when it is rotated from one position to another. A key operated throw-over switch KTO may be provided in one or more cars whereby an individual car may be changed from "with attendant" to "without attendant" operation, or vice versa. Such a switch is shown in Figure 12 for car a and is a key operated three position switch. This switch must be returned to neutral position, in which switch TSOS is effective, before the key can be removed.

It is believed that an understanding of the invention will be facilitated by first describing the operation of starting and stopping an elevator car, say car a together with the mechanism and circuits employed. The circuits for controlling the starting and stopping of car a are shown in Figures 9, 10, 12 and 13. Any suitable form of power supply may be provided for the elevator motor. One of the preferred arrangements is to employ a direct current elevator motor and to cause current to be supplied to the motor at a variable voltage, as from a driven generator in accordance with Ward-Leonard principles. The generator of such arrangement has been illustrated. The driving motor for the motor generator set and control arrangement therefor have not been illustrated. It is to be understood that either a direct current or alternating current driving motor may be employed, depending upon the kind of power supplied to the building and the character of the installation, and that any suitable control arrangement therefor may be utilized. An exciter is employed to supply current to the separately excited field windings of the supply generator and the elevator motor and to the brake and the coils of the various electromagnetic switches of Figures 12 and 13. It will be assumed that the exciter is driven by the driving motor for the motor generator set.

The armature of the generator of the motor generator set is designated GAa, its separately excited field winding being designated GFa and its series field winding GSFa. The armature of the elevator motor is designated MAa and its separately excited field winding MFa. A resistance RGFa is provided for controlling the strength of the generator separately excited field and therefore the voltage applied to the elevator motor armature. The armature of the exciter is designated EAMa, its self-excited field winding is designated EFa and its series field winding is designated ESFa. RBR2a is a discharge resistance for the brake release coil BRa, while resistance RBR1a serves as a cooling resistance for this coil.

There are two pairs of contacts operated by the car gate, each engaged when the gate is closed. These contacts are designated G1a and G2a. The door contacts operated by the various hoistway doors are arranged in series relation. These contacts are not closed until the doors are closed and locked. For convenience these door contacts are shown as a single pair of contacts designated DCOa. The car gate and hoistway doors for each elevator have not been shown. The circuits of car a are arranged for basement service but the system is illustrated for the condition where the car is standing at the main landing which serves as the bottom terminal.

It will be assumed that the car arrived at the main landing travelling in the down direction and with no call for the basement. When the car arrived at the floor, brush LB1a engaged stationary contact MLC1a and, upon the engagement of contacts H4a and EA2a in the stopping operation, a circuit was established by way of contacts UP1a, BF2a, H4a and EA2a for the reset coil of down direction switch DNa and for the operating coil of up direction switch UPa. This caused the down direction switch to be reset, the condition in which it is shown in the drawings, and the operation of up direction switch UPa and latching of this switch in operated condition. This set the car for upward travel.

It will be assumed that car a is to be operated with an attendant in the car, the throw-over switches TOa being shown in this position designated w. Assume that the driving motor of the motor generator set is started in operation. This causes the exciter voltage to build up to full value. As it does, the potential switch CAa operates, its coil being connected across the exciter through the contacts of the various safety devices, indicated by the legend "safeties." The engagement of contacts CA2a and CA3a completes a circuit for the car button magnet CBMa and for the coils of non-stop relay NSa, auxiliary direction relay PRa and auxiliary car cutout relay XCSa. Also these contacts complete a circuit through brush LB2a on the synchronous panel and contact MLC2a for the coil of main landing switch MLa. This causes the operation of switches NSa, PRa, XCSa and MLa. Relay NSa engages contacts NL1a which together with the engagement of contacts CA1a and PR7a renders up hall lantern brush ULBa alive, down hall lantern brush DLBa being disconnected from feed line W19a by contacts PR5a. Relay NSa also engages contacts NS2a which together with the engagement of contacts PR3a prepares the circuit for up landing call pick-up brush UPBa, contacts PR4a separating the circuit for down landing call pick-up brush DPBa. Relay PRa, in addition to operating the above contacts, engages contacts PR8a in the circuit for highest landing call return brushes HRBa and engages contact PR6a in the circuit for preference return brush PRBa. The elevator motor field winding MFa is connected across the exciter so that the strength of the elevator motor field builds up as the exciter voltage builds up. Also the door operating motor field winding DMFa is connected across the exciter upon operation of switch CAa so that this field winding is excited when the exciter is in operation.

To start the car, start button SBa is pressed, completing a circuit for the coil of running switch KRa. Switch KRa operates engaging contacts KR2a to complete a circuit for the operating coil of stopping magnet SMa through contacts OS2a and EA3a. The stopping magnet upon operation engages contacts SM1a, SM2a and SM3a. Contacts SM2a complete a holding circuit for the operating coil of the stopping magnet. Contacts SM1a complete a circuit for the coil of auxiliary stopping switch ASMa and for one coil of auxiliary speed relay EAa through contacts KR2a. Relay EAa does not operate at this time. Switch ASMa operates to engage contacts ASM3a, completing the circuit for the brush motor BMa. This circuit is through field winding BMF2a and through field winding BMF1a and armature BMAa connected in parallel by contacts UP2a, and through contacts KR1a. This results in the operation of the brush motor to advance the carriage in the up direction. As the advance takes place cam XLCa (Figure 12) on the advance panel runs off hook switch XLSa which closes, completing the circuit for the coil of car signal direction relay XLa. The brush motor also effects the engagement of the contacts of selector switches SLS1a and SLS3a and the separation of the contacts of selector switch SLS2a, contacts SLS1a preparing the circuit for the coil of field and brake switch Ha and contacts SLS3a preparing the circuit for the coil of speed switch Ea and completing the circuit for a second coil of the auxiliary speed relay EAa through contacts UP5a, up limit switch SS3a and emergency stop switch ESa.

The energization of both coils of relay EAa causes this relay to operate to engage contacts EA1a, EA4a and EA5a and to separate contacts EA2a and EA3a. Contacts EA4a are in the circuit for the neutralizing coil of relay SMa of the stopping magnet, the advance having progressed sufficiently by this time for the call pick-up brushes to be off the stationary contacts for the floor at which the car is positioned. The separation of contacts EA2a prevents energization of the direction switches once the advancer mechanism has been energized to advance the carriage. Contacts EA3a render the energization of the operating coil of stopping magnet SMa subject solely to holding contacts SM2a.

Switch KRa upon operating also engages contacts KR4a, completing a circuit for the coil of door close switch relay XDCa through throw-over switch TO7a. Relay XDCa operates to engage contacts XDC1a, completing a circuit for the coil of door close switch DCa through contacts DP1a, limit switch DCLa, contacts OS1a and DO1a and throw-over switch TO9a. Switch DCa separates contacts DC5a and engages contacts DC4a and DC6a, completing a circuit for the door motor armature DMA$a$. This causes operation of the door motor to close the main floor hoistway door and car gate. Thus the closing of the door and gate takes place as the carriage is advanced.

If at any time before the door and gate reach fully closed position the attendant desires to reopen them, he may do so by release of the start button SB$a$. This deenergizes switch KR$a$ which in turn separates contacts KR4$a$ to deenergize relay XDC$a$. Relay XDC$a$ reengages contacts XDC2$a$, completing a circuit through contacts DC1$a$, TOSY3$a$ and H1$a$ and limit switch DOL$a$ for the coil of door open switch DO$a$. This switch engages contacts DO2$a$ to establish a self-holding circuit and separates interlock contacts DO1$a$ to deenergize switch DC$a$. Switch DC$a$ separates contacts DC4$a$ and DC6$a$ in the door motor circuit and separates contacts DC1$a$ in the initial energizing circuit for switch DO$a$, these latter contacts being delayed slightly in dropping out. Switch DO$a$ also separates contacts DO3$a$ and engages contacts DO4$a$ and DO5$a$, completing a circuit for the door motor armature DMA$a$ for opening the door and gate. When the door and gate reach open position, door open limit switch DOL$a$ operates to break the circuit for the coil of switch DO$a$.

Referring back to the door closing operation, as the door and gate reached closed position, door close limit switch DCL1$a$ opens the circuit for the coil of switch DC$a$ which disconnects the door motor armature from the exciter. The closure of the door and gate completes a circuit for the coil of field and brake switch H$a$ through contacts SLS1$a$, UP4$a$, up limit switch SS1$a$, gate contacts G2$a$, door contacts DCO$a$, contacts KR3$a$ and switch ES$a$.

Switch H$a$ operates to engage contacts H2$a$, completing a circuit for the coil of time delay switch TUD$a$. It also engages contacts H5$a$ to by-pass contacts KR1$a$ and engages contacts H8$a$ to by-pass contacts KR3$a$. It also engages contacts H6$a$ to complete a circuit for the coil of operating switch sequence relay OS$a$. Switch OS$a$ engages contacts OS3$a$ which with contacts H6$a$ completes a by-pass circuit for contacts KR2$a$. Switch OS$a$ also engages contacts OS4$a$ to complete a circuit for the coil of auxiliary hall time switch NTT$a$ through rectifier VNT$a$. Switch NTT$a$ upon operation engages contacts NTT1$a$, completing a circuit for the coil of hall time switch NT$a$. Switch KR$a$ in dropping out also separates contacts KR4$a$ to deenergize the coil of relay XDC$a$.

Switch HA also engages contacts H12$a$ and H13$a$ to complete the circuit for brake release coil BR$a$ and engages contacts H14$a$ and H15$a$ to complete the circuit through contacts UP7$a$ and UP9$a$ for the generator field winding GF$a$. Contacts H16$a$ disconnect the generator field winding from across the generator armature. The completion of the circuit for the generator separately excited field winding causes current to be supplied from the generator armature GA$a$ to the hoisting motor armature MA$a$ and, the brake being released as a result of the energization of its release coil BR$a$, the elevator motor starts the car in the up direction. As contacts of switch KR$a$ are by-passed upon operation of switch HA as above set forth, the start button SB$a$ may be released after the car starts without interrupting the running of the car or causing the reopening of the door and gate.

The brake, upon being released, effects the separation of contacts BR1$a$, which act to remove the short circuit for the coil of brake switch BK$a$. This relay operates to separate its contacts BK2$a$ to insert cooling resistance RBR1$a$ in circuit with brake release coil BR$a$. It also engages contacts BK1$a$, which completes the circuit for the coil of speed switch E$a$ through contacts H9$a$, SLS3$a$, UP5$a$, up limit switch SS3$a$ and switch ES$a$. Switch E$a$ upon operation engages contacts E2$a$ to short circuit a portion of resistance RGF$a$ in the circuit of the generator field winding GF$a$. This applies full voltage to the generator separately excited field winding, causing the generator voltage to build up to full value to bring the elevator car up to full speed. As the car leaves the first floor, brush LB2$a$ on the synchronous panel runs off contact MLC2$a$, breaking the circuit for the coil of switch ML$a$.

Stops during upward travel of the car are made in response to car buttons and up landing buttons. For convenience, assume that a passenger entered the car at the first floor desiring to be carried to the third floor. Upon the passenger announcing his destination, the car attendant presses car button C3$a$, this button when released being held in operated condition by car button magnet CBM$a$. Before the engagement of brush CAB$a$ with contact CP3$a$, the roller of selector rocking switch SRS$a$ rides onto the lower side of rocking cam TC3$a$, opening this switch. Shortly after brush CAB$a$ engages contact CP3$a$, the roller rides into the trough, causing the momentary closing of switch SRS$a$ to complete a circuit through button C3$a$, contact CP3$a$, brush CAB$a$, resistance RSM1$a$, contacts SM3$a$ and EA4$a$ and switch SRS$a$ for neutralizing coil SM$a$ of the stopping magnet. This coil acts to oppose the operating coil SM$a$ of this magnet, releasing the pawls and causing the separation of contacts SM1$a$, SM2$a$ and SM3$a$. Contacts SM2$a$ and SM3$a$ break the energizing circuits for the coils of the stopping magnet, while contacts SM1$a$ break the circuit for the coil of the auxiliary stopping switch ASM$a$ and one coil of auxiliary speed relay EA$a$. The auxiliary stopping switch separates contacts ASM3$a$ to deenergize the brush motor BM$a$. Contacts ASM2$a$ complete a circuit through contacts CA1$a$, NS1$a$ and PR7$a$ and brush ULB$a$, now in engagement with contact ULC3$a$ for the up third floor hall lantern UHL3$a$, to indicate that a stop is to be made at the third floor by car $a$ travelling upwardly. Relay EA$a$ does not drop out on deenergization of its coil in series with the coil of switch ASM$a$, being held in operated condition by its coil in parallel with the coil of speed switch E$a$.

As the car and therefore the crosshead move upwardly the up pawl engages the third floor stopping collar bringing the carriage to a stop. Also, at this time the roller of switch SRS$a$ has moved out of the trough, opening the switch. Continued movement of the crosshead causes the opening of selector switches SLS3$a$ and SLS1$a$ in the order named and the closing of switch SLS2$a$ slightly ahead of the opening of switch SLS1$a$ as the car comes to the third floor. The opening of switch SLS3$a$ breaks the circuit for the other coil of relay EA$a$, which drops out. It also breaks the circuit for the coil of speed switch E$a$, which drops out, separating contacts E2$a$ to reinsert resistance RGF$a$ in the circuit of the generator field winding. This decreases the voltage of the generator, causing the car to slow down.

The opening of switch SLS1$a$, which occurs as the car arrives at the landing, breaks the circuit for the coil of field and brake switch Ha, which drops out. The resultant separation of contacts H12a and H13a deenergizes brake release coil BRa and the separation of contacts H14a and H15a disconnects the generator separately excited field winding GFa from the exciter. Thus the external excitation of the generator is discontinued and the brake is applied to bring the car to a stop at the third floor landing. The engagement of contacts H16a reconnects the separately excited field winding across the generator armature substantially to destroy the residual flux of the generator field.

As the car arrived within a short distance of the third floor landing and slightly ahead of the opening of selector switch SLS1a, selector switch SLS2a closes completing a circuit through contacts XDC2a and NT4a for the coil of door open switch DOa. This switch operates as above described to complete the circuit for the armature DMAa of the door motor, initiating the opening of the third floor hoistway door and the car gate before the car comes to a stop. The engagement of contacts DO7a completes another circuit through contacts NT5a for the coil of switch NTTa, maintaining this switch operated after the separation of contacts OS4a. As before, when the door and gate reach open position, switch DOa is deenergized by the opening of limit switch DOLa. With the door and gate opened, the passenger leaves the car.

Should the start button SBa have not been released, switch OSa prevents immediate reclosing of the door and starting of the car. Under such conditions the circuit for the coil of switch OSa is maintained through contacts OS3a and KR2a. Thus contacts OS1a remain separated, preventing the energization of the coil of door close switch DCa, and contacts OS2a remain separated, preventing the energization of the operating coil of stopping magnet SMa. Thus the start button must be released before it becomes effective to close the door and gate and restart the car.

Similar operation is had in response to landing buttons. Assume that before the attendant presses start button SBa to start the car in the up direction from the main landing, an intending passenger at the second floor touches up landing button U2. It is to be noted that the anode-cathode circuit of the tube of each landing button is from line B+ through the tube and load resistance RUL to line B. The 150 volts direct current thus applied to the tube is not sufficient to break down the tube. However, upon an intending passenger touching a landing button, a circuit is established from ground GR through the secondary of transformer TF to line B which is connected through line B+ to the anode of the tube and thence from the tube envelope through the body of the intending passenger back to ground. As a result, sufficient alternating current voltage is applied between the anode and the tube envelope to break down the tube. When the tube fires, it becomes illuminated to indicate that the landing call is registered.

Assume now that the start button is pressed to initiate the starting of the car. Upon the engagement of brush UPBa with contact UH2a, a circuit is completed which connects the coil of auxiliary stopping relay XSMa across the loading resistance RUL2, the circuit being from the left hand side of resistance RUL2 through contact UH2a, brush UPBa, contacts PR3a, RC2a, RE4a and NS2a, rectifier VXSM1a, coil XSMa, resistor RXMa, to line B back to the right hand side of resistor RUL2. The potential drop across resistor RUL2 applied to coil XSMa is sufficient to operate this relay. Upon operation relay XSMa engages contacts XSM3a which, together with the momentary closing of switch SRSa which takes place immediately thereafter, completes a circuit for the neutralizing coil of stopping magnet SMa. This causes the car to be slowed down and stopped at the second floor, the up hall lantern to be lighted at the second floor and the second floor hoistway door and car gate to be opened, in the manner previously described.

Relay XSMa, upon operation, also engages contacts XSM2a. Thus upon the engagement of contacts ASM4a as a result of the reset of the stopping magnet a circuit is completed from the tapped point of the secondary of transformer TF through rectifier VTF, by way of line AC1, through contacts TOSX3a and ASM4a, rectifier VXSM2a, contacts NS2a, RE4a, RC2a and PR3a, brush UPBa, and contact UH2a to the cathode of the tube of button U2. Rectifier VTF passes the positive halves of the alternating current cycle, thus raising the potential of the cathode with respect to the anode. This reduces the voltage across the tube to below sustaining value, pulsing out the tube. Thus the up landing call at the second floor is automatically cancelled as soon as the call is picked up and the stopping magnet is reset. This prevents this call being also answered by another car. Relay XSMa drops out incident to the cancelling of the call. Rectifier VXSM1a blocks the flow of current from line AC1 through the coil of relay XSMa upon the engagement of contacts ASM4a preventing relay XSMa being held in or reoperated.

The car is started in the down direction in a manner similar to that described for starting it in the up direction. To set the car for downward travel, up direction switch UPa is reset and down direction switch DNa is operated. It will be assumed that this operation is effected at the top terminal. As the car reaches the top terminal, brush LB1a engages contact TLC1a and upon the reengagement of contacts EA2a and H4a as the car comes to a stop, a circuit is completed through contacts DN4a for the operating coil of down direction switch DNa and reset coil of up direction switch UPa, causing the car to be set for travel in the down direction. Incident to this operation contacts DN4a separate, breaking the circuits for the coils of relays PRa and XLa. Also contacts UP3a separate to break the circuit for car button magnet CBMa to release any operated car buttons, this circuit being reestablished by the engagement of contacts DN6a. Also as the car reaches the top terminal, brush LB2a engages contact TLC2a, completing a circuit for the coil of top landing switch THLa. The purpose of this operation will be explained later.

With the car set for downward travel, upon operation of the start button the circuit for the brush motor BMa is completed through field winding BMF1a and through field winding BMF2a and armature BMAa in parallel, connected thus by contacts DN5a, moving the advancer panel downwardly instead of upwardly. The circuit for the coil of switch Ha is through the contacts DN7a and down limit switch SS2a and the circuit for the coils of switch Ea and relay EAa is through contacts DN8a and down limit switch SS4a. The circuit for the generator field winding is through contacts DN9a and DN10a so that the excitation of the generator is opposite to that previously described, causing the car to be started in the down direction instead of the up direction. It is believed that the remainder of the starting operation will be understood from the description given of starting the car in the up direction.

During upward travel of the car, stops are made in response to calls registered by car buttons and up landing buttons for floors above the car in the order in which the floors are reached by the car, regardless of the order in which the calls are registered. Similarly, during downward travel of the car, stops are made in response to calls registered by car buttons and down landing buttons for floors below the car in the order in which the floors are reached by the car, regardless of the order in which the calls are registered. It is believed that stops in response to car calls during downward travel will be understood from the previous description inasmuch as when a car button is pressed it is maintained operated by the car button magnet CBM$a$ so that upon the engagement of brush CAB$a$ with the contact rendered "alive" by this button and the operation of switch SRS$a$, the neutralizing coil of the stopping magnet is energized, and the car is caused to slow down and come to a stop at the floor. Similarly, each down landing call remains registered until the contact DH$a$ rendered "alive" thereby is engaged by brush DPB$a$ to pick up the call, brush DPB$a$ being rendered effective for downward travel of the car by contacts PR4$a$. This causes the stopping magnet to drop out, the call to be cancelled and the car to be slowed down and brought to a stop at the floor at which button was registered. When a stop is to be made at a floor during down car travel, the down hall lantern at that floor is lighted upon the reengagement of contacts ASM2$a$, the circuit being through contacts PR5$a$ and brush DLB$a$ in engagement with its stationary contact for the floor at which the stop is to be made.

If no car call or down landing call is registered for the main landing, the car is automatically stopped at the main landing on its downward trip, provided no car call is registered for the basement. The stop is initiated by the engagement of brush CAB$a$ with contact CP1$a$, rendered alive through throw-over switch TO1$a$ and contacts BF3$a$. As the car comes to a stop it becomes set for travel in the up direction as previously described. Should there be an up landing call for the main landing, this call is automatically cancelled upon the change in direction of car travel as a result of the engagement of contacts PR3. If the basement car button CB$a$ has been pressed a circuit is maintained for the coil of basement service relay BF$a$, causing this relay to be operated. As a result, contacts BF3$a$ are separated in the circuit to contact CP1$a$ so that a stop is not made at the main landing unless in response to a car call or a down landing call. Also contacts BF2$a$ are separated, preventing changing the direction of car travel if the car stops at the main landing in response to a car call or down landing call. Should a stop be made at the main landing under conditions where relay BF$a$ is operated, contacts BF4$a$ are engaged, causing the lighting of down hall lantern DHL1$a$ at the main floor.

Assuming no car call or down landing call for the main landing, the car continues past that floor and is brought to a stop at the basement. The stop is initiated upon the engagement of brush CAB$a$ with contact CPB$a$ and the direction of car travel is changed as the car comes to a stop, the circuit being through contact BLC1$a$ and brush LB1$a$. If a stop be made at the main landing with button CB$a$ pressed, the car continues to the basement in response to the pressing of start button SB$a$ after the stop at the main landing. In either event, all car buttons are released when the change of direction is effected.

If a stop is made at the main landing under conditions where the basement car button is not pressed and an entering passenger announces the basement as his destination, the attendant may press basement car button CB$a$ which causes the operation of relay BF$a$ and thus through the separation of contacts BF2$a$ and the engagement of contacts BF1$a$ changes the direction of car travel back to down.

Should an intending passenger at the basement touch landing button UB, a basement landing call is registered. This causes operation of auxiliary basement service relays BFU, the coil of which is connected across loading resistor RULB. This relay engages contacts BFU1$a$ completing a circuit through contacts TOSY5$a$ for basement service light BSL$a$ in the car to advise the attendant to press the basement car button, in which event the car travels to the basement as above described.

Whenever the car travels to the basement, a stop is made at the main landing on the subsequent upward trip, the stop being initiated by the engagement of brush CAB$a$ with contact CP1$a$ rendered alive through contact BF3$a$ and when the car is under dispatching through contacts CS6$a$ and contacts UP6$a$ and also by the engagement of brush UPB$a$ with contact UH1$a$ if an up call is registered at the main landing. The up call is automatically cancelled as the call is picked up. Thus when an up call at the main landing is in registration ahead of the car on its downward trip it is not automatically cancelled when the car travels to the basement until it stops at that landing on the trip up from the basement. However, should the basement car button not have been operated, the up call for the main landing is automatically cancelled as the car comes to a stop at that landing on its downward trip and the direction of travel is changed, as previously described.

When the car becomes filled to capacity, nonstop button NSB$a$ is pressed, deenergizing nonstop relay NS$a$. This relay drops out to separate contacts NS2$a$, rendering brushes UPB$a$ and DPB$a$ ineffective to pick up landing calls. The car buttons, however, are unaffected by the nonstop button and stops are made to discharge passengers. Relay NS$a$ also separates contacts NS1$a$ to prevent the lighting of the hall lanterns.

Except for basement service, the operation of the other elevators is the same as that of elevator $a$. Each of the other elevators responds to its own car buttons and also answers landing calls, the particular elevator answering any particular landing call being the first one set for travel in the direction corresponding to the call registered whose call pick-up brush for that direction of travel engages its stationary contact corresponding to the hall button pressed.

Having described the operations of starting and stopping a car, the dispatching of the cars will now be described. There are several manually operable controls utilized in the dispatching circuits. These controls are mounted on the starter's control and indicator panel indicated in Figure 1 and shown in detail in Figure 17. The starter's panel is illustrated for a four elevator installation. It has three sections arranged one above the other, the lower one of which is the control section, the intermediate one the communications and clock section and the upper one the indicator section. Each section has a removable face plate 40, each of which as a lock 41. The dispatching controls are mounted on the face plate of the lower section. These controls include an up down traffic selector switch UDTS having the legend "Traffic" marked on the face plate immediately below the switch; interval control ITS having the legend "Interval" marked on the face plate immediately below the control; manual up signal button MUSB having the letter "U" marked on the button; manual down signal button MDSB having the letter "D" marked on the button; zone transfer switches ZTS; individual dispatch and indicator cut-out switches DIC for each elevator; individual call back buttons CLB, one for each elevator; individual motor generator pilot lights MGPL (not shown in wiring diagrams), one for each elevator; and individual motor generator starting switches MGS (not shown in wiring diagrams), one for each elevator. Switch UDTS is of the dial type having an operating knob 43 and six operative positions, indicated as 1, 2, 3, 4, 5 and 6 in circles and by legends indicative of the traffic conditions for which the switch is set. Interval control ITS is also provided with an operating knob 43 and has seven reference points for the knob which are designated 1, 2, 3, 4, 5, 6 and 7 in circles which correspond to various ranges in seconds. This range may vary considerably depending upon the installation. Buttons MUSB, MDSB and CLB are push buttons type switches while switches ZTS, DIC and MGS are of the toggle type. Four arrows TL are arranged between switch UDTS and control ITS and are illuminated by light UTL and DTL of the wiring diagrams in various combinations to indicate the traffic conditions for which the dispatching system is set. A pair of biparting swing doors 44 of shatterproof glass covers the panel.

The face plate for the intermediate section has a grilled opening 45 for the teletalk system (not illustrated) for use by the starter to communicate with the cars especially on non-attendant operation and with the machine room. It also has an opening for clock 46.

On the face plate of the upper section in the upper portion are arranged two columns designated UWPI and DWPI of numerals, one on each side, which serve as waiting passenger indicators. These numerals are illuminated by lamps in back of them in the cabinet, those in the left hand column UWPI being controlled by the up landing buttons and those in the right hand column DWPI being controlled by the down landing buttons. Between these two columns are four columns of numerals, one column for each elevator. These numerals serve as car position indicators and are designated generally as CPI. The position indicator numerals also are illuminated by lamps in back of them in the cabinet. Below each position indicator column is a pair of jewels in the form of oppositely pointing arrows. These arrows serve as car travel direction indicators for the respective elevators and are designated CDI. The jewels in the upper row are of a green color and those in the lower row are of a red color as indicative of up and down respectively. These jewels are illuminated by lamps in back of them arranged in the cabinet. In a row beneath the car direction indicators are car non-stop indicators designated CNSL. These indicators are in the form of numerals indicative of the elevators for which the numerals are provided. These numerals also are illuminated by lamps arranged in back of the numerals in the cabinet. These lamps are controlled by the non-stop relays for the respective elevators. The circuits for the illuminating lamps for the waiting passenger indicator, direction indicators and non-stop indicators are not shown in the wiring diagrams.

Beneath the car non-stop indicator and in line with each column of car position indicators is a pair of dispatch indicators. Each of these indicators is in the form of a jewel arranged to be illuminated by a lamp in back thereof in the upper cabinet. Those in the upper row designated UDS are for indicating the car which is being dispatched on its upward trip and those in the lower row designated DDS are for indicating the car which is being dispatched on its downward trip. To the left of these jewels is a jewel designated SUL which is for indicating that a car is to be dispatched on an upward trip. On the right hand side is a similar jewel designated SDL for indicating that a car is to be dispatched on a downward trip. These jewels are illuminated by lamps in back of them. There are also signals in the elevator cars which will be referred to later.

Timing mechanism arranged on the control panel is provided for initiating dispatching at timed intervals. Several of the switches referred to in the description of the control system also exercise certain control of the dispatching circuits. Most of the other electromagnetically operable switches which have been listed are arranged in the dispatching circuits. Of these switches, the selecting switches VUR and VDR are of the notching type. Each selecting switch is provided with a pair of brushes, those for the up selecting switch being designated VURB1 and VURB2 and those for the down selecting switch being designated VDRB1 and VDRB2. These brushes are rotated in step by step movement by successive deenergizations of the switch operating coil. These successive deenergizations are effected by the momentary separation of contacts VUR1 for switch VUR and contacts VDR1 for switch VDR at the completion of a notching operation. Each brush engages a plurality of stationary contacts, one for each elevator, engaging one contact at a time upon each step of rotative movement. The contacts engaged by brush VDRB1 are designated VDRC1a, VDRC1b, VDRC1c and VDRC1d and those engaged by brush VDRB2 are designated VDRC2a, VDRC2b, VDRC2c, and VDRC2d, see Figure 6. The contacts engaged by brush VURB1 are designated VURC1a, VURC1b, VURC1c and VURC1d and those engaged by brush VURB2 are designated VURC2a, VURC2b, VURC2c and VURC2d. It will be assumed that the brushes of each selecting switch are moved in a direction to successively engage contacts for elevators a, b, c and d and back to the contacts for elevator a.

In the feed line W11 for the dispatching circuits is a service cut-out switch ACS. This switch is arranged on the control panel and is utilized for disconnecting the dispatching mechanism when it is desired to do service work on the system. A preference return cut-out switch is also arranged on the control panel. It will be assumed that these switches are closed.

For convenience of description assume that there are four cars under dispatching. For this condition cut-out switches DIC*a*, DIC*b*, DIC*c* and DIC*d* (Figure 5) are closed. Assume also that the throwover switch TO of each elevator is in "with attendant" position *w*. Assume further a period in which there is approximately equal traffic in both the up and down direction. For such condition traffic selector switch UDTS (Figure 3) is set in position 2. It is to be noted that the positions of this switch are numbered in circles to correspond with the positions of Figure 17. When the movable contact arm UDTSM engages the stationary contact in position 2, a circuit is completed for the coil of interim traffic switch VUD through day cut-out switch DCS. Switch VUD operates to engage contacts VUD2 which complete the circuit for the coil of up traffic switch VU. It also engages contacts VUD3 to complete a circuit for the coil of down traffic switch VD. Traffic switches VU and VD operate to engage contacts VU1 and VD2 in feed line W15. They also engage contacts VU3 and VD7 in feed line W11. The engagement of the latter contacts completes certain of the dispatching circuits. Among these circuits are the circuits for the coil of the car cut-out relays CS for each car, that for the coil of relay CS*a* for example being through contacts XCS1*a* and switch DIC*a*. Another circuit which is completed is for the coil of even car switch VE through contacts CS4*a*, CS4*b*, CS4*c*, CS4*d* and VUD4. Another circuit which is completed is that for the coil of signal relation switch VS through contacts VUU5, VDD5, VE4 and VO7. Another circuit that is completed is for the coil of instantaneous reset switch VL through contacts WB3*a*, WB3*b*, WB3*c* and WB3*d*. Another circuit is for the coil of instantaneous transfer switch VTR through contacts VL2. The engagement of contacts VU7 and VD11 completes circuits for up traffic light UTL1 and down traffic light DTL1 respectively.

To illustrate the selection of cars, assume that both car *a* and car *b* are at the bottom terminal at this time. Under such conditions selective dispatching brushes SDB*a* and SDB*b* on the synchronous panels of the selectors for elevators *a* and *b* respectively are in engagement with their stationary selective dispatching contact SDM*a* and SDM*b* for the main landing. For convenience all of the brushes are shown in this position in Figure 5. Thus with the engagement of contacts VU3 and VD7 in feed line W11, a circuit is completed for the coil of bottom terminal relay VB*a* through contacts XVB2*a*, WBX2*a*, XT1*a* and PR2*a* (assuming car *a* set for upward travel), contact SDM*a*, brush SDB*a*, contacts XCS1*a* and switch DIC*a*. A similar circuit is completed for the coil of relay VB*b*, assuming car *b* also set for upward travel. Relays VB*a* and VB*b* engage contacts VB3*a* and VB3*b* to complete a circuit for the coil of auxiliary instantaneous transfer switch VTX. Assuming that up selective switch brush VURB2 of the up selecting switch is in engagement with stationary contact VURC2*a* for elevator *a* at this time, no operation of the up selecting switch VUR takes place due to the fact that the circuit for its coil is broken at contacts VB2*a*. Thus car *a* is seleced to be the first to start from the lower terminal. Had brush VURB2 been in engagement with contact VURC2*b* for elevator *b* instead, no operation of the up selecting switch would have taken place because the circuit would have been broken at contacts VB2*b*. Under such conditions car *b* would have been selected as the first to leave. Should brush VURB2 have been in engagement with contact VURC2 for some other elevator at this time, switch VUR would be notched until a car is selected. Assuming that this brush had been in engagement with contact VURC2*c* for elevator *c*, the engagement of contacts VB3*a* and VB3*b* would complete a circuit for the coil of switch VUR through contacts VL1, VUR1 and VB2*c*, causing it to notch into engagement with contact VURC2*d* where a circuit is again completed for the coil of switch VUR through contacts VB2*d* upon the reengagement of contacts VUR1, causing the brush to notch into engagement with contact VURC2*a*, selecting car *a*.

With car *a* selected as the first to leave the bottom terminal, the other brush VURB1 of the up selecting switch is in engagement with stationary contact VURC1*a* for elevator *a* so that the circuit for the coil of elevator *a* bottom selection switch WB*a* is completed through contacts VB1*a* to register the selection. Switch WB*a* upon operation engages contacts WB4*a* and WB6*a* to complete the circuits by way of contacts CA1*a*, NS1*a*, ASM2*a* and PR7*a*, brush ULB*a* and contact ULC1*a* for the loading light LL*a* in the car and up hall lantern UHL1*a* at the bottom terminal. Thus both the car attendant and intending passengers are advised that car *a* is to be the first to leave the lower terminal. Switch WB*a* also engages contacts WB5*a* to complete a circuit for the coil of switch NT*a* which engages contacts NT4*a* to cause reopening of the doors if the car is parked with the doors closed. Switch WB*a* also separates contacts WB7*a* to prevent registration of a basement car call. It also separates contacts WB3*a* to break the circuit for the coil of switch VL, which drops out to deenergize switch VTR which in turn deenergizes switch VTX.

Upon the closing of contacts VU3 and VD7 a circuit is also completed by way of contacts VTC1 and VO7 for the coil of timing relay ZVT. Relay ZVT engages contacts ZVT4 which completes a circuit for the operating coil of interval relation switch CT through contacts SR2, VUA2, VDA3 and VTO2. Switch CT upon operation latches itself in operated condition. Relay ZVT also engages contacts ZVT1 completing the circuit for the coil of delayed timing relay YVT. Relay YVT engages contacts YVT2, completing the circuit for the coil of interval timing switch VTC. Switch VTC separates contacts VTC1, breaking the circuit for the coil of relay ZVT. Relay ZVT upon dropping out separates contacts ZVT4, breaking the circuit for the operating coil of switch CT. It also separates contacts ZVT1, breaking the circuit for the coil of relay YVT. Relay YVT drops out to separate contacts YVT2, breaking the circuit for the coil of switch VTC, but is delayed in doing so by the discharge of condenser QYVT to insure sufficient time for the charging of condenser QVTC in parallel with the coil of switch VTC. Relay YVT, upon dropping out, also engages contacts YVT1, completing a discharge circuit for condenser through resistances RVTC1, RVTC2, RVTC3 and RVTC4. Relay ZVT also engages contacts ZVT2 which completes a circuit through contacts CT3 for the coil of interval throw-over switch VTO.

Switch VTC does not drop out immediately the circuit is broken for its coil but is delayed for half a timing interval by the discharge of condenser QVTC. The amount of this interval is dependent on the setting of interval control ITS which varies the amount of resistance RVTC1 in the discharge circuit for the condenser. Resistor RVTC3 is also adjustable to set the maximum interval. When switch VTC drops out it reengages contacts VTC1 which reestablishes the circuit for the coil of relay ZVT which causes operation of relay YVT and thus switch VTC as before. Relay ZVT also separates contacts ZVT2 but the coil of switch VTO is maintained energized by way of contacts VTO1. In addition, relay ZVT engages contacts ZVT3 by-passing contacts CT3 in the circuit for the coil of switch VTO. It also engages contacts ZVT4 which complete circuits for the operating coils of up signal switch VUS and down signal switch VDS which latch themselves in operated condition. The circuit for the coil of switch VUS is through contacts VU5, VS6, VUA4, VTO3 and ZVT4, while the circuit for the coil of switch VDS is through contacts VD9, VUA4, VTO3 and ZVT4. A circuit is also completed for the reset coil of switch CT through contacts CT4, SR3, VUA4, VTO3 and ZVT4, causing switch CT to be reset. The reoperation of switch VTC deenergizes relay ZVT as before, with the result that the separation of contacts ZVT3 breaks the circuit for the coil of switch VTO and the separation of contacts ZVT4 breaks the circuit for the operating coils of switches VUS and VDS, these switches remaining latched in operated condition.

Switch VUS upon operation engages contacts VUS3, completing a circuit for the coil of auxiliary up signal switch VUA and through contacts VD10 for the operating coil of up holding switch VUH. Switch VDS upon operation engages contacts VDS4, completing a circuit for the coil of auxiliary down signal switch VDA and for the operating coil of down holding switch VDH. Switch VDA engages contacts VDA1 to complete a circuit by way of contacts VHR2 for the coil of reverse reset relay VRR. Switch VUA engages contacts VUA5 which completes a circuit through contacts VUP4 for the coil of up group signal switch WUS. Switch WUS engages contacts WUS2 completing a circuit through contacts VL3 for the holding coil of switch VUH by way of contacts VUH3, for the operating coil of detent holding switch VHO, and for the reset coil of switch VUS by way of contacts VUS4. Switch VUS drops out, separating contacts VUS3 and thus breaking the circuit for the coil of switch VUA and for the operating coil of switch VUH. Switch VUH is held in by its holding coil but switch VUA drops out separating contacts VUA5 in the circuit for the coil of switch WUS, this switch being held in however through its holding contacts WUS4 and contacts VL4. Switch VHO engages contacts VHO2 by-passing contacts VL3. Switch WUS also engages contacts WUS3, causing the lighting of starter's up light SUL. It also engages contacts WUS1 completing a circuit for the coil of up signal holding switch WBXa through contacts WB2a and PR2a, contact SDMa, brush SDBa, contacts XCS1a and switch DICa.

Switch WBXa upon operation engages contacts WBX4a to establish a holding circuit. It also engages contacts WBX5a to complete a circuit for the up dispatching light UDCa and gong UGNa in car a, advising the car attendant to start his car, and for the up dispatching light UDSa for car a at the starter's station, which with the lighting of light SUL advise the starter that an up signal has been given and that car a is the one that has received the up dispatching signals.

Switch WBXa also engages contacts WBX3a, completing a circuit for the coils of car direction switch CUa and signal recycling relay XSR through contacts VD5a and by way of contacts PR2a to line W11. It also separates contacts WBX2a, breaking the circuit for the coil of relay VBa. Relay VBa thereupon separates contacts VB1a to break the circuit for the coil of switch WBa. Switch WBa separates contacts WB2a, switch WBXa being held in through contacts WBX4a. It also separates contacts WB4a and WB6a, extinguishing the loading light LLa in car a and up hall lantern UHL1a for car a at the bottom terminal. Switch WBa also engages contacts WB3a to reestablish the circuit for the coil of switch VL. Switch VL separates contacts VL4 which breaks the holding circuit for the coil of switch WUS. Switch WUS upon dropping out separates contacts WUS2, breaking the circuit for the reset coil of switch VUS. Contacts WUS2 also break the circuit for the holding coil of switch VUH and for the coil of switch VHO which drop out. Switch WUS also separates contacts WUS3, breaking the circuit for starter's up light SUL.

Switch VL also engages contacts VL1, completing a circuit for the coil of switch VUR through contacts VB2a and VB3b, inasmuch as car b is assumed to be at the bottom terminal under which conditions relay VBb is operated. Switch VUR therefore notches into position to select car b as the next to leave. This results in the operation of switch WBb to cause lighting of the loading light in car b and the lighting of the up hall lantern for that car at the bottom terminal. Thus the signal change is effected immediately without waiting on car a leaving the terminal so that intending passengers and the starter are immediately advised that car b is to be the next to leave.

Upon receiving the up dispatching signals, the attendant in car a presses start button SBa, closing the door and gate and starting the car in the up direction as previously described. As the car leaves the floor, brush SDBa moves off contact SDMa, breaking the circuit for the coil of switch WBXa. Switch WBXa separates contacts WBX5a to discontinue the giving of the dispatching signals.

As previously pointed out, in the switching sequence which followed the dropping out of switch VTC at the end of half a time interval, switch VTC was reoperated. This restarts the timing operation for the giving of the next dispatching signals. At the end of the first half timing interval, switch VTC drops out as before. This causes the reoperation of relay ZVT with the result that the operating coil of switch CT is energized (assuming that a car has been dispatched and left the top terminal so that contacts VDA3 are engaged as will be explained later), causing this switch to latch itself in operated condition. Switches VUS and VDS are not operated at this time inasmuch as switch VS is operated, causing contacts VS4 to be separated and as switch VTO is not operated so that contacts VTO3 are separated. The dropping out of switch VTC initiates the start of another half timing interval as before and at the end of this second interval switch VTC again drops out, causing the dropping out of relay ZVT to cause the operation of switches VUS and VDS as before. This causes the operation of switches VUA, VUH, VDA and VDH. Switch VUA causes the operation of switch WUS thereby again lighting starter's up light SUL. Also switch WUS engages contacts WUS1 to complete the circuit through contacts WB2b and PR2b, contact SDMB, brush SDBb, contacts XCS1b and switch DICb, for the coil of up signal holding switch WBXb. Switch WBXb operates to complete the circuit for up dispatching light UDCb and gong UGNb in car b and for up dispatching light UDSb for car b at the starter's station, this operation taking place in the manner previously described for giving dispatching signals to car a. Thus under conditions of substantially equal up and down traffic the timing mechanism operates to initiate the giving of dispatching signals at the expiration of a full timing interval.

Switch WBXb also causes the dropping out of relay VBb which in turn causes the dropping out of switch WBb to discontinue the illumination of the loading light in car b and of the up hall lantern for car b at the bottom terminal.

With conditions of approximately equal up and down traffic now being discussed, there will probably be a car at the top terminal at the same time a car is at the bottom terminal. With the cars positioned as illustrated in Figure 1, car c is at the top terminal at the same time that car a is at the bottom terminal. It will be assumed that this is the case.

As car c was brought to a stop at the top terminal, its switches UP, XL and PR were dropped out and its switch DN was operated, as previously described for car a. Also, as the car reached the top terminal its brush SDBc engaged contact SDTc, completing a circuit for the coil of top terminal relay VTc. If brush VDRB2 of of the down selecting switch is in engagement with stationary contact VDRC2c at this time, no operation of the selecting switch takes place due to the fact that the circuit for its coil is broken at contacts VT2c. Thus car c is selected to leave the top terminal. Had brush VDRB2 been in engagement with another contact VDRC2 instead, a circuit would be completed through contacts VT3c for the coil of switch VDR and this switch would operate to notch its brush into engagement with contact VDRC2c to select car c.

With car c selected a circuit is completed through down selecting switch brush VDRB1 and stationary contact VDRC1c, for the coil of elevator c top selection switch WTc. This switch engages contacts WT1c to complete a circuit by way of contacts PR5c, brush DLBc and contact DLC9c for the down hall lantern DHL9c for elevator c at the top floor.

Upon the operation of relay VRR as the result of expiration of a half timing interval in the previously described operation of giving starting signals to car a at the bottom terminal, contacts VRR4 engage completing a circuit through contacts WT3c and XL2c for the down dispatching light DDCc and gong DGNc in car c, advising the car attendant to start the car, and also completing circuits for starter's down light SDL and down dispatching light DDSc at the starter's station, advising him that a down signal has been given and that car c is the one that has received the signal. Thus under the assumed conditions of operation, the timing mechanism operates to give up dispatching signals and down dispatching signals simultaneously.

Upon receiving the down dispatching signals, the attendant in car c presses his start button to start the car in the down direction. The resultant separation of contacts ASM2c extinguishes the down hall lantern DHL9c. Upon the operation of switch Ec, contacts E1c engage to complete a circuit by way of contacts XL4c and CU4c for the reset coil of switch CU which is reset. Contacts E1c also complete a circuit by way of contacts WT4c and XL4c for the coil of reset cut-out switch VHR, for the holding coil of switch VDH through contacts VDH3, and for the reset coil of switch VDS through contacts VDS3. Contacts XL4c prevent the establishing of these circuits by contacts E1c when the car is set for upward travel. This resets switch VDS but the resultant separation of contacts VDS4 does not drop out switch VDH as it is held in by its holding coil. However, the separation of contacts VDS4, in breaking the circuit for the coil of switch VDA, causes the switch to drop out. Switch VDA reengages contacts VDA3 which permits reoperation of switch CT on the next half timing interval. It also separates contacts VDA1, breaking the circuit for the coil of relay VRR. Relay VRR separates contacts VRR4, extinguishing down dispatching lights DDCc and DDSc and starter's down light SDL.

As the car leaves the top terminal, brush SDBc runs off contact SDTc, breaking the circuit for the coil of relay VTc. Relay VTc separates contacts VT1c, breaking the circuit for the coil of switch WTc. It also engages contacts VT2c but no further notching of switch VDR takes place as no other car is assumed to be at the top terminal. Switch WTc separates contacts WT4c, breaking the circuit for the coil of switch VHR and for the holding coil of switch VDH.

When a full timing interval has expired before a car arrives at the top terminal, down dispatching signals may be given to a car at a floor below in the event the car has reached its highest call. In the system as shown, down dispatching signals are given to a car at a floor in a selection zone (at the seventh or eighth floor with the circuits as shown), provided the timing mechanism has operated to cause operation of relay VRR, provided the car has reached its highest call (car call or down landing call) and provided further that there is no car at the top floor. If a car is at the top floor its VT relay will be operated and another car cannot be selected to receive starting signals until this relay VT drops out. The other factors involved in giving the dispatching signals to a late car have to do with the control of its highest landing call relay XS.

Referring to the circuits for car a, in so far as landing calls are concerned the circuit for the coil of relay XSa is controlled by the engagement of brushes HRB1a and HRB2a with stationary contacts HH for the various floors rendered alive by the registration of landing calls. The registration of a down landing call for a floor places potential on the stationary contacts HH for all floors below while the registration of an up landing call for a floor places potential on the stationary contacts HH for that floor and all floors below. Rectifiers VHH block the flow of current from each stationary contact to the stationary contact for the floor above while rectifiers VHD and VHU block the flow of current from the call pick-up contacts to other call pick-up contacts and thus prevent false stops and unwanted break down of call registering tubes. Rectifiers VBP parallel rectifiers VHH to minimize rectifier potential drop. The arrangement of the brushes and contacts is such that the following brush HRB2a runs onto a contact just before the leading brush HRB1a runs off the contact. This maintains a circuit for the coil of relay XSa until the following brush HRB2a runs off the highest live contact.

When set for conditions of approximately equal up and down traffic a circuit is maintained for the coil of relay XSa so long as brush HRB2a in its upward movement has not engaged contact HH7a, this circuit being from line B+ through contacts VO1 and VD3 to the HHa contact which is engaged by brush HRB2a, rectifier VHRB2a and contacts PR8a to line B. If when brush HRB2a engages contacts HH7a relay VRR has not operated, a circuit is completed for the coil of relay XSa through contacts VO1, VD3, VRR2 and VD4 through rectifier VHH8, contact HH7a, brush HRB2a, rectifier VHRB2a and contacts PR8a. If a landing call, say for example a down call at the eighth floor is in registration at the time brush HRB2a engages contact HH7a, a circuit is established for the coil of relay XSa even though relay VRR is operated to separate contacts VRR2. This circuit is through the tube of button D8 and rectifier VHD8 to contact HH7a and thence through the coil of relay XSa as above traced. A similar circuit is established in the event that a down call is registered for the ninth floor, or an up call is registered for either the eighth or seventh floor. A down call for the seventh floor does not maintain this circuit as current flow from the tube to brush HRB2a is blocked by rectifier VHH7. If a car button is pressed for a floor whose hook switch HCa has not yet been opened by brush HCBa on upward travel, the circuit for the coil of highest car call relay XCa is completed through the operated car button and the hook switch for the corresponding floor and thence through the hook switches in series for floors above. Thus with a car call say for the eighth or ninth floor at the time that brush HB2a engages contacts HH7a, the coil of relay XCa is energized by way of car button C8a, hook switch HC8a and contacts DN1a, causing contacts XC2a to be in engagement, thereby providing another circuit for the coil of relay XSa.

Assuming that as car a approaches the seventh floor and its brush HRB2a engages contacts HH7a no car call is in registration for a floor above, no landing call is in registration for a floor above, no up call is in registration for the seventh floor and the timing mechanism is operated to cause separation of contacts VRR2, relay XSa is deenergized. Relay XSa is also deenergized under conditions where the car is required to travel to the eighth floor by either a car call or down call for that floor if when brush HRB2a engages contact HH8a no up call is registered for the eighth floor, no call is registered for a floor above and contacts VRR2 are separated. When relay XSa drops out it engages contacts XS2a to complete a circuit by way of contacts CU1a for the coil of relay VTa, selecting car a to receive the down dispatching signals. It also engages contacts XS3a which, together with the engagement of contacts WT2a as a result of the selection of car a, completes a circuit by way of contacts ASM1a, EA1a and XL1a for the coil of automatic return relay XHa and for the operating coil of down dispatch reset switch VSRa. Switch VSRa upon operation engages contacts VSR3a, completing a circuit through contacts CU4a for the reset coil of switch CUa, and a circuit through contacts WT4a for the coil of switch VHR, for the holding coil of switch VDH and for the reset coil of switch VDS. Switch CUa, upon dropping out, separates contacts CU1a, the circuit for the coil of relay VTa being maintained through contacts VT4a and DN3a. The reset of switch VDS causes the dropping out of switch VDA and in turn of relay VRR as previously described. Relay XHa upon operation separates contacts XH2a to deenergize relay PRa. It also engages contacts XH4a which with the closing of switch SIS a completes a circuit for the neutralizing coil of stopping magnet SMa, causing the car to be slowed down and brought to a stop at the landing for which the HHa contact engaged by brush HRB2a, is provided. Relay PRa, upon dropping out, engages contacts PR5a which, together with the reengagement of contacts ASM2a as a result of the separation of contacts SM1a, completes a circuit for the down hall lantern DHLa for the floor at which the stop is to be made. Relay PRa also engages contacts PR4a to render brush DPBa effective and thus cause the automatic cancelling of a down call at that landing if registered.

As the car is brought to a stop, a circuit is completed through contacts XH3a for the coils of switches UPa and DNa to set the direction of car travel for down. The operation of switch DNa causes separation of contacts DN3a, breaking the circuit for the coil of relay VTa. This relay drops out, separating contacts VT1a to break the circuit for the coil of switch WTa. Switch DNa also separates contacts DN4a which breaks the circuit for the coil of relay XLa. Relay XLa in dropping out separates contacts XL1a which breaks the circuit for the coil of relay XHa, the coil having been maintained energized by way of contacts XH1a after the separation of contacts ASM1a. Relay VSRa is not dropped out as a result of the separation of contacts XL1a, a circuit being completed for its holding coil by contacts H3a through contacts VSR2a as the car is brought to a stop. Relay XLa also engages contacts XL2a which completes a circuit by way of contacts VSR1a for the down dispatching signals for car a. Upon the starting of the car in the down direction, contacts H3a separate, breaking the circuit for the holding coil of relay VSRa and this relay drops out. Thus contacts VSR1a are separated, extinguishing the down dispatching lights for car a.

It will be noted that the signal switches VDS and VUS upon being operated are maintained in operated condition so that if there is no car in condition to receive up dispatching signals or down dispatching signals at the time these switches are operated, such signals may be given immediately the car becomes eligible to receive them. Thus, in the example of operation given above with reference to giving the down dispatching signals to a car in the selection zone, switch VDS, if operated before the car has answered its highest call, is maintained operated so that as soon as this call is answered the down dispatching signals may be given. Similarly, should no car be at the bottom terminal at the time switch VUS is operated, this switch is maintained operated so that upon the arrival of the car at the bottom terminal it is immediately given the up dispatching signals. The operation of switch VUS under such conditions causes the lighting of starter's up light SUL to advise the starter that the timing mechanism has operated. Since no car is there, no switch WBX is operated and thus no up dispatching signals are given. Thus the starter is advised that no car is at the bottom terminal to receive the dispatching signals. Similarly, the operation of switch VDS under the above described conditions causes the lighting of starter's down light SDL and as no dispatching light DDS is lighted the starter is advised that no car is in condition to receive down dispatching signals.

Assume that no car is at the bottom terminal at the expiration of the dispatching interval. As soon as a car, say car $a$, arrives at the bottom terminal, it is selected to receive the dispatching signals and switch WBX$a$ is operated causing these signals to be given immediately. Incident to the selection of car $a$, contacts WB3$a$ separate, deenergizing switch VL which separates contacts VL2. This breaks the circuit for the coil of switch VTR. However, switch VTR does not drop out immediately, being delayed for a certain time interval, say three seconds, by the discharge of condenser QVTR. Upon dropping out, switch VTR separates contacts VTR1, breaking the circuit for the coil of switch VTX. Contacts VTX1$a$ thus remain in engagement for this given time interval, thereby preventing the dropping out of relay VB$a$ and switch WB$a$ as a result of the separation of contacts WBX2$a$. Thus the lighting of the up hall lantern UHL1$a$ at the bottom terminal is assured for the predetermined interval, thus allowing ample time for intending passengers to notice the lantern. Also this delays the immediate lighting of the loading light and hall lantern for another car should it arrive at the bottom terminal during this period. However, if for any reason should the start button be pressed to start the car before the time interval expires, the auxiliary reset switch XT$a$, the coil of which is connected in parallel with the brush motor BM$a$, is operated, separating contacts XT1$a$ to break the circuit for the coil of relay VB$a$. This causes the hall lantern to be immediately extinguished.

Assume now that no car is at the top terminal at the expiration of the dispatching interval. As soon as a car arrives at the top terminal, it is selected and the dispatching signals are immediately given. Also if a car has reached its highest call these signals may be given to that car in the selection zone as previously described.

It may happen that there is an abnormal delay in the arrival of a car at the bottom terminal. In such event the timing mechanism may have completed another half timing interval. When no car is at the bottom terminal, switch VUS is not reset, as switch VL is operated separating contacts VL3. If this condition exists when the half timing interval expires, the engagement of contacts ZVT4 completes a circuit for the coil of detent switch VDE through contacts VUA3, VS5 and VT02. Switch VDE engages contacts VDE1 to establish a holding circuit for the coil of relay ZVT, thereby maintaining switch VTC and relays ZVT and YVT in operated condition and suspending further timing operations. This is known as a detent operation. As soon as a car arrives at the bottom terminal it is selected to leave and the dispatching signals are immediately given. Also the timing mechanism is restarted in operation as a result of the reengagement of contacts VL3 to reset switch VUS and thus effect the separation of contacts VUA3. The separation of contacts VUA3 deenergizes switch VDE which separates contacts VDE1 to break the holding circuit for the coil of relay ZVT. Also the reengagement of contacts VUA2 causes the reoperation of switch CT at this time. The up hall lantern at the bottom terminal for the selected car is maintained lighted for the predetermined interval as described above.

Similarly, there may be such abnormal delay in the arrival of the car at the top terminal or in the selection zone that the timing mechanism may have completed another half timing interval before the car leaves the top terminal or is selected in the selection zone to receive the dispatching signals. Switch VDS is maintained operated under such conditions causing contacts VDA4 to be engaged and thus the operation of switch VDE at the half timing interval to cause a detent operation. Should a car be required to travel to the top terminal, switch VDS is reset as the car is started downwardly from the top terminal as previously described. This releases the detent causing the separation of contacts VDE1 to restart the timing mechanism in operation. If a car is not required to travel to the top terminal, the control of detent switch VDE is subject to the conditions in the selection zone. If no car is in the selection zone at the time switch VDE is operated, as a car reaches the lowest floor in the zone, it is selected to receive the down dispatching signals and switch VDS is reset as previously described, provided it has no call for a floor in the zone. The reset of switch VDS causes separation of contacts VDA4 which deenergizes switch VDE to restart the timing mechanism in operation. If the car entering the zone has a call in the zone or if the car is already in the zone at the time switch VDE operates and has not reached its highest call, switch VDS is reset as the car answers its highest call and the timing mechanism is restarted in operation. Thus, under such conditions of operation the timing mechanism is restarted before the down dispatching signals are given.

It is to be noted that with this arrangement the timing mechanism is detented whenever a car has not arrived at the bottom terminal when another half timing interval expires and also when no car is assigned down dispatching signals in the selection zone when the additional half timing interval expires or, when a car has not left the top terminal in response to down starting signals before the expiration of this half interval. When a detent occurs due to a car not having arrived at the bottom terminal, the detent is released as soon as a car arrives. When a detent occurs under conditions where a car travels to the top terminal and then receives down dispatching signals, the detent is not released until the car leaves. When a detent occurs due to no car being assigned down dispatching signals in the selection zone at the time the additional half timing interval expires, the detent is not released until a car is assigned the signals.

When two or more cars are at the bottom terminal, the up hall lantern of each car which is not selected is not lighted so that incoming passengers are attracted only to the selected car. Under such conditions the attendant of each unselected car, indicated by the loading light not being lighted, may close the door and gate by pressing for example door close button DCB$a$ in car $a$. This completes a circuit through throw-over switch TO7$a$ for the coil of relay XDC$a$, causing the engagement of contacts XDC1$a$ to effect the door and gate closing operation. As soon as the car is selected he is so advised by the lighting of the loading light and he may then reopen the door and gate without starting the car by pressing door open button DOB2a which completes a circuit through contacts TOSY3a for the coil of door open switch DOa.

It is thus seen from the above description that when the cars are operating under approximately equal up and down traffic conditions with switch UDTS in position 2 a car, upon arrival at the bottom terminal floor and becoming set for travel in the up direction under conditions where no other car is at that floor, is selected to be the next to leave. Its loading light is lighted to advise the attendant that it has been selected and the up hall lantern for that car is lighted to advise intending passengers that this car has been selected as the next to leave. Upon operation of the timing mechanism the up dispatching signals are given. Also the loading light and up hall lantern are extinguished and circuits are set up to permit the selection of another car upon its arrival at the bottom terminal. Upon the car being started in the up direction, the dispatching signals are discontinued. The timing mechanism operates to initiate the giving of the dispatching signals at timed intervals so that in this way the cars are started from the bottom terminal with regularity.

Similar operation is had as regards starting the cars from the top terminal. If a car arrives at the top terminal under conditions where no other car is at that terminal, it is selected to be the next to leave, the down hall lantern at that floor lighting to advise any intending passengers who may be at that floor of this fact. Upon operation of the timing mechanism, the down dispatching signals are given to the car. Upon the car being started in the down direction, the signals are discontinued.

Due to traffic conditions or other causes, cars may be delayed in their upward trip so that no car is at the top terminal when the time for the giving of the down dispatching signals has arrived. Under such conditions an up travelling car, if in the selection zone or upon its arrival in that zone and provided it has reached its highest call, is brought to a stop and becomes set for travel in the down direction. Also it receives the down dispatching signals so that it is started in the down direction from the floor at which the stop was made.

If two cars are in the selection zone and are eligible to receive their down dispatching signals, the selecting switch for the down selecting circuit acts to select but one of the cars. Thus, because of its contacts WT2, only the car selected will establish the circuit for its relay XH and switch VSR. Thus only the selected car will be slowed down and brought to a stop and given the down dispatching signals. The other car is selected as soon as the selected car has become set for downward travel. However this last selected car can not receive the dispatching signals until the timing mechanism has again operated switch VRR.

Under conditions of abnormal delay, the timing mechanism is detented. The detent may occur as a result of a car being late in arriving at the bottom terminal or leaving the top terminal and also as a result of a car not being available to receive the down dispatching signals in the selection zone.

Up to this point the description of the operation of the dispatching system under conditions of approximately equal up and down traffic has been on the assumption that all cars of a four car installation were under dispatching. The same operation of the control mechanism is had with installations where the cars under dispatching is of a greater number, say six. When the cars under dispatching is of an odd number, the operation of the dispatching system is somewhat modified.

Whether the cars under dispatching are of an even or an odd number automatically determines the control of even car switch VE. A car is placed under dispatching by closing its DIC switch and conversely a car is removed from dispatching by opening its switch DIC. Thus the car cut-out relay CS for a car is operated or deenergized depending on whether the car is under or out of dispatching. The contacts of the various CS relays control the circuit for the coil of switch VE. Thus with all four cars under dispatching, contacts CS4a, CS4b, CS4c and CS4d are all closed, completing the circuit for the coil of switch VE. Also a circuit is completed for this coil if only two of the cars are under dispatching. The circuit in case these cars are cars a and b is through contacts CS4a, CS4b, CS2c and CS2d. In case these cars are cars a and c the circuit is through contacts CS4a, CS5b, CS3c and CS2d. In case these cars are cars a and d the circuit is through contacts CS4a, CS5b, CS5c and CS4d. In case these cars are cars b and c the circuit is through contacts CS2a, CS3b, CS3c and CS2d. In case these cars are cars b and d the circuit is through contacts CS2a, CS3b, CS5c and CS4d. In case these cars are cars c and d the circuit is through contacts CS2a, CS2b, CS4c and CS4d. With only three cars under dispatching, the circuit for the coil of switch VE is broken at the CS4 contacts for the car that is not under dispatching. Thus switch VE is operated when the cars under dispatching are of an even number and are not operated when the cars under dispatching are of an odd number.

The same principle applies for an installation of a greater number of cars. Contacts CS2, CS3, CS4 and CS5 are provided in the circuit for the coil of switch VE for each of the intermediate elevators of the alphabetical sequence from left to right and are positioned in the circuits in the alphabetical sequence of the elevators. These contacts for elevators b, d, f, etc. are connected in the same manner as is shown for car b, and those for elevators c, e, g, etc., are connected in the same manner as is shown for car c. As for the CS contacts for the elevator at the right end of the sequence, in the case of an even number of elevators only contacts CS2 and CS4 are provided and connected as shown for these contacts for car d, and in the case of an odd number of elevators only contacts CS2 and CS3 are provided and connected as shown for these contacts for car c.

When switch VE is not operated due to an odd number of cars being under dispatching, the up dispatching signals and the down dispatching signals are controlled to be given alternately. Contacts VE2 are separated when switch VE is not operated so that the circuit for the coil of signal relation switch VS is broken. As a result, the control of the operating coils of signal switches VUS and VDS is modified due to the change in condition of contacts VS4, VS5, VS6 and VS7. Upon the dropping out of switch VTC at the end of each half timing interval under the conditions assumed, either switch VUS or switch VDS is operated, depending upon the condition of switch VTO. Assuming that switch VTO is deenergized, upon the next reengagement of contacts ZVT4 due to the dropping out of switch VTC, a circuit is completed for the operating coil of switch CT as before. A circuit is also completed for the operating coil of switch VUS through contacts VU5, VS4, VDA3 and VTO2. No circuit is completed for the operating coil of switch VDS at this time at contacts VS5, VS6 and VTO3 are separated. Thus under such conditions the dispatching signals are given only to a car at the bottom terminal. Switch VTO is also operated incident to the operation of switch CT as previously described so that upon the reengagement of contacts ZVT4 at the end of the next half timing interval a circuit is completed for the operating coil of switch VDS through contacts VD9, VUA4 and VTO3. No circuit is completed for the operating coil of switch VUS at this time as contacts VS6, VS5 and VTO2 are separated. Thus under such conditions only the down dispatching signals are given. Also switch CT is reset and switch VTO is dropped out as before. Also the reset of switches VUS and VDS is effected in the manner previously described.

In the event that a car is late the giving of the dispatching signals is delayed until the car arrives at the terminal, or in the case of down dispatching signals until a car becomes available to receive them, that is, it has reached the selection zone and also has reached its highest call, whereupon they are given as the car is brought to a stop. This is the same as previously described. However the control of the coil of switch VDE to effect a detenting operation in the event that a car is abnormally late is somewhat modified. In case a car has not arrived at the bottom terminal at the expiration of the next half timing interval, the circuit for the coil of switch VDE is completed by the engagement of contacts ZVT4 through contacts VUA3, VS7 and VTO3. The circuits for the operating coil of switch VDS and reset coil of switch CT are not completed at this time as contacts VUA4 are separated. Thus further operation of the timing mechanism is prevented until a car arrives at the bottom terminal. As soon as this occurs, the timing mechanism is restarted in operation as a result of the selection of the car to effect the reengagement of contacts VL3 and thus the reset of switch VUS. This causes the separation of contacts VUA3 and thus breaks the circuit for the coil of switch VDE, causing the separation of contacts VDE1 in the circuit for the coil of relay ZVT to initiate the reoperation of the timing mechanism as previously described. Also, the circuits are completed at the same time for the operating coil of switch VDS and reset coil of switch CT as a result of the reengagement of contacts VUA4, permitting the immediate giving of the down dispatching signals. In this connection it is to be noted that switch VDE is delayed slightly in dropping out by the discharge of current from its coil into resistance RVDE. This insures contacts ZVT4 remaining in engagement long enough to effect the operation of switch VDS and the reset of switch CT. In case a car is half an interval or more late in becoming available in the selection zone or in leaving the top terminal, a circuit is completed for the coil of switch VDE by the engagement of contacts ZVT4 through contacts VDA4 and VTO2. The circuits for the operating coils of switches CT and VUS are not completed at this time as contacts VDA3 are separated. As soon as switch VDS is reset as a result of a car becoming available in the selection zone or leaving the top terminal, the timing mechanism is restarted in operation and switches CT and VUS are operated.

When car $a$ is selected at the bottom terminal contacts WB7$a$ separate, preventing the registration of a basement car call. However, if conditions warrant, the starter may temporarily take the car out of dispatching by opening switch DIC$a$ in which event contacts WB7$a$ engage, permitting the registration of this call with the consequent engagement of contacts BF1$a$ to set the direction circuits for down so that the car will go to the basement upon pressing of the starting button. It is to be noted that if a basement car call is registered before the car arrives at the bottom terminal on its downward trip, relay BF$a$ in preventing a change in direction of car travel when a stop is made at the bottom terminal maintains contacts PR2$a$ separated and thus prevents the car being selected as the stop is made. Thus contacts WB7$a$ are not separated so that the basement call remains registered.

Assume now a period in which the traffic is substantially all in the up direction, as during the morning incoming peak. For such condition, traffic selection switch UDTS is set in position 1. In this position interim traffic switch VUD is not operated and as contacts VUD3 are separated down traffic switch VD also is not operated. As a result of switch VD not being operated, contacts VD9 are separated, preventing the operation of switch VDS in response to the timing mechanism. Also contacts VD10 are separated, preventing operation of switch VUH and contacts VD11 are separated so that light DTL1 is not lighted. Contacts VD8 are engaged, causing starter's down light SDL to be continuously lighted. This is to advise the starter that a car will be given its down dispatching signal as soon as it arrives at its upper reversal point. Also contacts VD6 are engaged, completing a circuit for the coil of return cut-out switch VC. With switch VUD not operated, its contacts VUD6 complete a circuit for the coil of switch VS, rendering switch VUS subject to each second half timing interval. Up traffic switch VU is operated, and owing to the fact that contacts VD1 are now engaged, the circuit for the coil of up peak switch VUP is also completed. As a result switch VUP is operated, causing contacts VUP3 and VUP7$a$ to be separated, preventing the registration of either a basement landing call or a basement car call and thus eliminating basement service during up peak operation. Also, contacts VUP5 are engaged to insure that switch VDS is reset. Contacts VU7 are in engagement so that light UTL1 is lighted.

The lighting of the loading lights and the up hall lanterns at the bottom terminal under up peak traffic conditions is controlled in the same manner as described for equal up and down traffic conditions. That is, as soon as a car arrives at the bottom terminal and is selected, its loading light LL and up hall lantern UHL1 are lighted. Thus the intending passengers are advised which car to take and the car attendant is advised to take on passengers. The loading light and up hall lantern are extinguished upon operation of switch WBX to give the dispatching signals and there will be instantaneous lighting of the hall lantern for another car in case there be another car at the bottom terminal.

Instead of initiating the giving of up dispatching signals to cars at the bottom terminal at regular intervals of time as under conditions of approximately equal traffic in both directions, the signals are given to a car as soon as it is fully loaded, or if no car is fully loaded they are given a certain time after the departure of a car from the bottom terminal, depending on conditions at the expiration of the second half timing interval. Under up peak conditions, the timing mechanism is controlled so that the timing interval starts from the time of last departure of a car from the bottom terminal. Should a car at the bottom terminal become fully loaded, say to 80% of capacity, its up dispatching signals are given without waiting on the timing mechanism. However, assuming no car becomes fully loaded, a selected car is given its up dispatching signals at the expiration of a full timing interval after the last departure of a car, provided there is another car at the bottom terminal to receive further passengers. If not, the giving of the dispatching signals is delayed either until the arrival of another car or the expiration of another half interval, whichever occurs first. If there be no car at the bottom terminal at the expiration of this additional half interval, the dispatching signals are given to a car as soon as it arrives.

In order that these operations may be fully understood, assume that a car, say car $a$, at the bottom terminal becomes fully loaded before the time arrives for the timing mechanism to give up dispatching signals. When this car stopped at the bottom terminal, the separation of contacts H2$a$ broke the circuit for the coil of time delay switch TUD$a$. This switch does not drop out immediately, being delayed for a certain time interval by the discharge of condenser QTUD$a$. When this switch drops out it engages contacts TUD2$a$. With the car fully loaded, load dispatching switch LDS$a$ operated by the load in the car is closed, completing a circuit by way of contacts VUP1, TUD2$a$ and PR2$a$, contact SDM$a$, brush SDB$a$, contacts XCS1$a$ and switch DIC$a$ for the coil of switch WBX$a$. This switch operates as above described to give the dispatching signals to the car and, assuming that car $a$ is a selected car and has its loading light LL$a$ and up hall lantern UHL1$a$ lighted, to discontinue the lighting of these lights. At the same time that the circuit is completed for the brush motor BM$a$ in starting the car, a circuit is completed for the coil of auxiliary reset switch XT$a$. Switch XT$a$ separates contacts XT1$a$ to cause the deenergization of relay VB$a$ and thus the extinguishing of the hall lantern. It also engages contacts XT2$a$, completing a circuit for the coils of switch CU$a$ and signal recycling relay XSR. Contacts VD5$a$ being separated render contacts WBX3$a$ ineffective to control switch CU$a$ under up peak conditions. Relay XSR upon operation engages contacts XSR1, completing the circuit through contacts VUP8 for the coil of signal recycling switch SR. Switch SR separates contacts SR2 to prevent energization of the operating coil of switch CT at this time and also engages contacts SR4 to effect the reset of switch CT if operated. This also insures the dropping out of switch VTO if operated. Contacts SR3 prevent the establishment of unwanted circuits by the engagement of contacts SR4. Contacts SR1 cause operation of relay YVT, reestablishing the charging circuit for condenser QVTC. As the car leaves the terminal and brush SDB$a$ disengages contact SDM$a$, the circuit is broken for the coil of relay XSR which drops out to deenergize switch SR. Switch SR separates contacts SR1, breaking the circuit for the coil of relay YVT. Thus relay YVT separates contacts YVT2 to discontinue the charging of condenser QVTC, thereby starting a new timing interval from the time of departure of the car.

Assume now that a car is at the bottom terminal, and is selected, causing its loading light and up hall lantern to be lighted, but that it does not become fully loaded before a full timing interval has expired. Switch CT is operated at the end of the first half interval and switch VUS is operated at the end of the second half interval as previously described. Assume further that at this time two cars say cars $a$ and $b$ are at the bottom terminal. As relays VB$a$ and VB$b$ are operated, the coil of multiple car switch VCO is connected in the diagonal of a bridge circuit which is connected across feed lines W10 and W11 through contacts VUP2 and contacts VB3$a$ and VB3$b$. This bridge comprises resistors RVCO2, RVCO3 and RVCO4 forming three of the legs, the other leg comprising resistors RVCO1 of a number depending on the number of cars at the bottom terminal. Under the assumed conditions contacts VB4$a$ and VB4$b$ are engaged so that there are two resistors RVCO1$a$ and RVCO1$b$ connected in the other leg of the bridge. This creates an unbalance, causing operation of switch VCO. Switch VCO engages contacts VCO1, the circuit for the coil of switch WUS being rendered subject to this contact by the separation of contacts VUP4. Thus a circuit is established for the coil of signal switch WUS by the engagement of contacts VUA5 at the end of the full timing interval. Switch WUS causes the giving of the up dispatching signals to the selected one of these cars as previously described. It also causes the extinguishing of the loading light and up hall lantern, permitting the immediate lighting of these lights for the other car.

If there is no car at the bottom terminal at the end of the full timing interval or if there is only one car there at this time, switch VCO is not operated. Switch VCO is not operated when there is only one car there because the bridge circuit is balanced under such conditions. Thus no dispatching signals are given to a car at the bottom terminal when there is only one car there at the end of a full timing interval. However, should another car arrive before the expiration of the next half timing interval, dispatching signals are given immediately to the selected car due to the immediate operation of switch VCO. Should the car at the bottom terminal become fully loaded before the expiration of the next half timing interval or the arrival of another car, it is given its dispatching signals as above described. Under such conditions the switch VUS is reset by contacts SR5 incident to the starting of the car.

If there is only one car at the bottom terminal at the end of the next half timing interval, the engagement of contacts ZVT4 completes a circuit for the coil of switch VDE through contacts VUA3, VS5 and VTO2. Switch VDE engages contacts VDE2 to complete a circuit for the coil of switch WUS through contacts VUP6. Thus the dispatching signals are given to the car at the bottom terminal. Also the operation of switch WUS effects the reset of switch VUS and thus the separation of contacts VUA3 to break the circuit for the coil of switch VDE. The timing interval is again established from the time the signalled car leaves the floor as previously described.

If no car is at the bottom terminal at the end of one and a half timing intervals, the operation of switch VDE suspends further operation of the timing mechanism. However, owing to the fact that switch WUS is operated, as soon as a car arrives it is given its dispatching signals. The up hall lantern is lighted incident to the selection of the car and is maintained lighted for a predetermined time interval as a result of the operation of switches VL, VTR and VTX as previously described. Also switch VDE is deenergized, enabling the timing mechanism to resume operation, the interval being reestablished from the departure of the car as set forth above.

Thus under conditions of up peak traffic, the cars at the bottom terminal are given their up dispatching signals as soon as fully loaded. If not fully loaded, the car must wait on the giving of time dispatching signals. The timing interval is started at the time a car departs and the time dispatching signals are given at the expiration of a full interval provided two or more cars are at the bottom terminal or, if at least two cars are not there at that time, as soon as two cars are at the bottom terminal provided this occurs before the expiration of one and one half intervals. If the above conditions are not fulfilled but there is a car at the bottom terminal at the expiration of one and one half intervals, the dispatching signals are given this car as this period expires. However, if there be no car there at that time, the dispatching signals are given to a car as soon as it arrives.

The cars on their upward trips answer their car calls and up landing calls and on their downward trips answer their car calls and down landing calls. Also a down call may be responded to on an upward trip provided it is the highest call. The down dispatching signals are given as soon as a car answers its highest call, that is, car call or down landing call. It is to be noted that, under up peak conditions, the deenergization of the XS relays is not dependent on either the timing mechanism or the cars being in the selection zone, owing to the fact that contacts VD4 and VD3 are separated. Contacts VD3 being separated do not maintain the coils of relays XS energized until the cars reach the selection zone and contacts VD4 being separated prevent control of the XS relays by contacts VRR2. Thus if the highest call for a car is at an intermediate floor, as soon as the car reaches this call its XS relay is denergized. Owing to the fact that switch VC is now operated, as soon as this highest call is reached the automatic return relay XH and down dispatch reset switch VSR for the car are operated. Assume that car $a$ has reached such highest call. The dropping out of relay XS$a$ causes the reengagement of contacts XS3$a$ which completes a circuit for the coil of relay XH$a$ and the operating coil of switch VSR$a$ through contacts VC1$a$, ASM1$a$, EA1$a$ and XL1$a$. This causes the slowing down and stopping of car $a$ at the landing for which such call is registered, the automatic cancelling of the call where the stop is being made in response to a down landing call, the lighting of the down hall lantern, and the changing of the direction of travel to down and the giving of the down dispatching signals as the car comes to a stop, all of which has been previously described.

It is to be noted that the giving of the down dispatching signals as above described is not dependent on the selecting mechanism. Thus should two cars reach their highest calls at intermediate floors at substantially the same time, their XS relays are deenergized and both cars get their down dispatching signals as they are brought to a stop. Similarly, should two cars be travelling upwardly under conditions where only one landing call is registered above them, upon the leading car picking up this call the following car, if it has no car button pressed for a floor above it, loses its circuit for its relay XS, thereby completing the circuit for the coil of its relay XH and for the operating coil of its switch VSR, causing the car to be slowed down and brought to a stop at the next floor at which a stop can be made, whereupon it is set for travel in the down direction and the down dispatching signals given.

If a car has a car call for the top terminal or a landing call exists for that terminal, the car answering the call does not operate its XH relay or switch VSR. Referring to the circuit for car $a$, this is due to the fact that in case of a car call, car button C9$a$ is not released until the car is brought to a stop and the change in direction set up effected. This maintains relay XS$a$ energized by way of contacts XC2$a$ until after contacts ASM1$a$, EA1$a$ and XL1$a$ are separated, thereby preventing the completion of the circuit for the coils of relay XH$a$ and switch VSR$a$. In case of a landing call, the call is not automatically cancelled to deenergize relay XS$a$ until switch ASM$a$ is deenergized, as the dropping out of this switch prevents the completion of the circuit for relay XH$a$ and switch VSR$a$. Under such conditions the down dispatching signal circuit is completed through contacts XL2$a$, WT3$a$ and VD8 as the car comes to a stop and its direction set up is changed. Switch WT is reset as the car leaves the floor, as previously described, which discontinues the giving of the signals.

Thus under up peak traffic conditions the cars are dispatched from the bottom terminal as soon as fully loaded. If not fully loaded the selected car is dispatched from the bottom terminal a full timing interval after the departure of the preceding car, provided there is another car there, or if no other car is there, one half timing interval later or immediately upon the arrival of another car, whichever is first. If no car is at the bottom terminal at the expiration of an interval and a half, it is given the dispatching signals as soon as it arrives. If there is no call for the top terminal, each car stops at the intermediate floor for which its highest call exists and is given its down dispatching signals as soon as it comes to a stop so that the car may return immediately to the bottom terminal for taking on more passengers.

Assume now a period in which the traffic is substantially all in the down direction, as during the evening outgoing peak. For such conditions traffic distributor switch UDTS is set in position 5. In this position up traffic switch VU and up peak switch VUP are not operated. Down traffic switch VD is operated and, owing to the fact that contacts VU2 are engaged, down peak switch VDP is operated. With switch VU not operated, contacts VU5 are separated rendering the timing mechanism ineffective to control the giving of up dispatching signals. Contacts VU6 are separated, rendering switches VTR and VTX ineffective. Also contacts VU7 are engaged to cause up traffic light UTL1 at the starter's station to be lighted. With switch VD operated, contacts VD9 and VD10 are engaged, rendering the timing mechanism effective to control the giving of the down dispatching signals. Also contacts VD11 are engaged causing the lighting of down traffic light DTL1. With switch VDP operated contacts VDP4 are engaged, causing the continuous lighting of starter's up light SUL. This is to advise the starter that down travelling cars are to be given their up dispatching signals immediately they arrive at the bottom terminal. Also contacts VDP3 and VDP8a are separated, preventing the registration of either a basement landing call or a basement car call and thus eliminating basement service during down peak operation.

So long as traffic conditions are such that passengers wishing to travel in the down direction do not have to wait unduly for a car, the down dispatching signals are given in the same way as described for conditions of approximately equal up and down traffic. That is, if a car arrives at the top terminal before the expiration of a full timing interval, it is selected and given its down signals upon operation of relay VRR at the expiration of the interval. As contacts VD3 are engaged, a car always travels to the selection zone and as contacts VD4 are engaged the extent of upward car travel is also subject to the timing mechanism. Thus, if a car arrives at the top terminal floor before the expiration of the full timing interval, the down dispatching signals are assigned to the car at the top terminal. If the interval expires before a car reaches the top terminal, the down dispatching signals are assigned to a car in the selection zone upon its reaching its highest call. If a car is abnormally late a detenting operation takes place.

When a car arrives at the bottom terminal and becomes set for travel in the up direction, the up dispatching signals are given the car immediately. Taking for example car a, as it arrives at the bottom terminal and becomes set for travel in the up direction so as to engage contacts PR2a, its bottom terminal relay VBa is operated. The resultant engagement of contacts VB1a completes a circuit for the coil of bottom selection switch WBa through contacts VDP2a of the down peak switch. Switch WBa engages contacts WB2a to complete a circuit for the coil of up signal holding switch WBXa through contacts VU4 and PR2a, contact SDMa, brush SDBa, contacts XSC1a and switch DICa. Switch WBXa engages contacts WBX5a and thus a circuit is completed immediately for the dispatching signals for car a. Thus this car may start immediately in the up direction.

During down peak conditions, certain cars are selected to handle passengers desiring to be carried in the up direction. In the circuits as illustrated, cars a and b are selected to handle this traffic. To provide this operation, the up hall lanterns at the bottom terminal for cars a and b, are continuously lighted, thereby attracting any incoming passengers to these elevators. The loading light LL is lighted upon the engagement of the WB4 contacts as the car is brought to a stop at the bottom terminal. Cars c and d are set for non-stop operation as soon as they arrive at the bottom terminal. This prevents the lighting of their up hall lanterns at the bottom terminal, thereby obviating the attraction to these elevators of incoming traffic. It also prevents the stopping of these cars in response to up landing calls on its upward trip. This is effected through the control exercised through down peak switch VDP. This switch has contacts for both car a and for car b arranged respectively in the circuit for the up hall lanterns for these cars at the bottom terminal. These contacts for car a are contacts VDP5a which connect first floor up hall lantern UHL1a for car a across supply lines W19a and W20a through contacts CA1a, thereby causing the continuous lighting of this lantern. Switch VDP also has contacts for both car c and for car d arranged respectively in the circuits for the coils of the respective non-stop relays. These contacts for car c are contacts VDP1c which enable the circuit for the coil of relay NSc to be broken by the separation of contacts PR1c as the car arrives at the bottom terminal and becomes set for upward travel. Relay NSc upon dropping out, separates contacts NS1c preventing the lighting of any of the up hall lanterns for car c, including the one at the bottom terminal. This also prevents the lighting of the loading light LLc as the car is brought to a stop at the bottom terminal. It also separates contacts NS2c, preventing car c picking up any up landing calls on its upward trip.

It may happen during periods of peak outgoing traffic that cars are filled to capacity at the upper floors and are non-stopped past lower floors for which down landing calls have been registered. The system is arranged so that when any such down landing call has been registered for more than a certain length of time this call becomes effective to stop an up travelling car having no car call registered for a higher floor and to set the car for downward travel as it comes to a stop. Inasmuch as cars c and d do not serve up traffic, they will have no car calls and therefore such down calls are effective to stop these cars as soon as they reach such calls on their up trip. This arrangement is provided for the third, fourth, fifth and sixth floors. The preference return circuits utilized to obtain the time interval after which the down landing call say at the fifth floor becomes effective to stop an up travelling car include: timing condenser QTC5, charging resistor RCH5, surge suppressing resistor RSS5, landing call time tube LCT5, load resistor RLCL5 for tube LCT5, leak resistor RLR5, coupling resistor RCP5, preference return tube FMT5, load resistor RFML5 for tube FMT5 and surge suppressing condenser GSS5. Also included in the preference return circuits are regulating resistors RMFT and non-interference condenser QCT. Tube LCT is a dual triode vacuum tube of the 6SN7 type while tube FMT is a thyratron of the 2050 type.

The system is also arranged so that when the down traffic becomes excessively heavy, the circuits are thrown over to "zone return" operation. More specifically, when there are a number of unanswered down calls for certain lower floors and their cumulative waiting time reaches a certain amount, depending on the number of such calls, or when such calls reach a certain number, the throw-over to "zone return" operation is effected. When on "zone return," certain cars are assigned to a lower zone of floors and others to a higher zone of floors. The operation under such conditions will be explained later. The circuits utilized to control this throw-over include certain portions of the preference return circuits and additional circuits which include: call accumulative resistors RCA for the fifth, fourth and third floors, common call accumulative resistor RCCA, stabilizing condenser QCCA for resistor RCCA, time accumulative resistors RTA for the fifth, fourth and third floors, common time accumulative resistors RCTA, landing call time accumulative tube LCCT, cathode bias resistors RCB, voltage regulating tube TVR, and current limiting resistor RVCL. Tube LCCT is a dual triode vacuum tube of the 6SN7 type. The circuits for providing preference return operation and for throwing over to "zone return" operation are rendered effective for down peak operation by the engagement of contacts VDP6.

For the voltage values specified for the electronic control circuits and for the types of electronic tubes specified, the following ohmic values of resistors and capacities of condensers in the electronic circuits have been found satisfactory:

Resistors:

| | | |
|---|---|---|
| RCA | ohms | 470,000 |
| RCB1 | do | 10,000 |
| RCB2 | do | 10,000 |
| RCB3 | do | 560 |
| RCB4 | do | 220 |
| RCCA | do | 1,500 |
| RCP | megohms | 1.2 |
| RCH | do | 6.8 |
| RCTA1 | ohms | 10,000 |
| RCTA2 | do | 50,000 |
| RCVL | do | 1,500 |
| RDL | do | 3,000 |
| RFML | do | 3,300 |
| RFMT1 | do | 3,300 |
| RFMT2 | do | 10,000 |
| RFMT3 | do | 1,500 |
| RFMT4 | do | 560 |
| RLCL | do | 120,000 |
| RLR | megohms | 10 |
| RSS | ohms | 22,000 |
| RTA | do | 470,000 |

Condensers: Microfarads

| | |
|---|---|
| QCCA | .250 |
| QCT | 30. |
| QSS | .001 |
| QTC | 20. |

The voltage regulator tube TVR provides a fixed potential for charging condensers QTC to insure a uniform timing operation. This tube fixes the potential at the left hand side of charging resistors RCH at 75 volts. So long as no down landing call is registered for the particular floor, there is a shunt circuit of relatively low resistance for the timing condenser QTC so that the charge built up on the condenser is negligible. However, as soon as such down call is registered, a change in potential is effected in this shunt circuit which blocks current flow therethrough, thereby starting the charging operation.

In order that this may be readily understood, refer by way of example to the circuits for the fifth floor. The charging circuit for timing condenser QTC5 is from the top of tube TVR through charging resistor RCH5 and condenser QTC5 to line B and thence to the bottom of tube TVR. The relatively low resistance shunt circuit across the condenser is from the junction of resistor RCH5 and condenser QTC5 through anode LCRA and cathode LCRC of tube LCT5, resistor RSS5, wire WC5 and thence through resistor RDL5 to line B, the particular portion of tube LCT5 through which the shunt circuit passes serving as a rectifier. As soon as call registering tube D5 is fired to register a down landing call for the fifth floor, it raises the potential of the right hand side of resistor RDL5 to a point which is higher than the potential of the junction of condenser QTC5 and resistor RCH5. This blocks the flow of current through the rectifier portion of tube LCT5 and thus initiates the charging of the timing condenser QTC5. Prior to the initiation of the charging operation, the grid LG of tube LCT5 is maintained at substantially the potential of line B which limits the flow of current across the anode LCTA-cathode LCTC of the other portion of the tube to a low value. However, as soon as the charging operation starts, the potential of the grid rises to permit a gradual increase of current flow through the anode LCTA-cathode LCTC circuit of the tube. As a result load resistor RLCL5 for the tube acts to provide a gradually increasing potential drop to control both tube FMT5 and tube LCCT. As to tube FMT5, prior to the initiation of the charging operation, the potential of its control electrode FMTE is substantially that of line B whereas the potential of its cathode FMTC is raised considerably above that of line B by its connection to the voltage divider resistance made up of resistors RFMT connected across voltage regulator tube TVR. The gradually increasing potential drop across resistor RLCL5 as the condenser charges gradually raises the potential applied by way of coupling resistor RCP5 to control electrode FMTE of tube FMT5. Finally this potential reaches a value with respect to the potential of cathode FMTC of this tube to permit the tube to fire upon the application of line B+ potential to its anode FMTA. The first car set for upward travel with no car calls above to bring the potential of line B+ to this anode is caused to stop at the fifth floor on its upward trip and become set for travel in the down direction as it is brought to a stop.

In order that this may be more readily understood, assume that car $a$ is set for upward travel so that contacts PR6$a$ are engaged, that it has no car calls above so that contacts XC3$a$ are engaged and that contacts EA5$a$ are engaged incident to the starting of the car. Thus upon the engagement of brush PRB$a$ on the advancer panel with contact PRC5, line B+ is connected through contacts VDP6, preference return cut-out switch RICS, coil FM$a$, contacts XC3$a$, EA5$a$, PR6$a$ and VO9 to the anode of tube FMT5, causing this tube to fire. This causes operation of preference return switch FM$a$. This switch, upon operation, engages contacts FM1$a$, completing a circuit through contacts ASM1$a$, EA1$a$ and XL1$a$ for the coil of relay XH$a$ and the operating coil of switch VSR$a$. This causes the slowing down and stopping of the car at the fifth floor, the automatic cancelling of the down fifth floor call incident to the dropping out of relay PR$a$ by relay XH$a$, the lighting of down fifth floor hall lantern DHL5$a$, and the changing of the direction of car travel to down and the giving of the down dispatching signals as the car is brought to a stop, all of which has been previously described. The time interval which elapses before a preference return tube FMT becomes ready to fire may be adjusted by varying the potential drop across resistors RFMT and thus varying the potential of the cathode with respect to the control electrode.

Relay PR$a$, upon dropping out incident to the above described stop at the fifth floor, also separates contacts PR6$a$, breaking the anode-cathode circuit for tube FMT5. Also, upon the cancelling of the down landing call incident to the dropping out of relay PRa, condenser QTC5 discharges by way of the anode LCRA-cathode LCRC circuit of tube LCT5 into resistors RSS5 and RDL5. Thus the charge on condenser QTC5 is not immediately dissipated, causing a potential in accordance with this charge to be applied to control electrode FMTE for a short interval. However, the current flow through tube FMT5 when brush PRBa engaged contact PRC5a raised the potential of its cathode due to the increase in potential drop across the tapped portion of resistors RFMT. Condenser QCT acts to cause this voltage to decrease gradually after the call is cancelled. This minimizes the possibility of a closely following car being stoped in response to the engagement of its brush PRB with its contact PRC5 as the raised cathode potential prevents the refiring of tube FMT5.

Unanswered down calls for the third, fourth and fifth floors also act through the respective tubes LCT for these floors to exercise control of the automatic throw-over to "zone return" operation. This is effected by controlling the potential of the grid LTG of tube LCCT. Upon a down call for any one of these floors being registered, say for the fifth floor, the rise in potential of resistor RLCL5 as the charge on condenser QTC5 builds up, increases the current flow by way of resistor RTA5 through resistors RCTA1 and RCTA2. This gradually increases the potential drop across resistors RCTA with the result that the potential of grid LTG is gradually raised. If a down call is registered for another of these floors, current flow through tube LCCT is further increased due to the further gradual increase in potential drop across resistors RCTA as the charging of the condenser for this floor takes place. Also, when each of these down landing calls is registered, current is supplied to common call accumulative resistor RCCA through the call accumulative resistor RCA for the floor for which the call is registered. Referring to the fifth floor circuits for example, resistor RCCA is connected in series with resistor RCA5 across resistor RDL5. Thus when a down fifth floor call is registered, the potential drop across resistor RDL5 is applied to resistors RCA5 and RCCA in series, causing a certain amount of current flow in resistor RCCA. Each additional one of these down calls completes a parallel circuit through the RCA resistor for resistor RCCA increasing the current flow therethrough and thus the potential drop across resistor RCCA. An adjustable point on resistor RCCA is connected to grid LCG of tube LCCT. Thus each registered down call for these floors increases the potential of grid LCG, also causing increase in current flow through tube LCCT. When the amount of current flow through tube LCCT due to the combined effect of the number of calls and the cumulative registered time reaches a certain amount zone return relay XVO operates, the coil of this relay being connected in circuit with the tube. Relay XVO engages contacts XVO1 which completes a circuit for the coil of zone return switch VO. This throws the system over to "zone return" operation in which with the circuits as illustrated, cars a and b are assigned to the high zone, i. e., the sixth, seventh, eighth and ninth floors, and cars c and d are assigned to the low zone, i. e., the second, third, fourth and fifth floors.

The assigning of cars c and d to the low zone is effected by contacts VO8 and VO14 while the assigning of cars a and b to the high zone is effected by contacts VO6 for these cars. Upon operation of zone return switch VO, contacts VO9 separate to prevent landing calls above the fifth floor, the highest in the low zone, from affecting the control of relays XS for low zone cars by way of the highest landing call circuit. Contacts VO14 engage to complete a circuit for the coils of low zone cut-out switches ZCc and ZCd for cars c and d. Switches ZC operate to prevent car calls for these cars above the fifth floor being effective to control the operation of their relays XC and thus their relays XS. This is illustrated for car c in the circuits of Figure 9. Contacts ZC2c upon separation render the car buttons for the sixth, seventh, eighth and ninth floors ineffective to control the operation of the car. Contacts VO6a engage to maintain relay XCa for car a energized during up car travel at least until the sixth floor is reached. This causes relay XSa to remain operated to insure travel of car a at least to the sixth floor on its upward trip. The circuits for car b are the same. The separation of contacts VO8, VO10 and VO11 prevents the control of the XS relays for cars c and d by up landing calls for the fifth, fourth and third floors respectively by way of the highest landing call circuit. The engagement of contacts VO12 maintains the XS relays for the low zone cars energized during up car travel until after the car passes the second floor, thereby insuring travel of the low zone cars at least to the third floor during "zone return" operation. The separation of contacts VO1, by rendering the control of the circuit for the XS relays for the high zone cars by contacts VD3, VRR2 and VD4 ineffective, enables the high zone cars to reverse upon answering their highest calls.

The operation of switch VO in switching over to "zone return" also effects certain other changes in operation. The separation of contacts VO7 renders the timing mechanism ineffective. The engagement of contacts VO15 causes the lighting of down traffic light DTL2 which, owing to the fact that light DTL1 is also lighted, advises the starter that the system is switched over to "zone return" operation. Contacts VO2 engage to complete a circuit for the coil of return cut-out switch VC which, as explained in describing up peak operation, enables the down dispatch signals to be given immediately a car is brought to a stop upon answering its highest call. Contacts VO4 engage to provide a circuit for giving the down dispatching signals to a high zone car which travels to the top terminal. Also these contacts cause continuous lighting of starter's down light SDL to advise the starter that up travelling cars are to be given their down dispatching signals as soon as they answer their highest calls. Contacts VO5a separate to prevent the stopping of high zone car a at the fifth floor because of contacts VO6a being in engagement. The circuits for car b are similarly arranged. Cars c and d are also provided with contacts VO6 and VO5 as indicated for car c in Figure 9a to provide high zone operation when these cars are assigned to the high zone. Contacts VO13 separate to insert resistance RMFT4 in circuit with the other RMFT resistances, thereby increasing the potential of the cathodes of the preference return tubes FMT and thus increasing the time interval for an unanswered down call to become effective to stop an up travelling car.

In order that "zone return" operation may be more readily understood, the operation of a high zone car, say car $a$, will first be described. As the car arrives at the bottom terminal and becomes set for upward travel, relay VB$a$ is operated which, as previously explained in describing down peak operation before switch-over to "zone return," causes immediate operation of switch WBX$a$, owing to contacts VU4 being engaged, and thus the immediate giving of the up dispatching signals. Contacts VO3 prevent the control of coil XS$a$ by landing calls above the fifth floor until brush HRB1$a$ engages contact HH6$a$. However, contacts VO6$a$, by maintaining a circuit for the coil of relay XC$a$ until switch HC6$a$ is opened by brush HCB$a$, maintains the circuit for coil XS$a$ through contacts XC2$a$ until after brush HRB1$a$ engages contact HH6$a$. Thus upward travel of car $a$ to the lowest floor in the high zone is assured and as the car reaches this zone the extent of its further upward travel is determined by the calls registered in the high zone. When the car reaches its highest call, the circuit for coil XS$a$ is broken as previously described. When this takes place the circuit for the coil of relay XH$a$ and for the operating coil of switch VSR$a$ is completed through contacts VC1$a$. This causes the stopping of the car at the landing of highest call, the automatic cancelling of the down landing call for that landing, the lighting of the down hall lantern and, as the car comes to a stop, the changing of car travel direction to down and the giving of the down dispatching signals as previously described. Should there be a call requiring travel of the car to the top landing, the down dispatching signal circuit is completed through contacts WT3$a$ and VO4.

As to the low zone cars, as car $c$ for example arrives at the bottom terminal, its relay VB$c$ is operated, which, as described for a high zone car causes the immediate giving of its up dispatching signals. Contacts VO12, due to its connection by way of contact HH2$a$ and wire WH2 to contact HH2$c$, maintain the circuit for the coil of relay XS$c$ until brush HRB2$c$ disengages contact HH2$c$, thus insuring travel of the car above the second floor. After this point, the car travels to its highest down landing call. This cannot be above the fifth floor owing to the fact that contacts VO3 are separated. When the car reaches its highest call, the circuit for coil XS$c$ is broken causing operation of relay XH$c$ and switch VSR$c$. This causes the car to be brought to a stop at the landing of highest call, the automatic cancelling of the down call for that landing, the lighting of the down hall lantern and as the car comes to a stop the changing of the direction of car travel to down and the giving of the down dispatching signals.

Should a low zone car be in the high zone at the time of switch-over to "zone return," it is immediately returned to the low zone. Taking car $c$ for example, upon the engagement during upward travel of brush HLB$c$ (Figure 5) on the advancer panel with contact HLC$c$ which is for the fifth floor, a circuit is completed for the coil of zone reversal switch ZR$c$ through contacts UP3$c$ and VDP7. Switch ZR$c$ engages contacts ZR2$c$ to establish a self-holding circuit. It also engages contacts ZR1$c$. Thus if car $c$ is in the upper zone with switch ZR$c$ operated at the time of operation of switch VO, the engagement of contacts ZC1$c$ in response to the engagement of contacts VO14 completes a circuit for the coil of relay XH$c$ and operating coil of switch VSR$c$. It is to be noted that this circuit by-passes contacts XS3$c$, thereby causing the car to be brought to a stop at the next floor at which a stop can be made, its direction of travel changed to down and the down dispatching signals given. Thus the attendant upon starting the car returns it to the low zone. On its way down to the low zone it may respond to down landing calls in the high zone.

If it be desired to assign one of the low zone cars to the high zone, this may be done by operating zone transfer switch ZTS for that car at the starter's panel. Assuming it is desired to assign car $c$ to the high zone, switch ZTS1$c$ is opened to break the circuit for the coil of switch ZC$c$. Thus contacts ZC2$c$ are engaged, rendering contacts VO6$c$ effective to cause car $c$ to travel to the high zone on "zone return" operation. At the same time switch ZTS2$c$ is closed, rendering non-stop switch NS$c$ effective to cause the car to operate the same as cars $a$ and $b$.

Both high zone cars and low zone cars respond to down landing calls on their downward trips. In this connection it is to be noted that the high zone cars, if not filled and thus non-stopped, will respond to down landing calls in the low zone to help out the low zone cars, their brushes DPB being effective for the full down trip unless the non-stop button is pressed. As during down peak operation before switch-over to "zone return" the low zone cars are non-stopped during upward travel, due to the separation of contacts VDP1. The high zone cars, however, respond to up calls in both zones as before and take on incoming passengers at the first floor, their up hall lanterns at the first floor being continuously lighted as previously described.

When conditions change to where the number of unanswered down calls and their total waiting time are decreased to the point where there is insufficient current flow through tube LCCT to maintain relay XVO operated, this relay drops out, restoring the circuits to the condition for down peak traffic with all cars assigned to both zones. The control of relay XVO by both the number of calls and their total accumulated waiting time has the advantage that the time which elapses before the system is switched over to "zone return" operation decreases with the number of calls. With this arrangement, the system may be adjusted to switch over to "zone return" operation immediately if a certain number of down calls are registered, regardless of the accumulated waiting time. Condenser QCCA acts to prevent operation of relay XVO when a down call for any of floors three, four and five is automatically cancelled at a time when near operating voltage is being applied to the operating coil of the relay.

The details of circuits and mechanism for measuring the number and total waiting time of unanswered calls are the subject matter of the co-pending application of Arthur Willard Paulson, Stephen Anthony Hornung, and Harold Edward Galanty, Serial No. 158,722, filed April 28, 1950, for Call Measuring Apparatus.

It may happen, especially during down peak traffic conditions, that a car when stopped at a floor becomes full before taking on all the waiting passengers. Should this happen during down peak operation or during some other operating period, the landing call may be reregistered by the car attendant from within the car. Referring to the circuits for car $a$ the attendant under such conditions presses landing call reestablish button REB$a$ in the car. This completes a circuit through throw-over switch TO3a and contacts H4a and EA2a for the coil of landing call reestablish switch REa. Switch REa engages contacts RE1a to by-pass button REBa. It also engages contacts RE2a to complete a circuit for the coil of auxiliary landing call reestablish switch REXa. It also separates contacts RE4a to open the automatic call cancelling circuit. It also engages contacts RE3a to connect to line B+ the cathode of the tube upon which the call was registered to cause the stop. Switch REXa is delayed slightly in operation by the effect of condenser QREXa in parallel with its coil and resistor RREXa in series therewith. Switch REXa upon operation separates contacts REX1a in series with contacts RE3a to disconnect the cathode from line B+. The net result is that a positive potential is momentarily applied to the cathode which is sufficiently above the potential (B—) of the control electrode to pulse on the tube. Thus the call is reregistered, enabling another car to pick up the registered call, even while the first car is still at the landing.

During "zone return" operation, the preference return circuits for the lower floors in the high zone may be rendered effective to provide preference return operation for the floors for the high zone cars. This is indicated for the sixth floor in which the circuits are rendered effective by contacts VO3. High zone cars do not respond on their upward trip to unanswered down calls in the low zone because for example for car a contacts XC3a are maintained separated owing to contacts VO6a being engaged, until the car reaches the sixth floor. Also during "zone return" operation the preference return circuits for certain of the higher floors of the low zone may be rendered ineffective to provide preference return operation for these floors. This is indicated for the fifth floor, in which the circuits are rendered ineffective by contacts VO9. It is to be noted that due to the separation of contacts VO13 preference return operation for floors in both the high zone and low zone have to be registered for a longer time in order to stop an up travelling car with no car calls which has not as yet reached its highest call in the zone to which it is assigned.

Thus under down peak traffic conditions, so long as the down traffic does not become excessive, the cars are given their down dispatching signals at the top terminal. The cars are selected to receive these signals which are given at the expiration of the timing interval. If the interval expires before a car reaches the top terminal, the down dispatching signals may be given a car in the selection zone. The up dispatching signals are given the cars at the bottom terminal as soon as they arrive and become set for upward travel. If a down call at any one of certain floors preferably above a certain floor should remain unanswered for a certain period of time, an up car having no car calls for floors above is stopped to pick up the down passengers at such floor. If several unanswered down calls for certain floors exist for a certain total accumulated time, preferably determined by the number of such calls, the system is automatically thrown over to "zone return" operation. This also takes place if a certain number of such calls are registered, regardless of waiting time. Under such conditions, certain cars are assigned to a high zone and certain others to a low zone. If a low zone car is in the high zone at the time of change-over, it is immediately returned to the low zone. Each car travels to the highest down call in its zone, becomes set for down travel after stopping in response to such call and picks up down calls for floors below on its way down. Each high zone car answers down calls in the low zone on its way down if there is room in the car. It is preferred that low zone cars travel upwardly at least as high as a certain floor, by-passing one or more lower floors. The down dispatching signals are given the cars immediately at the point of highest call to which they respond. Also, the up dispatching signals are given immediately the cars arrive at the bottom terminal. The high zone cars serve any incoming traffic at the bottom terminal during down peak operation, regardless of whether on "zone return" operation or not. For this reason, the up hall lanterns for these cars at the bottom terminal are continuously lighted while the bottom terminal up hall lanterns for the low zone cars are not lighted at all. Also, the high zone cars answer all up landing calls regardless of whether on "zone return" operation or not, the low zone cars being non-stopped as to up landing calls on their upward trips. During "zone return" operation, preference return operation is provided for high zone cars with respect to certain lower floors in the high zone and for low zone cars with respect to certain lower floors in the low zone. The time interval for preference return operation is greater when the cars are on "zone return" operation than when they are not.

In some elevator installations there are, under off peak conditions, not only periods during which traffic in each direction is approximately equal but also periods during which up traffic is predominant and/or during which down traffic is predominant. To provide satisfactory service for these different periods, the cars should be distributed so as to balance them against the traffic conditions for the particular period.

Considering first approximately equal up and down traffic, for this condition cars should be distributed on an equal time basis throughout the entire round trip. To provide this distribution when there is in service an even number of cars, the time allowance for each car for an up trip and also for a down trip should be a multiple of the time interval between cars and these time allowances should be equal. Thus the up dispatching signals and the down dispatching signals should be given simultaneously. With such distribution with, for example, four cars in service, the up trip allowance and down trip allowance each would be two times the time interval, that is each car would be allowed two intervals to make its trip from one terminal to another with the result that there would be two cars on an up trip and two cars on a down trip. To distribute the cars equally throughout the building on a time basis when there is in service an odd number of cars, the time allowance for each car for an up trip and also for a down trip should be a multiple of the time interval between cars plus one-half an interval and these time allowances should be equal. For this condition, the up and down dispatching signals should be given alternately. With such distribution with, for example, three cars in service, the up trip allowance and down trip allowance each would be one and a half times the time interval, that is each car would be allowed one and a half intervals to make its trip from one terminal to another with the result that there would in effect be one and a half cars on an up trip and one and a half cars on a down trip. Such operation is had in the system illustrated by setting up down traffic selector switch UDTS is position 2.

When under up-down traffic conditions, traffic in one direction predominates over that in the other, the time allowance for each car should be greater for a trip in the predominant traffic direction than for a trip in the opposite direction. Thus for predominant down traffic, the time allowance for each car for a down trip should be greater than that for an up trip, and for predominant up traffic, the time allowance for each car for an up trip should be greater than that for a down trip. Such distribution may be had by in effect assigning more cars to a down trip than to an up trip under predominant down traffic conditions and by in effect assigning more cars to an up trip than to a down trip under predominant up traffic conditions. When, for example, three cars are in service and when traffic predominance is down, with two cars assigned to the down trip and one car assigned to the up trip and with the dispatching signals given simultaneously, each car would be allowed two intervals to make its down trip and one interval to make its up trip. When traffic predominance is up, with two cars assigned to the up trip and one car assigned to the down trip and with the dispatching signals given simultaneously, each car would be allowed two intervals to make its up trip and one interval to make its down trip. When, for example, four cars are in service and when traffic predominance is down, with in effect two and a half cars assigned to the down trip and one and a half cars assigned to the up trip and with the dispatching signals given alternately, each car would be allowed two and a half intervals to make its down trip and one and a half intervals to make its up trip. When traffic predominance is up, with in effect two and a half cars assigned to the up trip and one and a half cars assigned to the down trip and with the dispatching signals given alternately, each car would be allowed two and a half intervals to make its up trip and one and a half intervals to make its down trip. Such operation is had in the system illustrated by setting switch UDTS in position 4 for predominant up traffic and in position 3 for predominant down traffic.

When switch UDTS is set for any one of these traffic conditions, should the cars get out of balance for such traffic condition, the system acts automatically to restore the balance. Also, when the traffic selector switch is moved from any one of these positions to another, the system acts automatically to place the cars in proper balance for the traffic conditions for which the switch is set. Further, when the number of cars in service is changed, the system acts automatically to place the cars in proper balance for that one of the three traffic conditions for which switch UDTS is set. This may be termed automatic time distribution balancing.

Figure 4:
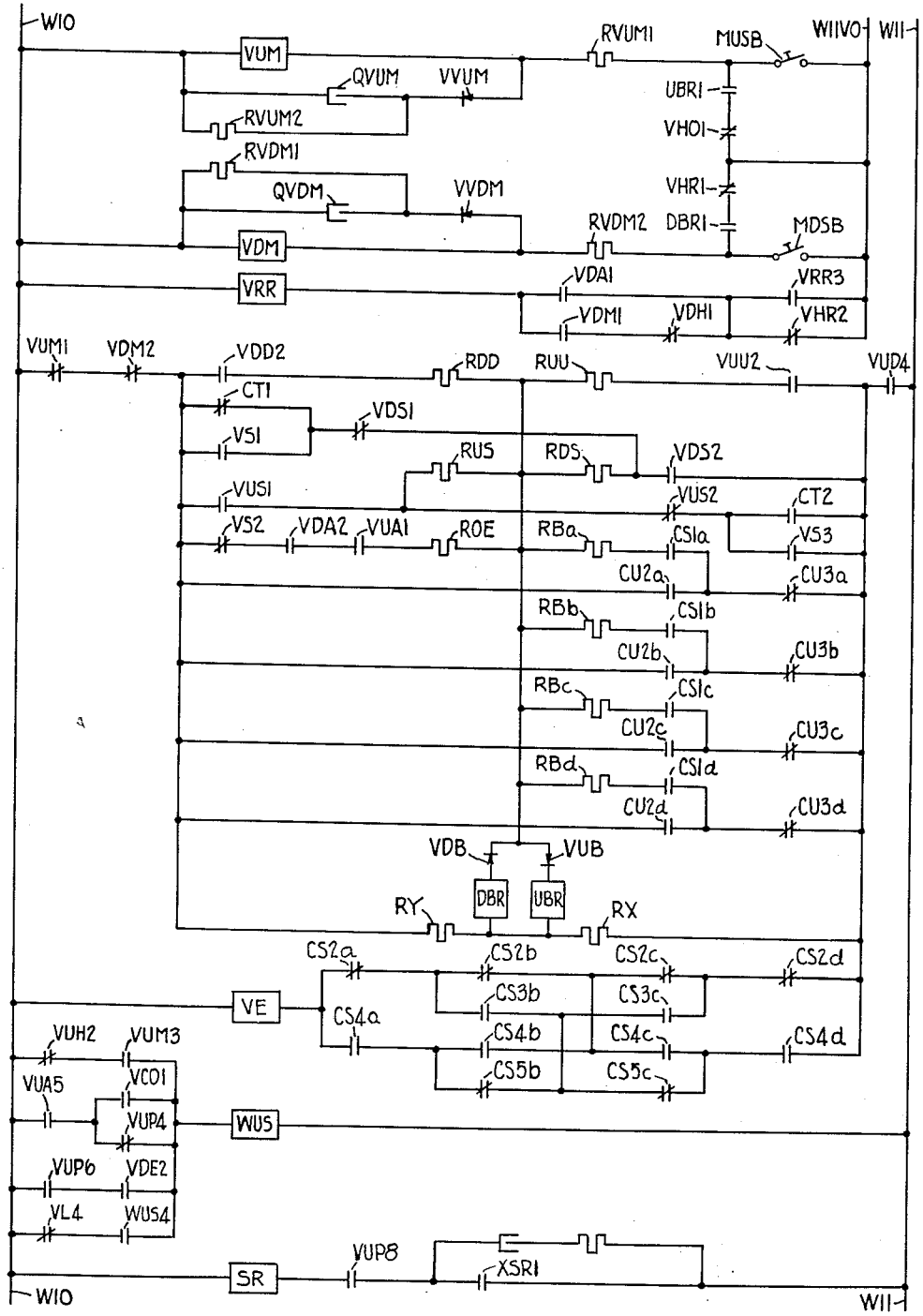
Figure 5:
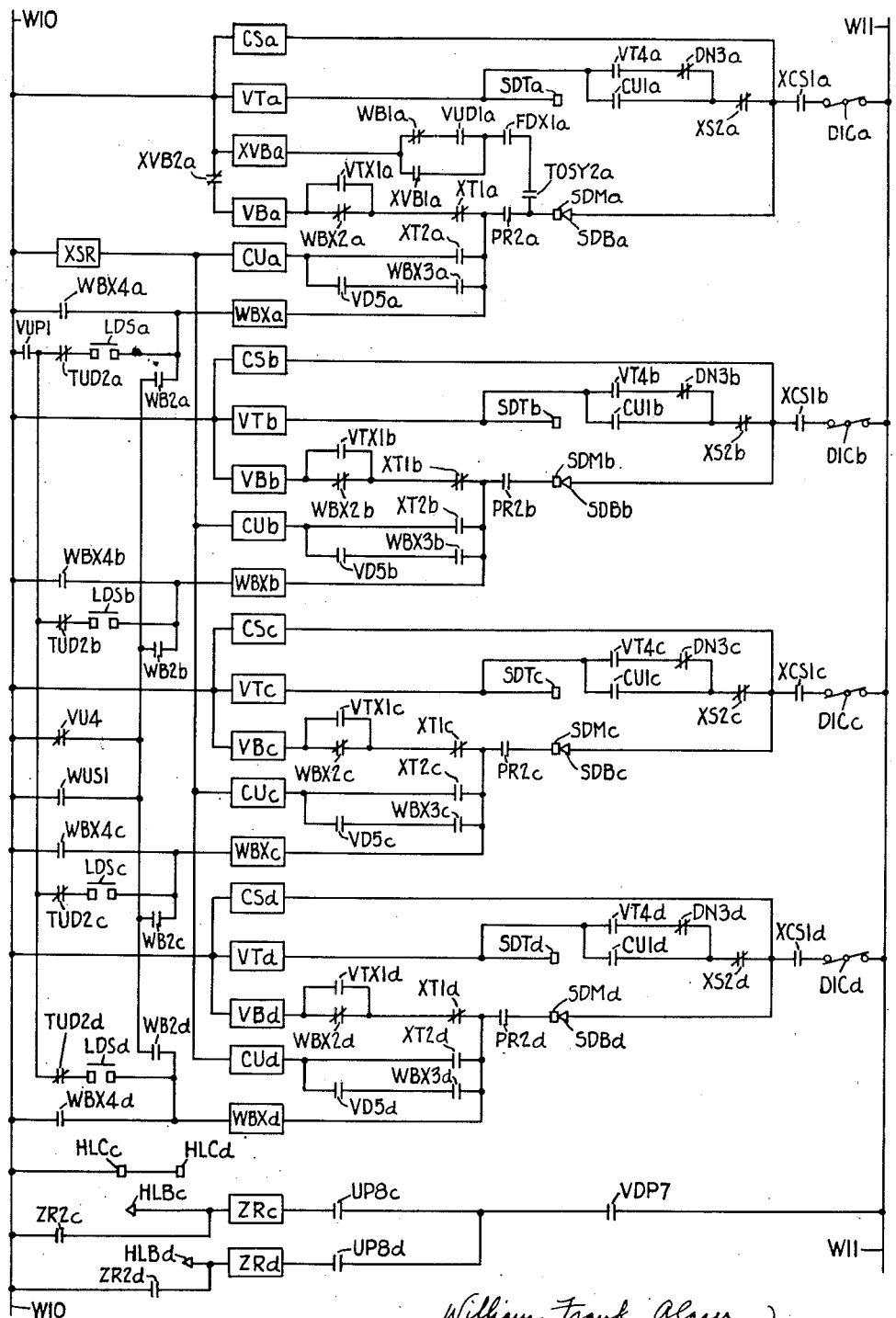
Figure 6:
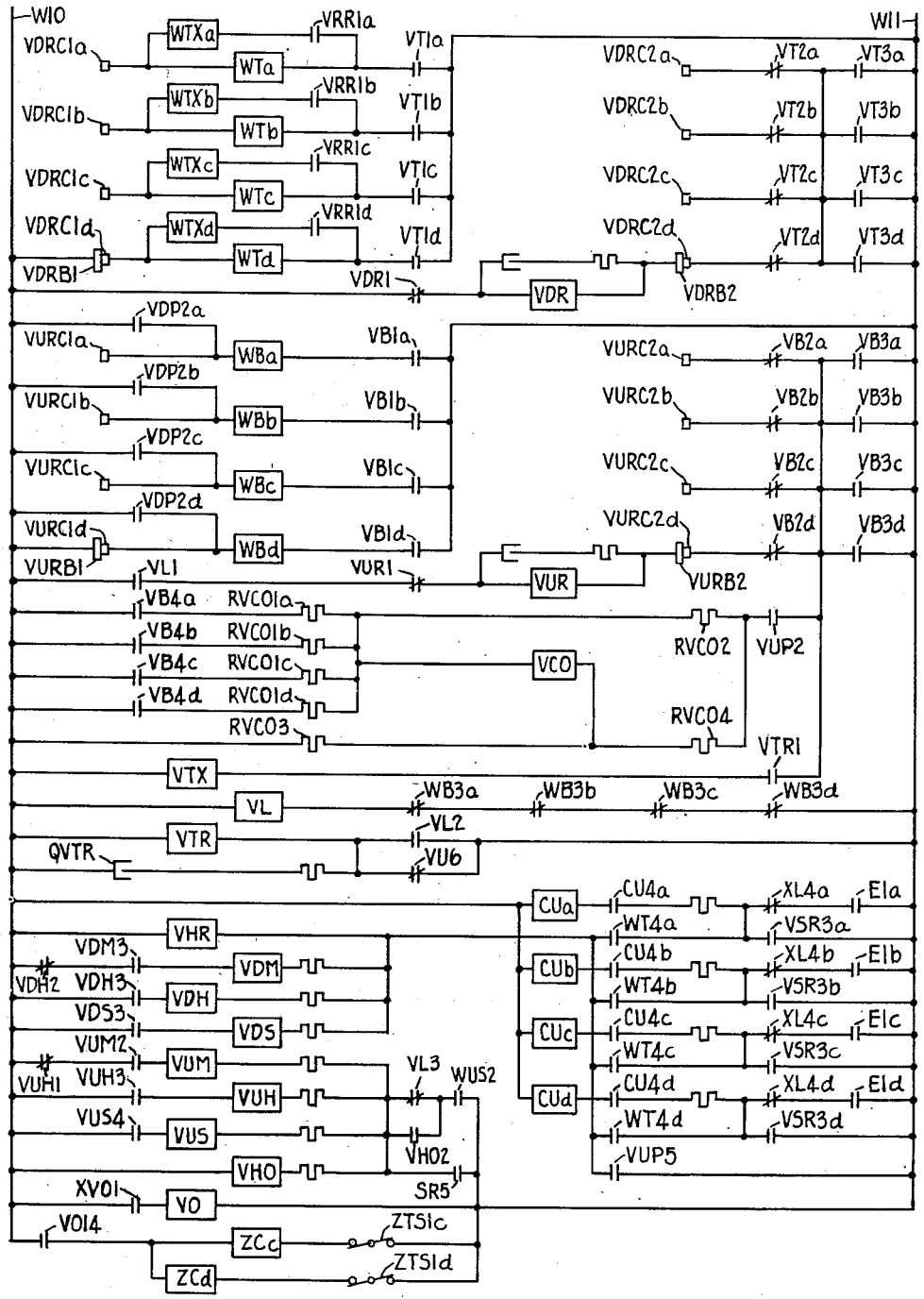

In the arrangement illustrated, the automatic time distribution balancing for these various conditions is effected by the control exercised on a Wheatstone bridge circuit (see Figure 4). The legs of this bridge are made up of resistances. Two of these legs are formed by resistances RX and RY of equal ohmic value which remain fixed and may be considered the fixed legs of the bridge. The other two legs are formed by resistances RB for each car and resistances RDD, RUU, RUS, RDS and ROE, all of which are of equal ohmic value, in alterable relationships depending upon operating conditions. The latter legs may be considered as direction legs. Across the diagonal of the bridge are connected the coils of balancing relays DBR and UBR. These relays are not actuated so long as the operating conditions are such that the bridge is balanced. When the bridge becomes unbalanced, one or the other of the relays is actuated, depending upon the conditions which cause the unbalance, causing these conditions to be corrected.

For the purposes of the functioning of the balancing device, a car at the lower terminal is not considered an up car until it has been given its up dispatching signals and a car at the upper terminal is not considered a down car until it has been given its down dispatching signals and started in the down direction. When an up car is making a stop at a floor in the selection zone under conditions where it will be set to leave that floor in the down direction, it will be considered a down car as soon as the stop is initiated. This determination is effected through the control of car direction switch CU for each car. When switch CU for a car is operated that car for the purposes of the control of the bridge circuit is an up car and when switch CU for a car is reset that car for the purposes of the control of the bridge circuit is a down car.

For an understanding of the operation of the balancing device, operation under conditions of approximately equal up and down traffic with an even number, say four, of cars in service will first be described. For such conditions, traffic distributor switch UDTS is set in position 2. This causes switches VUD, VU and VD to be operated. The Wheatstone bridge circuit is rendered effective under such conditions by the engagement of contacts VUD4.

Under the assumed conditions of operation, the selected car at the bottom terminal may receive its up dispatching signals at a different time than a car, which has received its down dispatching signals at the top terminal, starts its downward trip or than a car is selected to receive the dispatching signals at a floor in the selection zone instead of the upper terminal. Yet the cars are still balanced for, as soon as the last of these cars being dispatched leaves, there will be the same number of cars travelling upwardly as there are cars travelling downwardly. To prevent the false registration of an unbalanced condition on the bridge under such conditions of apparent unbalance when in fact the cars are balanced, the bridge is balanced through the control exercised on the resistances RUS and RDS. With switches VUS and VDS both reset, one of these resistances is connected across each leg of the bridge and thus balance each other. When switches VUS and VDS are operated these resistances are transferred to opposite legs of the bridge so that these resistances still balance each other. Incident to the giving of the up dispatching signals to a selected car at the bottom terminal, switch VUS is reset, separating contacts VUS1 and engaging contacts VUS2 to transfer resistor RUS from the left hand leg, hereinafter termed up leg, to the right hand leg, hereinafter termed down leg, of the bridge. At the same time switch CU for that car is operated, engaging contacts CU2 and separating contacts CU3 to transfer resistor RB for that car from the down to the up leg of the bridge. As a result the resistance balance is maintained. Similarly, upon the reset of switch VDS incident to a down dispatching operation, switch CU for the selected car is reset. Thus as contacts VDS1 engage and contacts VDS2 separate to transfer resistor RDS from the down to the up leg of the bridge, contacts CU3 for the car involved engage and contacts CU2 for that car separate to transfer resistor RB for that car from the up to the down leg of the bridge, maintaining the resistance balance.

For a better understanding of these operations assume that car $b$ is travelling up and car $d$ is travelling down, that car $a$ has arrived at the bottom terminal and has become selected as the next to leave and that car $c$ has arrived at the top terminal and has become selected as the next to leave. It will be seen from previous description that due to the condition of the CU switches under this assumption resistance RB$b$ and RB$c$ are connected in the up leg of the bridge and resistances RB$a$ and RB$d$ are connected in the down leg of the bridge so that the RB resistances are balanced. Also, with switches VUS and VDS both reset, resistance RDS is connected through contacts VS1 and VDS1 in the up leg of the bridge and resistancese RUS is connected through contacts VUS2 and VS3 in the down leg of the bridge. Thus resistances RDS and RUS balance each other. When contacts ZVT4 close at the end of a full timing interval to cause the simultaneous operation of switches VUS and VDS with the result that contacts VUS1 engage and contacts VUS2 separate to transfer resistance RUS to the up leg of the bridge and contacts VSD1 separate and contacts VDS2 engage to transfer resistance RDS to the down leg of the bridge. Thus resistances RUS and RDS again balance each other. Upon the operation of switches VUS and VDS car $a$ is given its up dispatching signals and car $c$ is given its down dispatching signals. Switch VUS is reset immediately after the giving of the up dispatching signals causing resistance RUS to be transferred back to the down leg of the bridge. At the same time switch CU$a$ is operated, engaging contacts CU2$a$ and separating contacts CU3$a$ to transfer resistance RB$a$ to the up leg of the bridge. Thus the bridge remains balanced. When car $c$ leaves the top terminal its switch CU$c$ is reset at the same time switch VDS is reset, causing the simultaneous transfer of resistance RDS to the up leg of the bridge and resistance RB$c$ to the down leg of the bridge. Thus the bridge remains balanced.

Should car $c$ be selected to receive the down starting signals at a floor in the selection zone instead of at the top terminal, the transition of the balancing resistances is made when the signals are definitely assigned to this car rather than when the car is started downwardly. Inasmuch as this assignment can not be made unless a full timing interval has expired under the conditions assumed, either switches VUS and VDS are both operated such as when car $a$ is late in arriving at the bottom terminal and therefore resistances RUS and RDS balance each other or, if car $a$ has received its dispatching signals and switch VUS is reset and switch CU$a$ is operated, then the switch-over of resistance RUS is balanced by the switch-over of resistance RB$a$. When the assignment to car $c$ is made, switches VDS and CU$c$ are both reset, transferring both resistances RDS and RB$c$ to maintain the balance.

The detenting of the timing mechanism has no function in connection with placing the cars in a given distribution or reestablishing a given distribution when the cars get out of balance. A detent operation simply stops the timing mechanism until the condition which caused the detent is corrected. However, the detenting assists in obtaining the desired distribution of the cars as it prevents further operation of the timing mechanism until the particular operations which this mechanism has initiated have been responded to.

With an even number of cars in service under conditions of approximately equal up and down traffic, should the cars get out of balance for any reason, without the balancing circuits the unbalance would not be corrected by the natural functioning of the dispatching system as the timing mechanism and circuits controlled thereby have no knowledge of the number of cars on an up trip compared with those on a down trip. With the balancing circuits, however, the proper balancing relay operates, as soon as the unbalance occurs, to cause the unbalance to be corrected. Correction of unbalances will now be described.

Continuing with the assumption of four cars in service with switch UDTS in position 2, assume that say car $a$ has been selected to receive its down dispatching signals at the top terminal but leaves before these signals have been given. Switch CU$a$ is reset as before to transfer resistance RB$a$ to the down leg of the bridge. However, as the dispatching signals have not been given, neither of switches VDS or VUS is operated and resistances RDS and RUS are connected in balanced relation in the up and down legs of the bridge. Therefore resistance RUS can not act to balance resistance RB$a$ with the result that two more resistances are connected in the down leg of the bridge than in the up leg of the bridge. The same result is had should car $a$ leave the top terminal under conditions where another car was also at the top terminal and selected over car $a$ as the next to leave. This is true regardless of whether or not contacts ZVT4 have engaged to give down dispatching signals to the other car. If contacts ZVT4 have not engaged both switches VUS and VDS are not operated. If contacts ZVT4 have engaged both switches VUS and VDS are operated. In either case, resistances RUS and RDS are connected in balanced relation in the up and down legs of the bridge or, if a car is at the lower terminal to receive the signals, resistance RUS is balanced by resistor RB for the car receiving the signals as previously described. However, switch VDS if operated, is not dropped out as car $a$ leaves as contacts WT4$a$ are not engaged. Thus resistance RB$a$ transferred to the down leg of the bridge by the departure of car $a$ can not be balanced by resistance RDS with the result that two more resistances are connected in the down leg of the bridge than in the up leg of the bridge.

In each of these examples of resistance unbalance, up balancing relay UBR operates because more resistances in the down leg of the bridge brings the upper end of the bridge diagonal nearer positive potential, causing downward current flow through rectifier VUB and the coil of relay UBR. Rectifier VDB blocks the flow of current in the coil of relay DBR under the conditions assumed. The action of relay UBR depends on whether or not switches VUH and VHO are operated. They may not be operated due to the timing interval not having expired. If the timing interval has expired switch VHO may not be operated due to no car being at the bottom terminal. Switch VUH is operated as soon as the timing interval expires and when the time interval has expired switch VHO is operated as soon as a car arrives at the bottom terminal. Both switch VUH and switch VHO are dropped out as soon as a car at the bottom terminal receives its up dispatching signals and switch WUS drops out.

Under the first example, i. e., selected car $a$ leaving the top terminal before receipt of its dispatching signal, neither switch VUH nor switch VHO is operated as the timing interval has not expired. Thus the engagement of contacts UBR1 upon operation of relay UBR completes the circuit through contacts VHO1 for the operating coil of up manual signal switch VUM. It is to be noted that resistance RVUM1 is connected in series with the coil of switch VUM and condenser QVUM is connected in parallel with this coil. This acts to delay the immediate operation of switch VUM, thereby avoiding unwanted operation under transient conditions. Also, rectifier VVUM in series with condenser QVUM acts to block the flow of condenser discharge current into the coil. This prevents maintaining current flow in the coil of switch VUM as its circuit is broken, the condenser discharging into resistance RVUM2. Switch VUM is a latching type switch and, upon operation, latches itself in operated condition. It separates contacts VUM1 which disconnects the balancing circuits until corrective dispatching signals have been given. In so doing it causes dropping out of relay UBR which separates contacts UBR1 to break the circuit for the operating coil of switch VUM. Switch VUM also engages contacts VUM3 to complete a circuit through contacts VUH2 for the coil of switch WUS, switch WUS in turn causing the operation of switch WBX for a selected car at the bottom terminal to cause the giving of corrective up dispatching signals to that car and also to cause the operation of switch CU for that car. This results in the transfer to the up leg of the bridge of the RB resistance for the car receiving the corrective dispatching signals, restoring the balance. At the same time, the engagement of contacts WUS2 completes a circuit through contacts VUH1, VUM2 and VL3 for the reset coil of switch VUM, causing this switch to be reset. As a result contacts VUM1 reengage to reconnect the balancing circuits.

In the second example where car $a$ leaves the top terminal ahead of a selected car, if the time interval has not expired, the system acts as above described to give corrective dispatching signals to a car at the bottom terminal to restore the balance. If the time interval has expired and a car at the bottom terminal has received its timed dispatching signals, switches VUH and VHO are dropped out as soon at switch WUS drops out. Thus corrective dispatching signals are given another car at the bottom terminal or as soon as such car arrives.

If in the first example no car is at the bottom terminal when the unbalance occurs and none arrives before the time interval expires, or if in the second example no car is at the bottom terminal when the time interval expires, in each case switch VUH is operated but switch VHO is not. Thus switch VUM is operated to disconnect the balancing circuits but contacts VUH2 prevent the completion of a circuit through contacts VUM3 for the coil of switch WUS. The circuit for the coil of switch WUS is completed however through contacts VUA5. As soon as a car arrives, it receives its regular timed dispatching signals through the operation of switch WUS in response to the timing mechanism. Upon the dropping out of switch VUH as switch WUS drops out after the timed dispatching signals are given, contacts VUH2 engage to complete another circuit for the coil of switch WUS. Thus switch WUS is reoperated to cause the giving of corrective dispatching signals to another car, upon its arrival at the bottom terminal, to restore the balance. Also, with switch WUS reoperated, the arrival of the other car causes engagement of contacts VL3. This resets switch VUM, causing reengagement of contacts VUM1 to reconnect the balancing circuits.

Should in the last example the giving of corrective signals be prevented by further operations of the timing mechanism to give timed dispatching signals, switch VUM remains operated until up corrective dispatching signals are given to a car at the bottom terminal. This is due to the fact that the circuit for the reset coil of switch VUM is broken at contacts VUH1 while the timing mechanism is effective and at contacts VL3 until another car arrives. As soon as a car arrives before the timing interval expires, it is given corrective signals and switch VUM is reset as a result of the engagement of contacts VL3.

In case the unbalance is in the up direction instead of the down direction, relay DBR is operated to cause the balance to be restored. The action of relay DBR depends on whether or not switches VDH and VHR are operated. Switch VDH is operated as soon as the timing interval has expired and switch VHR is operated incident to starting a selected car from the top terminal or when a car is to receive the down dispatching signals in the selection zone, as soon as switch VSR for that car is operated. Both switches drop out as the car leaves the top terminal, or in case of a car being selected in the selection zone, as soon as the car is brought to a stop and relay VT for that car is dropped out causing the separation of contacts WT4 for that car.

Assume that car $a$ at the bottom terminal is selected but leaves before the expiration of the timing interval. Neither of switches VDH and VHR is operated under such conditions due to the timing interval not having expired. The early leaving of car $a$ causes an unbalance which is registered by the operation of switch CUa to throw over resistance RBa from the down to the up leg of the bridge without being balanced. This causes operation of down balancing relay DBR as more resistance in the up leg of the bridge brings the lower end of the bridge diagonal nearer positive potential causing upward flow of current through the coil of relay DBR and rectifier VDB, rectifier VUB blocking the flow of current in the coil of relay UBR. The engagement of contacts DBR1 completes a circuit through contacts VHR1 for the coil of down manual signal switch VDM. Switch VDM latches itself in operated condition and upon operation separates contacts VDM2 which disconnects the balancing circuits until corrective dispatching signals have been given. In doing so it causes the dropping out of relay DBR to break the circuit for the operating coil of switch VDM. Switch VDM upon operation also engages contacts VDM1 to complete a circuit through contacts VDH1 and VHR2 for the coil of relay VRR. Relay VRR acts as previously described to cause the giving of dispatching signals to a selected car at the top terminal or as soon as a car arrives at the top terminal or is selected in the selection zone, provided the time interval has not yet expired. These signals are corrective signals and if given to a car at the top terminal the engagement of contacts E1 for that car, or if a car is selected to receive them at a floor in the selection zone, the engagement of contacts VSR3 for that car causes the reset of switch CU for that car and the completion of the circuit through contacts VDM3 for the reset coil of switch VDM causing this switch to be reset. The reset of switch CU for that car causes the transfer to the up leg of the bridge of the RB resistance controlled thereby, restoring the balance. The reset of switch VDM results in the reengagement of contacts VDM2 to reconnect the balancing circuits and the separation of contacts VDM1 to break the circuit for the coil of relay VRR.

If when the unbalance occurs, no car arrives at the top terminal or is selected in the selection zone before the time interval expires, switch VDH is operated but switch VHR is not. Thus switch VDM is operated to disconnect the balancing circuits but contacts VDH1 prevent the completion of the circuit through contacts VDM1 for the coil of relay VRR. The circuit for this coil is completed however through contacts VDA1. Thus, as soon as a car arrives at the top terminal, it receives its regular timed dispatching signals, or a car in the selection zone may be selected to receive these signals. Assuming the signals are given to a car at the top terminal, upon the engagement of contacts E1 for that car incident to the starting of the car in the down direction, contacts VDA1 separate breaking the circuit for the coil of relay VRR. Switch VDH, however, is maintained operated until the car leaves the floor, thereby preventing the reset of switch VDM. Upon the dropping out of switch VDH, the circuit for the coil of relay VRR is completed through contacts VDM1. However, as contacts WT4 for the car leaving the terminal are separated, the reset circuit for the coil of switch VDM can not be completed. Thus relay VRR is reoperated to cause the giving of down dispatching signals to another car upon its arrival at the top terminal, or to cause a car to be selected in the selection zone to receive these signals. In either case, switch CU is reset to transfer its corresponding RB resistance to the down leg of the bridge to restore the balance. Also switch VDM is reset causing the reengagement of contacts VDM2 to reconnect the balancing circuits.

Should in the last example the giving of down corrective signals be prevented by further operations of the timing mechanism, switch VDM remains operated until down corrective dispatching signals are given to a car at the top terminal and the car is started down, or a car is selected to receive these signals in the selection zone. This is due to the fact that the circuit for the reset coil of switch VDM is broken at contacts VDH2 while the timing mechanism is effective and at contacts WT4 until another car is selected. As soon as a car arrives at the top terminal or is selected in the selection zone before the timing interval expires, it is given corrective signals and switch VDM is reset as a result of the reengagement either of contacts E1 or VSR3 for that car.

Thus it is believed that it will be seen without further examples of operation that, with an even number of cars in service and for approximately equal up and down traffic conditions, regardless of the conditions under which an unbalance occurs to cause operation of either switch VUM or switch VDM, the dispatching of a car by corrective dispatching signals to restore the balance is assured.

Assume now that an odd number of cars are in service under conditions of approximately equal up and down traffic. Under this assumption, even car switch VE is not operated and consequently switch VS is not operated. Thus contacts VS1 and VS3 are separated.

As regards the relationship of the cars to the starting signals with an odd number of cars in service, since the starting signals are given alternately there will be an apparent unbalance of cars either on the up trip or the down trip, i. e., more cars in one direction than the other. Yet this is actually a balanced condition for the cars are responding to their starting signals in the intended manner as has been previously described. To prevent the false registration of an unbalanced condition on the bridge under such apparent unbalanced conditions, the bridge is balanced by the control exercised on resistances RUS and RDS by switch CT, contacts CT1 and CT2 of which are rendered effective because contacts VS1 and VS3 are separated.

For a better understanding of these operations assume that three cars, namely, cars $a$, $b$ and $c$ are in service, that car $c$ is travelling down and car $b$ is travelling up and that car $a$ has arrived at the bottom terminal and has received its up dispatching signals. As the dispatching signals are given alternately as previously described, as to switches VUS and VDS, switch VUS has been operated and reset so that contacts VUS1 and VDS2 are separated and contacts VUS2 and VDS1 are engaged. Switch CT is operated along with switch VUS and remains latched in operated condition. Thus contacts CT1 are separated and contacts CT2 are engaged. As car $d$ is out of service, contacts CS1$d$ are separated. Under the assumed conditions, therefore, resistances RB$c$ and RUS are connected in the down leg of the bridge and resistances RB$a$ and RB$b$ are connected in the up leg of the bridge so that the bridge is balanced. Upon the arrival of car $b$ at the top terminal and operation of the timing mechanism, switch VDS is operated and switch CT is reset. Thus resistance RUS is disconnected and resistance RDS is connected in its place in the down leg of the bridge and no change in the bridge balance occurs. Upon the reset of switch VDS as car $b$ is started down, contacts VDS2 separate and contacts VDS1 engage to transfer resistance RDS to the up leg of the bridge. At the same time switch CU$b$ transfers resistance RB$b$ to the down leg of the bridge so that the bridge remains balanced. It is believed that the operation of the balancing circuits under balanced condition will be understood from the above description without further examples of operation.

Should the cars get out of balance for any reason either relay UBR or relay DBR operates to correct the unbalance. Assume that car $b$ leaves the upper terminal before receipt of its dispatching signals, which places the cars out of balance. The resistances are balanced at the instant before the car leaves as above explained. Inasmuch as switch CT is not reset as the car has not received dispatching signals, there is no transfer of resistance RDS to the up leg of the bridge to balance the transfer of resistance RB$b$ to the down leg of the bridge as the car leaves. This unbalances the bridge, causing operation of relay UBR to cause the giving of corrective up dispatching signals to a car at the bottom terminal as previously described, thereby restoring the balance.

Assume that car $a$ leaves the bottom terminal before receipt of its dispatching signals, placing the cars out of balance. It is believed that it will be understood from the above description that this places two more resistances in the up leg of the bridge than in the down leg of the bridge so that relay DBR is operated to cause the giving of down corrective signals to the selected car at the top terminal or, if no car is there, to cause a car which has reached its highest call to be selected in the selection zone to receive down corrective dispatching signals as it comes to a stop. As soon as a car has been dispatched from the top terminal by corrective dispatching signals or has been definitely assigned corrective dispatching signals in the selection zone, the reset of switch CU for that car transfers resistance RB for that car to the down leg of the bridge, restoring the balance.

The corrective dispatching signals and timed dispatching signals may overlap in which event the corrective signals are held in abeyance in a manner similar to that described under the assumption of an even number of cars in service. Assume that the unbalance is such that switch VUM is operated. Should the time interval expire to operate switch VUS before a car is given the corrective up signals, the reset of switch VUM is prevented by contacts VUH1 and VL3 as previously described. Therefore, switch VUM remains operated to cause up corrective dispatching signals to be given to another car at the bottom terminal. Assume now that the unbalance is such that switch VDM is operated. Should the time interval expire to operate switch VDS before a car at the top terminal is given corrective down signals and is started down or before a car is selected in the selection zone, the reset of switch VDM is prevented by contacts VDH2 and contacts WT4 as previously described. Therefore, switch VDM remains operated to cause down corrective dispatching signals to be given to another car.

Thus it is seen that, with the system set for an odd number of cars in service and for approximately equal up and down traffic, regardless of the conditions under which an unbalance occurs, the balancing device acts to correct this unbalance. While in the examples of operation so far given under conditions of approximately equal up and down traffic with an even or an odd number of cars in service, the number of elevators in service was assumed to be four and three, similar operation is had with other even numbers say six, eight, etc., of cars in service and with other odd numbers, say five, seven, etc., of cars in service. It is believed that this will be understood from previous description without further discussion.

In changing over, under conditions of approximately equal up and down traffic, from an even to an odd number of cars in service or from an odd to an even number, the changeover may be effected at such time as to cause an unbalance. In such case the balancing device acts as previously described to correct the unbalance. For example, assume that car $d$ is out of service at the bottom terminal, that car $c$ is on down motion and car $a$ and car $b$ on up motion and that switches VUS and VDS are both reset. Under such conditions, resistances RB$a$ and RB$b$ are connected in the up leg of the bridge and resistances RB$c$ and RUS are connected in the down leg of the bridge. Assume further that under such conditions switch DIC$d$ is closed to put car $d$ back in service at the bottom terminal. This causes the connection of resistance RB$d$ in the down leg of the bridge as switch CU$d$ is reset under the assumed conditions. It also causes the connection of resistance RDS in the up leg of the bridge due to the fact that switch VS is operated. Thus the bridge remains balanced. The next operation of the timing mechanism causes the giving of up dispatching signals to car $d$ and of down dispatching signals to car $a$, assuming it has arrived at the top terminal. Thus no unbalance occurs under the conditions assumed.

Assume now that two cars are down cars and one is an up car when car $d$ is restored to service. Under such conditions, prior to adding car $d$, the two RB resistances for the down cars are balanced by resistance RB for the up car and resistance RDS, switch CT being reset. Upon adding car $d$ at the bottom terminal, resistance RB$d$ is connected in the down leg as before but resistance RUS is also connected in the down leg by the engagement of contacts VS3. This creates an unbalance causing the operation of relay UBR to give up corrective signals to car $d$, correcting the unbalance.

When changing over from an even to an odd number of cars in service, there may again be an apparent unbalance when in fact the cars are balanced. Assume that car $d$ is taken out of service when it is an up car. There will then be left two down cars and one up car. Assume further that switches VUS and VDS are in operated condition when car $d$ is taken out of service. As soon as cars are dispatched as a result of the operation of switches VUS and VDS, there will still be two down cars and one up car. Since under the assumed conditions the next dispatching signal, after the reset of switches VUS and VDS, will be an up signal, there will be two up cars and one down car. Thus the cars are balanced.

When car $d$ is removed from service, resistance RB$d$ is removed from the up leg. To prevent the operation of relay UBR when this takes place, resistance ROE is connected in the up leg by contacts VS2 to replace resistance RB$d$, contacts VDA2 and VUA1 being engaged under the conditions assumed. As both switches VUS and VDS are assumed to be operated, resistances RUS and RDS are connected respectively in the up leg and down leg of the bridge so that they balance each other and thus the bridge is balanced. Assume that, in dispatching the cars as a result of the operation of switches VUS and VDS, up dispatching signals are first given a car at the bottom terminal. This resets switch VUS with the result that contacts VUS1 and VUA1 separate, disconnecting resistances RUS and ROE from the up leg of the bridge. Resistance RUS is not transferred to the down leg of the bridge as contacts CT2 and VS3 are separated. However, switch CU for the car which was given the up dispatching signals is operated at the same time to switch over resistance RB for that car to the up leg of the bridge, thereby maintaining the bridge balance. As soon as switch VDS is reset incident to the dispatching of a car on its downward trip, resistance RDS is transferred from the down leg to the up leg of the bridge. At the same time the car which is dispatched has its RB resistance transferred from the up leg to the down leg of the bridge by the reset of its switch CU, and the bridge remains balanced. Thus upon reoperation of switch VUS for giving up dispatching signals the bridge is in balanced relationship. It is believed that it will be seen that, should an up car be taken out of service after the reset of either or both of switches VUS and VDS but before the reoperation of switch VUS to give an up signal, the bridge remains balanced and no corrective signals are given.

Assume that car $d$ is removed from service when it is a down car and during the period from the time switches VUS and VDS operate to the time that switch VUS is reoperated to give an up signal. There will then be left one down car and two up cars. Upon the next operation of switch VUS there would be three up cars and no down cars. Thus the cars would be unbalanced.

When car $d$ is removed from service, resistance RB$d$ is removed from the down leg of the bridge. If contacts VDA2 and VUA1 are engaged at this time, the connection of resistance ROE in the up leg of the bridge does not balance the bridge as there will be two RB resistances in the up leg of the bridge along with resistances ROE and RUS and only one RB resistance in the down leg of the bridge along with resistance RDS. If switch VUS is reset at the time car $d$ is removed from service, resistances RUS and ROE are not connected in the up leg of the bridge as contacts VUS1, CT2, VS3 and contacts VUA1 are separated. However, switch CU for the car which is given the up dispatching signals has transferred resistance RB for that car to the up leg of the bridge. Thus there will be three RB resistances in the up leg and only resistance RDS in the down leg of the bridge. As soon as switch VDS is reset incident to the dispatching of a car on its downward trip, resistance RDS is transferred from the down to the up leg of the bridge while at the same time the RB resistance for that car is transferred from the up leg to the down leg of the bridge. Thus two RB resistances and resistance RDS are connected in the up leg of the bridge and only one RB resistance is connected in the down leg of the bridge. Upon the reoperation of switch VUS for giving up dispatching signals, resistance RUS replaces resistance DRS in the up leg of the bridge due to the separation of contacts RUS1 and CT1 and upon the reset of switch VUS and the attendant operation of switch CU for the car being dispatched, resistance RUS is transferred to the down leg of the bridge at the same time the RB resistance for the car being dispatched is transferred to the up leg of the bridge, and the bridge remains unbalanced. Thus it is seen that the bridge is unbalanced under all of the above assumed conditions and the unbalance is not corrected by the subsequent operation of switch VUS. Therefore, as soon as car $d$ is removed from service under any of the above assumed conditions, relay DBR is operated to cause the giving of corrective down dispatching signals to a car to correct the unbalance.

Assume now that a car is removed from service when it is a down car and that this occurs more than a half timing interval after dispatching signals were given so that the next signals will be down signals. Since at the time that car $d$ is taken out of service there will be left two up cars and one down car and as after the next dispatching operation there will be two down cars and one up car, the cars are balanced. If the car had been an up car when it was taken out of service, there would have been left two down cars and one up car and upon the giving of down dispatching signals there would be three down cars and no up cars so that the cars would be unbalanced. It is believed it will understood from the above description that in the first case the bridge remains balanced but in the second case it is unbalanced, causing the giving of up corrective signals to restore the unbalance of cars.

It is believed it will be seen therefore that with the system set for operation under approximately equal up and down traffic conditions and with either an even or an odd number of cars in service, the balancing device acts automatically to correct any condition of unbalance that should arise. Also, the system acts to prevent a false operation of the balancing device under conditions of apparent unbalance.

Referring now to conditions of up and down traffic with traffic in one direction predominant, assume first with an even number, say four, of cars in service that traffic becomes predominant in the down direction. For this condition, traffic distributor switch UDTS is set in position 3. For convenience of description, assume that switch UDTS is moved from position 2 to position 3 and that at that time car $b$ and car $d$ are on up motion and car $a$ and car $c$ are on down motion, that both of switches VUS and VDS are reset, and that the next half timing interval has expired, i. e., switch CT is operated. Thus at the instant before switch UDTS is moved to position 3, the cars are balanced for conditions of approximately equal up and down traffic. This balance is registered on the bridge by having resistances RDS, RB$b$ and RB$d$ connected in the up leg of the bridge and resistances RUS, RB$a$ and RB$c$ connected in the down leg of the bridge. When switch UDTS is moved from position 2, the circuits for switches VU, VUD and VD are broken. However, as switch UDTS moves into position 3 it completes the circuit for the coil of down interim traffic switch VDD. This switch upon operation engages contacts VDD1 to reestablish the circuit for the coil of switch VUD causing this switch and thus also switches VU and VD to reoperate. Switch VDD also separates contacts VDD5 to break the circuit for the coil of switch VS. It also engages contacts VDD3 with the net result that traffic lights UTL1, DTL1 and DTL2 are all lighted. It also engages contacts VDD2 to connect resistance RDD in the up leg of the bridge. At the same time the separation of contacts VS1 disconnects resistance RDS from the up leg of the bridge so that the bridge is balanced. As the next dispatching signals will be down signals, there will be three down cars and one up car. After that the next dispatching signals will be up signals and there will then be two up cars and two down cars. In other words, the cars are balanced for down predominant traffic conditions. As the bridge remains balanced, no corrective signals are given.

Should switch CT be reset at the time of the above switch-over of switch UDTS from position 2 to position 3 so that the next dispatching signals will be up signals, instead of resistance RDS being disconnected from the up leg of the bridge, resistance RUS is disconnected from the down leg. Thus both resistances RDD and RDS are connected in the up leg of the bridge and are unbalanced. This will not be corrected by the next timed dispatching signals as they will be up signals. At this time resistance RUS replaces resistance RDS in the up leg and is in turn replaced by the RB resistance for the car given the up dispatching signals as the reset of switch VUS transfers resistance RUS to the down leg. This would place three cars on an up trip and but one car on a down trip so that the cars would not be balanced for predominant traffic conditions. To correct for the unbalance, relay DBR is operated as soon as the bridge unbalance occurs to cause the giving of corrective down dispatching signals.

Assume now with still an even number, say four, of cars in service that under up and down traffic conditions traffic is predominant in the up direction. For this condition, traffic distributor switch UDTS is set in position 4. Assume that switch UDTS is moved from position 3 to position 4 and at a time when two cars are on down motion and two cars are on up motion. Assume further that switch CT is reset and that switch VUS will be the next to operate to initiate up dispatching signals. This will cause more cars to be assigned to up motion than to down motion. When switch UDTS is moved to position 4, it completes the circuit for the coil of up interim traffic switch VUU. This switch engages contacts VUU1 causing reoperation of switches VUU, VU and VD. It also engages contacts VUU4 with the net result that traffic lights UTL1, UTL2 and DTL1 are all lighted. It also engages contacts VUU2 to connect resistance RUU in the down leg of the bridge. It also separates contacts VUU5 so that switch VS is again deenergized with the result that the separation of contacts CT2 disconnects resistance RUS from the down leg of the bridge so that the bridge remains balanced. As the next dispatching signals will be up signals there will be three up cars and one down car. After that the next dispatching signals will be down signals and there will then be two down cars and two up cars. In other words, the cars are balanced for up predominant traffic conditions. As the bridge remains balanced, no corrective signals are given. However, should switch CT be operated at the time of the switch-over so that the next dispatching signals will be down signals, instead of resistance RUS being disconnected from the down leg of the bridge, resistance RDS is disconnected from the up leg. Thus both resistances RUU and RUS are connected in the down leg of the bridge and are unbalanced. This will not be corrected by the next timed dispatching signals as they will be up signals. At this time resistance RDS replaces resistance RUS in the down leg of the bridge and is in turn replaced by the RB resistance for the car dispatched by the down dispatching signals as the reset of switch VDS transfers resistance RDS to the up leg of the bridge. This will place three cars on the down trip and but one car on an up trip so that the cars will not be balanced for predominant up traffic conditions. To correct for the unbalance, relay UBR is operated as soon as the bridge unbalance occurs to cause the giving of corrective up dispatching signals.

Assume now under conditions of up and down traffic with an odd number, say three, of cars in service and with the cars balanced that traffic becomes predominant in the up direction. Assume that switch UDTS is moved from position 2 to position 4, and that at that time car a and car b are on up motion and car c is on down motion, car d being removed from service. Inasmuch as switch VE is deenergized under such conditions its contacts VE2 in the circuit for the coil of switch VS are separated. However, upon movement of switch UDTS to position 4, the resultant operation of switch VUU causes engagement of contacts VUU3, completing another circuit for the coil of switch VS through contacts VE1. Thus switch VS is operated, causing the operation of switches VUS and VDS to give dispatching signals to be simultaneous. Inasmuch as a condition has been assumed in which two cars are on up motion and one on down motion, the simultaneous operation of switches VUS and VDS to dispatch the cars will continue that relationship so that the cars are balanced for the assumed condition of traffic and no corrective signals need be given. No corrective signals are given as, at the time of switch-over, resistances RBa and RBb are in the up leg and resistance RBc is in the down leg to which is added resistance RUU as a result of the engagement of contacts VUU2. As switch VS is operated, resistances RUS and RDS balance each other. Thus the bridge is balanced and no operation of a balancing relay takes place.

In the above example, should there have been one car on up motion and two on down motion at the time of the switch-over, the simultaneous operation of switches VUS and VDS would have continued that relation so that the cars would be out of balance for the assumed traffic conditions. Balancing relay UBR is operated under such conditions to give corrective dispatching signals by the unbalance of the bridge created by having two RB resistances and resistance RUU in the down leg and only one RB resistance in the up leg.

Assume now that under conditions of up and down traffic with an odd number, say three, of cars in service and with the cars balanced that traffic becomes predominant in the down direction. To set the system for such traffic conditions, switch UDTS is moved to position 3 as previously described. The operation of switches VUS and VDS is caused to be simultaneous under such contacts as switch VS is operated, the circuit for the coil of switch VS being completed through contacts VDD4 and VE1. It is believed that it will be understood from previous description that if there are two cars on down motion and one car on up motion at the time of switch-over, the cars are balanced and will remain balanced for the particular traffic conditions and that no operation of the balancing relay takes place. However, should at the time of the switch-over only one car have been on down motion and two cars on up motion, the cars are out of balance and that relay DBR is operated to give a corrective down dispatching signal to change-over the cars to two on down motion and one on up motion.

Thus it is seen that with the traffic distributor switch in position 4, one more interval is allotted to the up trip than to the down trip and more cars are placed on the up trip than on the down trip. With the traffic distributor switch in position 3, one more interval is allotted to the down trip than to the up trip and more cars are placed on the down trip than on the up trip. In either case, if an even number of cars are in service, the dispatching signals are initiated alternately and, if an odd number of cars are in service, the dispatching signals are initiated simultaneously. If with an even number of cars in service the traffic distributor switch is moved from position 2 to position 4 under conditions where the next starting signals to be initiated will be up signals the desired assignment of cars to up and down strips is had without corrective operation by the balancing device. However, if this operation should take place at a time when the next dispatching signals to be initiated are down signals which would place more cars on a down trip than on an up trip the balancing device operates to dispatch a car in the up direction to place the cars in balance. Similarly, if with an even number of cars in service the traffic distributor switch is moved from position 2 to position 3 under conditions where the next dispatching signals to be initiated will be down signals the desired assignment of cars to up and down trips is had without corrective operation by the balancing device. However, if this operation should take place at a time when the next dispatching signals to be initiated are up signals which would place more cars on an up trip than on a down trip the balancing device operates to dispatch a car in the down direction to place the cars in balance. If with an odd number of cars in service the traffic distributor switch is moved from position 2 to position 4 under conditions where there is one more car on up motion than on down motion, the desired assignment of cars to up and down trips is had without corrective operation of the balancing device. However, if this operation should take place at a time when there is one more car on down motion than on up motion the balancing device operates to dispatch a car in the up direction to place the cars in balance. Similarly, if with an odd number of cars in service the traffic distributor switch is moved from position 2 to position 3 under conditions where there is one more car on down motion than on up motion the desired car assignment is had without corrective operation of the balancing device. However, if this operation should take place at a time when there is one more car on up motion than on down motion the balancing device operates to dispatch a car in the down direction to place the cars in balance.

It is believed that it will be seen from previous description without further explanation that with the traffic distributor switch UDTS in either position 3 or position 4, should the cars get out of balance, the corresponding unbalance of the bridge circuit would be effected by the transfer of resistances indicative of the unbalance, causing the operation of the proper balancing relay to correct the unbalance.

Also, it is believed that it will be seen without detailed explanation that, with the traffic distributor switch in either position 3 or position 4, should a car be taken out of service or placed back in service and switch DIC for the particular elevator involved be operated at such time as to cause an unbalance of the cars, the balancing device operates to automatically correct the unbalance and thus place the cars on proper time distribution balance for the new condition of operation.

When with the system operating under conditions of up and down traffic with traffic predominant in one direction, traffic reverts to approximately equal up and down, the traffic distributor switch is returned to position 2. It is believed that it will be understood from previous explanation that should this take place at a time to cause the cars to be unbalanced, the balancing device acts automatically to correct this condition.

In view of the detailed description of operation given, it is believed that it will also be seen that when switch UDTS is moved from either position 1 or position 5 to any one of position 2, 3 or 4, the dispatching signals are given so as to dispatch the cars to automatically place them in the desired distribution for the particular position to which the switch is moved.

While in the examples of operation under up and down traffic conditions in which a predominance of traffic in one direction is involved, the number of elevators in service for the operation described were four and three, similar operation is had with other even numbers, say six, eight, etc., and other odd numbers, say five, seven, nine, etc., of cars in service.

Furthermore, while in the examples of operation to illustrate unbalanced conditions, the unbalances were not extreme, the balancing device acts to correct the unbalance regardless of how extreme the unbalance may be. For example, when all cars are at the bottom terminal at the time switch UDTS is moved to one of positions 2, 3 or 4 corrective dispatching signals are given until the cars are in balance for the particular position of switch UDTS and the number of elevators in service.

The starter may manually dispatch a car from the lower terminal by pressing button MUSB. This causes operation of switch VUM to give dispatching signals to a car at the bottom terminal as previously described. The manual dispatching of a car by pressing button MUSB will cause an unbalance of cars when the manually dispatched car leaves. However, the balancing device acts automatically as previously described to dispatch a car on down signals, restoring the balance. Similarly the starter may manually dispatch a car on a downward trip by pressing button MDSB. This causes operation of switch VDM to give dispatching signals to a car at the top terminal or to cause a car to be selected in the selection zone as previously described. The manual dispatching of a car by pressing button MDSB will cause an unbalance with the cars which is corrected automatically by the balancing device as previously described to dispatch a car on up signals. Should the starter desire to signal the attendant in any one of the cars, he may do so by pressing the call back button for that car. Referring to car $a$ for example, the pressing of call back button CLB$a$ (Figure 13) completes a circuit for buzzer or gong BU$a$ in car $a$. The information conveyed can be in accordance with any prearranged code.

As each car moves up and down the hoistway, its position indicator lights are lighted to indicate to the starter the position of the car in the hoistway. The position indicator circuits for car $a$ are illustrated in Figure 7. The lamps for lighting the position indicator are designated PI$a$ with numerals indicative of the floors for which the lamps are provided. The circuits for these lamps are completed in succession by the engagement of brush PIBR$a$ on the synchronous panel with stationary contacts PIC$a$ for the floors. With the brush in the position illustrated, the circuit is completed for lamp PI$l$$a$ to show that the car is positioned at the bottom terminal. As the car moves up the hoistway, these indicator light are lighted in succession in the order in which the floors are reached. Likewise, the lamps are lighted in the order in which the floors are reached on the downward trip.

Should a car be abnormally delayed in leaving any floor, the position indicator light for that floor is caused to flicker to advise the starter of that fact. This is effected by the control of flicker switches PT and PTX. Referring to the circuits for car $a$, as the car comes to a stop at a floor, the separation of contacts H2a breaks the circuit for the coil of time delay switch TUDa. This switch is delayed in dropping out for a certain time interval by the discharge of condenser QTUDa. Upon dropping out, contacts TUD3a engage and, if either contacts WTS4a or contacts WBX7a are engaged, a circuit is completed for the coil of light flicker switch PTa. Contacts WBX7a are engaged if the car is at the bottom terminal, provided it has been selected and the dispatching timing interval has expired. Contacts WTS4a are engaged if the car is at an intermediate floor as both switches MLa and THLa are deenergized under such conditions and thus contacts ML2a and TH4a are engaged, completing a circuit for the coil of top starting switch WTSa. The circuit for the coil of switch WTSa is also completed with the car at the top terminal, provided it has been selected and the dispatching timing interval has expired. This is due to the fact that under such conditions the circuit for the coil of auxiliary top selection switch WTXa is completed through brush VDRB1, contact VDRC1a, contacts VRR1a and contacts VT1a, and thus switch WTXa is operated engaging contacts WTX1a to by-pass contacts THL1a which are separated when the car is at the top terminal.

Switch PTa upon operation engages contacts PT1a to complete a circuit for the coil of auxiliary light flicker switch PTXa. Switch PTa is delayed slightly in operation by the effect of resistance RPT1a to insure the charging of condenser QPTa before the operation of switch PTXa. Switch PTXa upon operation separates contacts PTX2a to break the circuit which feeds brush PIBRa thereby causing the extinguishing of the position indicator lamp for the floor at which the car is positioned. Relay PTX also separates contacts PTX3a breaking the initial energizing circuit for the coil of switch PTa. This switch does not drop out immediately being delayed by the discharge of condenser QPTa. Upon dropping out switch PTa separates contacts PT1a to break the circuit for the coil of switch PTXa which is also delayed in dropping out by the discharge of condenser QPTXa. Upon dropping out switch PTXa engages contacts PTX2a to cause the relighting of the position indicator lamp and engages contacts PTX3a to reestablish the circuit for the coil of switch PTa. This cycle is repeated causing the flickering of the position indicator light until the condition is corrected. In this way if a car is unduly held up at any intermediate floor or if it is delayed in starting from either terminal after receipt of its dispatching signal, the starter is advised of this fact so that he may inquire into the condition and have it corrected.

For night service, switch UDTS is moved to position 6. In this position switches VU and VD are deenergized so that contacts VU1, VD2, VU3 and VD7 are separated. This disconnects the dispatching circuits from the supply lines, shutting down the dispatching system. Also a circuit is completed for the coil of night service relay VN. This relay operates to engage contacts for each car represented by contacts VN3a and VN3c. This causes continuous lighting of the up hall lantern for each car at the bottom terminal, provided the car is in service. It is usual, especially in installations of this size to use but one car for night service. This will be car $a$ in the circuits illustrated as it is arranged for basement service.

Referring to the circuits for car $a$ and assuming that the car is standing at the bottom terminal, a person entering the building will be directed to that car by its lighted up hall lantern. He enters the car and calls his destination whereupon the car attendant registers the appropriate car call and starts the car, thus carrying the passenger to his destination. Should a landing call be registered while the car is at the bottom terminal, buzzer relay BL and relay XSa are both operated causing the engagement of contacts BL1a to complete a circuit through switch TO15a and contacts VN1a and H11a for the buzzer or gong BUa in car $a$ and the engagement of contacts XS4a to complete a circuit through switch TO4a for highest call return light HCLa. The sounding of the gong advises the attendant that a landing call has been registered and the lighting of the light tells him that the call is above the car. Assuming that a down fifth floor call is the one registered, the circuit for the coil of relay BLa is from the cathode of tube D5, through rectifiers VHD5, VHH4, VHH3, VHH2 and VBL1, and coil BL to line B. The circuit for the coil of relay XSa is from the cathode of tube D5, through rectifiers VHD5, VHH4 and VHH3, contact HH2, brush HRB1a, rectifiers VHRB1a and VHRB2a, coil XSa and contacts PR8a to line B. The attendant then starts the car in the up direction to answer the call. Inasmuch as switch VD is deenergized, its contacts VD3 are separated so that the car is capable of responding to a down call at any floor above on its upward trip, provided this is its highest landing call and no car call is registered for a floor above. Thus the car stops at the fifth floor and becomes set for downward travel as it is brought to a stop. The highest call return light HCLa is maintained lighted during the slow-down operation by contacts XL3a after the dropping out of relay XSa. As the car comes to a stop contacts XL3a separate and the light is extinguished, advising the attendant that he has reached the highest call and that the car will leave the floor in the down direction. A landing call from the basement is responded to in the manner previously described. The registration of the basement call completes the circuit for relay BL by way of rectifier VUHB. Also relay BL is operated when a down landing call is registered at the main floor, the circuit being by way of rectifier VHD1. Rectifiers VUHB and VDH1 act to block the flow of unwanted current to the coils of relays FDY and BFU due to coils registered for floors above.

When the starter locks his starter's station for the night, he throws day cut-out switch DCS counterclockwise to the lower position. This completes another circuit for the coil of switch VN. Switch DCS is located in the clock compartment so that there is no access to this switch when the clock compartment panel is locked. Thus any unwarranted manipulation of switch UDTS does not throw the system off night service.

The operation of the elevators on "without attendant" operation, i. e., with no attendants in the cars, will now be described. As previously described, the system may be set for "without attendant" operation by means of multi-pole double throw switch TSOS, one pole for each car (see Figure 12 for car $a$). This switch may if desired be positioned in the clock compartment of the starter's panel. Upon throwing this switch into position w/o a circuit is completed for car a for example through switch KTOa, switch TSOSa and limit switch TOL1a for the armature TOMAa and field winding TOMFa of the throw-over switch motor TOMa, causing it to move the throw-over switches TO1a to TO15a from "with attendant" position w into "without attendant" position w/o. When this change has been effected, limit switch TOL1a opens to break the motor circuit.

The throw-over of switch TO1a renders contacts XC1a effective in controlling the connection of contact CP1a to line W16a. Switch TO2a renders non-stop button NSBA ineffective. Switch TO3a renders the reversal buttons DRBa and URBa and the call registration circuits ineffective. Switch TO4a renders highest call return light HCLa ineffective. Switch TO5a completes the circuit for the coil of signal throw-over switch relay TOSYa and prepares the circuits for the coil of door reopen switch ROa. Switch TO6a renders condenser QNTTa effective in the control of switch NTTa. Switch TO7a renders contacts VN4a, THL3a and ML5a effective to control the coil of door close relay XDCa. Switch TO8a renders the control of running switch KRa subject to the dispatching mechanism instead of start button SBa. Switch TO9a renders the door close switch DCA subject to switch NTa instead of relay XDCa. Switch TO10a renders door limit switch GHa effective for "without attendant" operation, this switch being in operated condition whenever the door and gate are not in closed position. Switch TO11a removes the by-pass for contacts TUD1a, WTS2a and WBX6a and connects condenser QXCSa across the coil of auxiliary car cut-out switch XCSa. Switch TO12a renders load non-stop relay LNRa effective for "without attendant" operation. Switch TO13a renders contacts DC3a effective to control resistance RDMP. Switch TO14a renders reversal cut-out switch RCa effective. Switch TO15a renders the control of buzzer BUa by buzzer relay BL ineffective.

Switch TOSYa, upon operation engages contacts TOSY1a to render door controlled buzzers BU1a and BU2a effective for "without attendant" operation. It engages contacts TOSY2a to render auxiliary bottom terminal relay XVBa effective. It separates contacts TOSY3a to render contacts DC1a and door open button DOB2a ineffective to control the door open switch. It engages contacts TOSY4a to render the door protective circuits effective. It separates contacts TOSY5a to render basement service light BSLa ineffective. It also engages contacts TOSY6a to render auxiliary basement relay BFU effective to control basement service relay BFa.

It is believed that, in view of the previous detailed description, the operation of the system without attendants in the car will be understood from assumed examples of operation. Certain operations are the same as described for "with attendant" operation and will not be repeated. It will be assumed that traffic in each direction is approximately equal for which switch UDTS is set in position 2 and that either an even or an odd number of cars are in service. It will be further assumed that car a is at the bottom terminal and has been selected and that the timing interval has not yet expired. The selection of the car caused the engagement of contacts WB9a to effect the lighting of up hall lantern UHL1a. As car a arrived at the bottom terminal the hoistway door and car gate were opened as a result of the closing of switch SLS2a as previously described. Upon the operation of switch DOa to open the door and gate, it engages contacts DO1a to complete a circuit through contacts NT5a for the coil of switch NTTa, by-passing contacts OS4a and thus maintaining both switch NTTa and switch NTa operated after contacts OS4a separate. As the door and gate reach open position, contacts DO1a separate to break the circuit for the coil of switch NTTa. Switch NTTa does not drop out immediately contacts DO1a separate, being delayed by the discharge of condenser QNTTa. Assuming that the selection of the car occurs before this time interval expires, contacts WB5a engage to maintain switch NTa operated after the separation of contacts NTT1a. Thus contacts NT3a are maintained separated to prevent the reclosing of the door and gate. Thus time is allowed for passengers to leave the car at the bottom terminal and also for incoming passengers to enter the car after it is selected.

Upon the operation of switch VUS at the expiration of the timing interval, it causes the operation of switch WUS. Switch WUS causes the reset of switch VUS and the operation of switch WBXa as previously described. The resultant separation of contacts WBX2a causes the dropping out of relay VBa and thus the dropping out of switch WBa, also previously described. Switch WBa, upon dropping out, separates contacts WB6a to extinguish the hall lantern. It also separates contacts WB5a to break the circuit for the coil of switch NTa. Switch NTa drops out to engage contacts NT3a, completing a circuit for the coil of door close switch DCa through contacts DP1a, limit switch DCL1a, contacts OS1a and DO1a and throw-over switch TO9a. This causes closing of the door and gate. As the door and gate reach closed position, the engagement of gate contacts G1a completes a circuit for the coil of running switch KRa through switch TO8a, contacts XS1a (closed under the assumed conditions of operation) and contacts WBX1a and NT2a. Switch KRa engages contacts KR2a to cause the operation of stopping magnet SMa, causing in turn the operation of switch ASMa and thus the advance of the carriage. As this takes place switch SLS1a closes to complete the circuit for the coil of switch Ha, causing the starting of the car in the up direction.

Assume now that car a is at the top terminal and has been selected but that the timing interval has not yet expired. As the car is selected contacts WT1a are engaged so that down hall lantern DHL9a is lighted. As the car was brought to a stop at the top terminal the hoistway door and car gate were opened as a result of the closing of switch SLS2a. Also, as the car arrived at the top terminal, brush LB2a engaged contact TLC2a to complete the circuit for the coil of top landing switch THLa. Switch THLa upon operation engages contacts THL2a which completes a circuit through contacts WTS3a for the coil of switch NTa, thus maintaining the door and gate in open position after the expiration of the time delay in the dropping out of switch NTTa.

Upon the operation of relay VRR at the expiration of the dispatching timing interval, it engages contacts VRR1a to complete the circuit for the coil of auxiliary top selection switch WTXa, inasmuch as with the car selected, contacts VT1a are engaged and brush VDRB1 is in engagement with contact VDRC1a. This switch engages contacts WTX1a to complete a circuit for the coil of top starting switch WTSa through contacts ML2a, closed as the car is not at the bottom terminal. Switch WTSa separates contacts WTS3a, breaking the circuit for the coil of switch NTa with the result that contacts NT3a engage immediately to effect the closing of the door and gate. As the door and gate reach closed position, the engagement of gate contacts G1a causes the operation of running switch KRa to effect the starting of the car as previously described, the circuit for the coil of switch KRa being through contacts WTS1a. Inasmuch as the circuits were changed to down as the car was brought to a stop at the top terminal, the starting of the car is in the down direction. The down hall lantern is extinguished as a result of the separation of contacts ASM2a incident to the starting of the car. Also relay VRR is dropped out as a result of the reset of switch VDS incident to the starting of the car as previously described.

As in the case of "with attendant" operation, during upward travel of each car, stops are made in response to car calls and up landing calls for floors above the car in the order in which the floors are reached, and during downward travel stops are made in response to car calls and down landing calls for floors below the car in the order in which the floors are reached. When a stop is made at a floor during up car travel, the up hall lantern at that floor for the car which makes the stop is lighted in advance of the arrival of the car. Also when a stop is made at a floor during down car travel, the down hall lantern at that floor for the car which makes the stop is lighted in advance of the arrival of the car.

When a car, say car a, becomes fully loaded, say to 80% of capacity, its load non-stop switch LNSa operated by the load in the car is closed. Thus, upon the engagement of contacts DC2a incident to the closing of the door and gate, a circuit for the coil is completed of load non-stop relay LNRa. Just before the opening of door close limit switch DCL1a as the door and gate reach closed position, door close limit switch DCL2a opens to break the circuit for the coil of door limit switch GHa. This switch drops out to engage contacts GH2a and establish a holding circuit through contacts LNR2a for the coil of relay LNRa. Relay LNRa also separates contacts LNR1a, breaking the circuit for the coil of non-stop relay NSa. Thus stopping of the car in response to landing calls is prevented until room is provided in the car by the discharge of passengers. When this occurs, switch LNSa opens. Contacts DC2a and GH2a are open during the opening of the door and gate as each stop is made so that relay LNRa drops out. Thus as soon as switch LNSa opens, relay LNRa is not reoperated upon the reclosing of the door and gate. It is preferred to set the load non-stop for less than 100% capacity as this enables the passenger transfer to be more readily effected on "without attendant" operation.

As each stop is made the door and gate open automatically as a result of the closing of switch SLS2a. The automatic reclosing of the door and gate is subject to the delay in dropping out of switch NTTa by the discharge of condenser QNTTa. This allows time for passenger transfer to be effected. The time delay period starts from the time the door and gate reach open position and contacts DO7a separate to disconnect the coil of switch NTTa from the supply lines. As soon as this time interval has expired, switch NTTa drops out. When the stop is at an intermediate floor, the resultant separation of contacts NTT1a breaks the circuit for the coil of switch NTa with the result that contacts NT3a engage to effect the reclosing of the door and gate. Thus upon a stop at an intermediate floor, the door and gate automatically reclose as soon as the time interval expires.

At the terminal floors the reclosing operation is also subject to the dispatching mechanism. As a car, say car a, arrives at the top terminal, switch THLa is operated to engage contacts THL2a to complete another circuit for the coil of switch NTa as previously described. Assume that the dispatching timing interval has not yet expired. As soon as car a is selected at the top terminal, the circuit for its down hall lantern DHL9a is completed at contacts WT1a as previously described. Thus the car remains standing at the top terminal with its hall lantern lighted and door and gate open until relay VRR is operated at the expiration of the dispatching timing interval. As this takes place, contacts WTS3a are separated to break the circuit for the coil of switch NTa, causing the immediate closing of the door and gate and starting of the car as previously described. The separation of contacts ASM2a incident to the starting of the car causes the extinguishing of the hall lantern. If the dispatching timing interval had expired when car a arrived at the top terminal it is immediately selected as previously described, causing the lighting of the hall lantern. Also contacts WTS3a separate so that the circuit for coil NTa is maintained only at contacts NTT1a. Thus upon the expiration of the time delay due to the discharge of condenser QNTTa, the circuit for the coil of switch NTa is broken, causing the closing of the door and gate, the starting of the car and the extinguishing of the down hall lantern.

At the bottom terminal, when a car, say car a arrives at this floor, if it is selected but the dispatching timing interval has not expired, contacts WB5a are engaged. As a consequence, switch NTa is maintained operated after the door and gate reclosing time delay has expired. Thus the door and gate are maintained in operated condition. Also the up hall lantern UHL1a is lighted as a result of the car being selected. Incoming passengers are thereby attracted to car a. When the dispatching timing interval expires, switch WBa is dropped out as above described. As a result, contacts WB6a separate to effect the extinguishing of the hall lantern. Also contacts WB5a separate to effect the closing of the door and gate and the starting of the car, as previously described. If the car is not selected as it arrives at the bottom terminal, contacts WB5a do not engage so that switch NTa drops out as the door and gate reclosing the time delay expires. Thus the door and gate are closed after the passengers have been discharged and the car parks in this condition until selected. As soon as the car is selected, the engagement of contacts WB5a causes reoperation of switch NTa which engages contacts NT4a to cause operation of switch DOa and thus the reopening of the door and gate. As soon as the dispatching timing interval expires, switch WBa is dropped out with the result that the door and gate are immediately reclosed and the car is started in the up direction. Should the dispatching timing interval have expired at the time the car arrived at the bottom terminal, switch WBa is operated and is maintained in operation for the time delay provided by switch VTR as previously described. This causes the lighting of the hall lantern for a time sufficient for intending passengers to be attracted to the car. Also the door and gate are not reclosed until contacts WB5a separate at the expiration of this interval and contacts NTT1a separate at the end of the door and gate reclosing time delay.

When a passenger enters the car at an intermediate floor he may wish, if no other passengers are entering, to immediately initiate the reclosing of the door and gate. He may do this by pressing for car a door close button DCBa. This completes a circuit through contacts THL3a and ML5a for the coil of relay XDCa. This relay engages contacts XDC4a to connect resistance RNTT2a across condenser QNTTa, causing the condenser's rapid discharge and thus the dropping out of switch NTTa to initiate the door and gate reclosing operation. This button is not effective at the terminals as contacts ML5a are separated with the car at the bottom terminal and contacts THL3a are separated with the car at the top terminal.

If the door and gate are closing, they may be reopened by pressure of door open button DOB1 within the car. Assume that this is done in the case of car a. Pressure of button DOB1a completes a circuit for the coil of door reopen switch ROa through switch TO5a and contacts H1a. This switch, upon operation, engages contacts RO2a, completing a circuit for the coil of switch NTa and thus causing operation of switch DOa to effect the reopening of the door and gate. Switch DOa also engages contacts DO6a to maintain switch ROa in operated condition after release of button DOB1a and until the door and gate reach open position. A circuit is also completed by contacts NT5a for the coil of switch NTTa. However, rectifier VNTTa blocks the flow of current to condenser QNTTa and thus prevents the delay in dropping out of switch NTTa after the door and gate reach open position. However, condenser QROa is connected across the coil of switch ROa and is therefore charged upon the completion of the circuit for this coil. Thus, upon the door and gate reaching open position, switch ROa is prevented by the condenser discharge from dropping out immediately. Upon dropping out, switch ROa separates contacts RO2a, breaking the circuit for the coil of switch NTa and thus causing the reclosing of the door and gate as previously described. The pressing of button DOB1a may also be utilized to delay the initiation of the door and gate closing operation as the resultant operation of switch ROa maintains switch NTa operated until the time interval due to the discharge of condenser QROa has expired. The time delay provided by the discharge of condenser QROa is preferably less than that provided by the discharge of condenser QNTTa. If it be desired to initiate the immediate reclosing of the door and gate without waiting on the time interval due to the discharge of condenser QROa, door close button DCBa is pressed to cause operation of relay XDCa. This relay engages contacts XDC3a to connect resistance RRO1a across condenser QROa, causing the condenser's rapid discharge and the dropping out of switch ROa to initiate the door and gate reclosing operation. As previously pointed out this door close button is not effective at the terminals.

The closing door and gate may be reopened or their reclosing delayed by an intending passenger at the landing at which the car is stopped. This is effected by touching the landing button for the direction of travel for which the car is set (indicated by the lighted hall lantern). Assume that car a in its upward travel has been stopped at the third floor. The touching of button U3 causes the breakdown of the tube and the operation of relay XSMa by connecting its coil across resistance RUL3, such circuit having been previously traced. Relay XSMa engages contacts XSM1a which completes a circuit through switch TO5a and contacts H1a and ML3a for the coil of switch ROa. This switch operates as above described to cause reopening of the door and gate, or to delay their reclosing if open, as above described. This circuit for the coil of switch ROa is effective at any landing other than the bottom terminal as contacts ML3a are separated if the car is at that floor. However the car, here car a, which provides basement service, if parked with the door and gate closed at the bottom terminal and awaiting selection, may have the door and gate reopened in response to the touching of the down button D1. This has to do with basement service on "without attendant" operation which will be taken up later.

It is preferred to cause the door and gate closing operation to take place at a slower speed on "without attendant" operation than on "with attendant" operation. For convenience, this has been illustrated as effected by short circuiting resistance RDMPa in series with door motor field winding DMFa. This is done by the engagement of contacts DC3a at the initiation of the door closing operation. As a further protection to passengers on "without attendant" operation, door protective circuits are provided for causing immediate reopening of the door and gate should a passenger start to enter or leave the car during the door and gate closing operation. The door protective circuits for car a are shown in Figure 15 and, as above pointed out, are rendered effective for "without attendant" operation by the engagement of contacts TOSY4a.

Referring to Figure 15, the door protective circuits are connected to a source of single phase alternating current represented by wire W23a and ground GRa. DPDTa and SGTa are transformers for providing the desired values of alternating current voltage for the protective circuits, 120 volts R. M. S. having been found satisfactory in each case. Transformer DPDTa is a constant voltage transformer. VEDTa is a half wave rectifier for providing unidirectional current derived from transformer DPDTa, approximately 150 volts being obtained with 120 R. M. S. volts from the transformer secondary winding. A filter network is provided by condensers QF1a and QF2a and resistance RFa. Resistors REDTa and RCLa limit the amount of current flow. DPTa is an electronic gas tube which may be of the RCA 1C21 type. In the preferred arrangement a plurality of these tubes are provided in spaced vertical relation adjacent the leading edge of the gate. Three tubes have been found satisfactory for each gate. When the gate is in the form of center opening doors, these tubes are provided for each door. In elevator construction, vertical channels are provided at the leading edges of the gate and hoistway door to close the space between them.

These channels are known as sight guards, the hoistway door sight guards being designated SGa and the car door sight guards being designated CSGa. Each tube is provided with an antenna CANa in the form of a conductive plate connected both to the tube envelope adjacent the anode and to the control electrode DPTEa of the tube. These antennae are arranged in the channel of the car door sight guard and are of a total length to scan an average person, say five feet. The face of the car door sight guard is cut away in sections commensurate with the antennae and the cut-away sections are covered by a plate of non-conductive material such as Lucite. Each tube is positioned directly in back of and intermediate the ends of its antennae. The car door sight guard is connected to the ungrounded side of the secondary winding of transformer DPDTa, thus acting to electrically shield the antennae and tubes from ground. The hoistway door sight guards are connected to the ungrounded side of transformer SGTa, thus providing a further electrical shield for the antennae and tubes. The voltages applied to sight guards SGa and CSGa are substantially in phase. Resistors RVDa form voltage dividers, one for each tube, an adjustable point on the voltage divider being connected by way of a current limiting resistor RIBa to the control electrode DPTEa of each tube, which in turn is connected to the glass envelope of the tube adjacent the anode. But two tubes are shown, the circuits being repeated for additional tubes as indicated by the extension of wires WI1a, WI2a and WI3a to which the connections are made. Where the tubes are on the same car door or door section, sight guards CSG1a and CSG2a are one and the same as indicated by the dotted line connection. Where these tubes are on opposite sections of center opening car doors, these sight guards are separate. Two hoistway door sight guards SG1a and SG2a are shown. These may be on the two sections of center opening doors or on single opening doors at different floors. In either event, the guards at other floors are similarly connected as indicated by the extension of wire WI4a. When single opening doors are provided, the strike jambs are shielded. This is effected by connecting the car door strike jamb to the ungrounded side of the secondary winding of transformer DPDTa and by connecting the hoistway door strike jamb to the ungrounded side of the secondary winding of transformer SGTa.

Inasmuch as the same action takes place with respect to each tube DPTa, the operation with respect to one of them will be described. Referring to the circuit for tube DPT1a, with the arrangement illustrated, there is a capacity network from antenna CAN1a to shield CSG1a and from antenna CAN1a to ground. Thus a biasing voltage is applied to both the control electrode DPTE1a and the tube envelope adjacent the anode which bias is due to both a direct current potential taken from voltage divider resistors RVD11a, RVD12a and RVD13a, and an alternating current potential which is a function of the ratio of the two capacitors. This is adjusted so that the biasing voltage is just below breakdown value. Resistor RIB1 is of such value as to effectively isolate the alternating current source from the direct current source. When a person enters or leaves the car his body capacity in effect increases the antenna to ground capacity and thus brings the potential of the control electrode and the area of the tube envelope to which it is connected nearer to ground potential. When during the closing of the door and gate antenna CAN1a comes within a certain distance of a person, the alternating current potential reaches a value which causes breakdown of tube DPT1a, this being especially due to the action of this potential at the tube envelope adjacent the anode. This completes the anode-cathode circuit of the tube which extends through the coil of door protective relay DPa, causing this relay to operate. It is to be noted that the operation of relay DPa may be effected by the proximity of any antenna to a person entering or leaving the car as the coil of relay DPa is connected in a circuit common to the anode-cathode circuits of all of the tubes DPTa.

Upon operation, relay DPa separates contacts DP1a to break the circuit for the coil of door close switch DCa. It also engages contacts DP2a to complete a circuit for the coil of door open switch DOa, causing the immediate reopening of the door and gate. It also engages contacts DP3a to complete the circuit for the coil of auxiliary door protective relay DPXa. This relay, upon operation, engages contacts DPX2a which, owing to the fact that the door and gate are not closed, complete a circuit through contacts GH3a for the coil of switch ROa. It also engages contacts DPX1a to by-pass the circuits for tubes DPTa, causing the dropping out of relay DPa. This relay is delayed slightly in dropping out by the discharge of its coil through rectifier VDPa. This insures that the circuit for the coil of switch DOa will be completed long enough for this switch to operate. Switch DOa is maintained energized through contacts DO2a after contacts DP2a separate. When relay DPa drops out it separates contacts DP3a to break the circuit for the coil of relay DPXa. This relay is delayed in dropping out by the discharge of condenser QDPXa. This insures the full charging of condenser QROa and the deionization of tubes DPTa. During the time that the door and gate are reopening, the circuit for the coil of switch ROa is maintained through contacts DO6a. Thus the time delay before the reclosing of the door and gate starts from the time they reach open position. In this connection, it is to be noted that in case of congestion when the passenger transfer cannot be effected quickly, so long as any person is in the zone of influence of the antennae there will be repeated operations of relays DPa and DPXa until this condition ceases to exist. Thus the coil of switch ROa is repeatedly energized by way of contacts DPX2a and GH3a to maintain the door and gate in open position. Also the time delay in the dropping out of switch ROa does not start until the congestion is cleared. When the door and gate are finally closed, switch GHa is dropped out, causing the engagement of contacts GH4a to cause operation of relay DPXa and thus the short-circuiting of the tube networks.

Door protective apparatus and circuits controlled thereby are the subject matter of the co-pending application of William Henry Bruns and Samuel Davis, Serial No. 208,164, filed January 27, 1951, for Safety Mechanism for Doors.

Upon the dropping out of switch NTa to initiate the closing of the door and gate, contacts NT1a engage to complete a circuit through contacts TOSY1a and GH1a for buzzer BU1a in the car. This causes a soft buzz to warn the passengers that the door and gate closing operation has been initiated. Should the closing of the door and gate be considerably delayed, a harsh buzzer is intermittently sounded to advise the passengers that someone is holding up the closing of the door and gate. This is effected through the control of switches PTa and PTXa, the operation of which has previously been described. As was previously pointed out, when a car stops at a floor, switch TUD drops out after a certain time interval to engage contacts TUD3a in the circuit for the coils of switches PTa and PTXa. The delay in the dropping out of switch TUDa is greater than the combined time involved in the dropping out of switch NTa and the closing of the door and gate. Upon the expiration of the time interval of switch TUDa and provided further that the car, if at a terminal, has been selected and the dispatching timing interval has expired, switches PTa and PTXa are intermittently operated to cause the intermittent engagement of contacts PTX'a in the circuit for harsh buzzer BU2a. The harsh buzzer circuit is also subject to contacts RO1a being in engagement. This prevents the sounding of the harsh buzzer unless the door and gate are being reopened or held open by manipulation of door open button DOB1a or by someone standing in front of the door and gate. Switch BUSa is provided on the panel in the car for cutting out the harsh buzzer circuit. Both buzzer circuits are subject to contacts GH1 to prevent the sounding of the buzzers once the door and gate have reached closed position. Similar buzzer circuits are provided for each of the other cars, this being indicated by connecting wire WBUc for car c in Figure 11a which corresponds to wire WBUa in the circuits for car a for these buzzers in Figure 11.

While the harsh buzzer is being sounded to advise passengers in a car that the closing of the door and gate is being held up, the position indicator light for the floor at which the car is stopped is caused to flicker by the intermittent operation of switch PTXa as previously described. In this way the starter is advised that the car is being held up.

When a car, say car a, is unduly held up at a floor the car is temporarily removed from the dispatching system until the condition is corrected. This is effected by the control of auxiliary car cut-out relay XCSa. When switch TUDa is dropped out, the separation of contacts TUD1a breaks the circuit for the coil of relay XCSa, provided the delay is not due to the car being at a terminal and unselected or being at a terminal and selected but with the dispatching timing interval not having expired. Contacts WBX6a are separated and thus render contacts TUD1a effective when the car is at the bottom terminal, has been selected and the dispatching timing interval has expired. Contacts WTS2a are separated and thus render contacts TUD1a effective when the car is at an intermediate floor and also when the car is at the top terminal, has been selected and the dispatching timing interval has expired. This is due to the fact that switch WTSa is operated when the car is not at either terminal, as contacts ML2a and THL1a are then engaged and also when the car is at the top terminal and has been selected and the dispatching timing interval has expired, as contacts ML2a and WTX1a are then engaged. Thus with either contacts WTS2a or contacts WBX6a separated, the separation of contacts TUD1a breaks the circuit for the coil of relay XCSa. Relay XCSa is not dropped out immediately, being delayed by the discharge of condenser QXSCa. Upon dropping out, relay XCSa separates contacts XCS1a in a circuit common to the coils of relays CSa, VBa and VTa, thereby taking the car out of dispatching. When this takes place, the balancing device acts to rebalance the remaining cars. The delay in dropping out of relay XCSa beyond that of the delay in the dropping out of switch TUDa gives a further time interval for the condition to be corrected before the car is removed from the dispatching system. As soon as the condition is corrected and the door and gate are closed, the restarting of the car causes the reoperation of switch TUDa and thus the reoperation of relay XCSa to restore the car to the dispatching system. The balancing device then acts to rebalance the cars.

As in the case of "with attendant" operation, car a provides basement service. If no car call or down landing call is registered for the bottom terminal, the car is automatically stopped at that terminal on its downward trip, provided no call is registered for the basement. The stop is initiated by the engagement of brush CABa with contacts CP1a, rendered alive through contacts BF3a and contacts XC1a. Contacts XC1a will be in engagement at this time owing to the fact that contacts DN1a are separated preventing energization of the coil of relay XCa. As the car comes to a stop it becomes set for travel in the up direction and if there is an up landing call at this floor it is automatically cancelled as the change in the direction of car travel takes place as previously described. If a basement car call has been registered, contacts BF3a are separated so that a stop is not made at the bottom terminal on the way down unless it is in response to a car call or a down landing call. Should a stop be made at the bottom terminal under conditions where relay BFa is operated, contacts BF4a are engaged causing the lighting of down hall lantern DHL1a at the bottom terminal.

If a stop is made at the bottom terminal under conditions where the basement car call is registered, the car continues to the basement after the dropping out of switch NTa and the reclosure of the door and gate. Should the basement car call be registered by a passenger entering the car at the bottom terminal, the operation of relay BFa changes the direction of car travel back to down so that the car will travel down to the basement.

Should an intending passenger at the basement touch landing button UB, a landing call is registered and auxiliary basement service relay BFU is operated as previously described. This relay engages contacts BFU1a which completes a circuit through contacts TOSY6a for the coil of relay BFa, causing the car to travel to the basement as above described.

When the car travels to the basement, a stop is made at the bottom terminal on the subsequent upward trip, contact CP1a being rendered alive through contacts CS6a and UP6a.

If the car upon making a stop at the bottom terminal is selected, contacts WB7a separate, preventing the energization of the coil of relay BFa. The car is thereupon prevented from making a trip to the basement unless the starter temporarily takes the car out of dispatching in which event contacts WB7a reengage. However, if relay BFa is operated before the car arrives at the bottom terminal on its downward trip, it prevents the car being selected as the stop is made as it prevents the change in the direction of car travel and thus maintains contacts PR2a separated. Thus contacts WB7a are not separated so that the basement call remains registered.

When a down call is in registration at the bottom terminal, auxiliary basement service indication relay FDY is operated, its operating coil being connected across loading resistor RDL1. Upon operation relay FDY engages contacts FDY1a to complete a circuit for the coil of basement service indication relay FDXa. Thus in the starting of the car from a floor above under conditions where brush DPBa engages contact DH1a to effect automatic cancelling of the down call at the bottom terminal, contacts EA6 engage to complete the circuit through contacts FDX4a for the coil of relay FDXa before the call is cancelled and relay FDY drops out, thereby maintaining relay FDXa operated. The circuit for the coil of relay FDXa is maintained through contacts NT6a after the separation of contacts EA6a in the stopping operation. As car a is brought to a stop at the bottom terminal the engagement of brush SDBa with contact SDMa completes a circuit for the coil of auxiliary bottom terminal relay XVBa through contacts WB1a, VUD1a, FDX1a and TOSY2a. Relay XVBa, upon operation, separates contacts XVB2a to prevent the operation of relay BVa and thus the selection of the car. It also engages contacts XVB3a to effect the lighting of the down hall lantern for car a at the bottom terminal. Thus the intending passenger at the first floor may enter the car and register a basement car call as contacts WB7a are engaged. The operation of relay BFa in registering a car call causes the direction circuits to change back to down and thus prevents the selection of the car after the dropping out of relay FDX as a result of the separation of contacts NT6a as switch NTa drops out to initiate the closing of the door and gate. Thus the car travels to the basement before returning to the bottom terminal to be selected.

If car a is parked with the door and gate closed at the bottom terminal and awaiting selection, the touching of the down bottom D1 causes the reopening of the door and gate. The breakdown of the tube causes operation of relay FDY which in turn causes operation of relay FDXa as above described. Relay FDXa engages contacts FDX1a to cause operation of relay XVBa to prevent the selection of the car. Relay FDXa also engages contacts FDX3a, completing a circuit through contacts ML4a and H10a and switch TO14a for the coil of reversal cut-out switch RCa. This switch operates to separate contacts RC2a to prevent an unwanted operation and also engages contacts RC1a by-passing now separated contacts PR4a in the circuit to brush DPBa, thus causing operation of relay XSMa. With relay XSMa operated the tube of button D1 is pulsed out when the touch is discontinued, as previously described. Relay XSMa also engages contacts XSM1a which, as contacts FDX2a are engaged, completes a circuit for the coil of switch ROa. Switch ROa operates to cause the opening of the door and gate. As the door and gate reach open position, contacts DO6a separate in the circuit for the coil of switch ROa. Thus, upon the expiration of the time interval, switch ROa drops out to cause the reclosure of the door and gate.

When the passenger enters the car he presses basement car button CBa. Thus relay BFa operates to change the direction set up to down so that the car travels to the basement after the closing of the door and gate.

The starting of the cars by the dispatching mechanism on "without attendant" operation has already been described. In this description, it was assumed that the car arrived at the terminal before the dispatching timing interval expired. Operation under conditions where a car is late will now be described. As explained under "with attendant" operation, each of signal switches VUS and VDS, upon being operated, is maintained in operated condition if no car is available to respond to the switch. Referring first to the bottom terminal, as no car is at the bottom terminal, when switch VUS is operated no switch WB is operated. Assume that car a is next to arrive at the bottom terminal. As soon as it arrives, its door and gate are opened and it is selected. Incident to the selection, switch WBa is operated and separates contacts WB3a, deenergizing switch VL. Switch VL effects the reset of switch VUS and also breaks the circuit for the coil of switch VTR. Switch VTR is delayed in dropping out for a certain time interval as previously described to maintain up hall lantern UHL1a lighted at the bottom terminal for sufficient time for intending passengers to note that the lantern is lighted. Upon the dropping out of switch VTR, contacts VTX1a separate to cause the dropping out of switch WBa. Thus contacts WB5a separate so that, upon the expiration of the time delay for switch NTTa, the separation of contacts NTT1a breaks the circuit for the coil of switch NTa. Switch NTa drops out to cause the closing of the door and gate and the starting of the car in the up direction as above described.

Assume that car a is late in arriving at the top terminal. Switch VDS is maintained operated. Also relay VRR is maintained operated as contacts VDA1 are maintained engaged so long as switch VDS is operated. As no car is at the top terminal no switch WT is operated. As soon as car a arrives at the top terminal, its door and gate are opened and it is selected. Incident to the selection, switch WTa is operated. The resultant engagement of contacts WT1a causes the lighting of down hall lantern DHL9a at the top terminal. Also as contacts VRR1a are engaged switch WTXa is operated, this switch engaging contacts WTX1a to complete a circuit for the coil of switch WTSa. Switch WTSa separates contacts WTS3a so that, upon the separation of contacts NTT1a of the expiration of time delay for switch NTTa, the circuit for the coil of switch NTa is broken. Thus switch NTa drops out to effect the closing of the door and gate and the starting of the car in the down direction as previously described, the down hall lantern being extinguished as a result of the separation of contacts ASM2a incident to the starting operation. Also switch VDS is reset incident to the starting operation as above described.

If no car is at the top terminal at the time switch VDS is operated, the next car need not travel to the top terminal in the event it has reached its highest call. Under such conditions, the car is caused to slow down and stop at a floor in the selection zone where the direction set up is changed to down. It is believed that in view of previous description, a single example will suffice to explain this operation. Assume that switch VDS is operated with no car at the top terminal and that car a arrives in the selection zone with the only call above a car call for the eighth floor. Under such conditions relay XSa is maintained operated until brush HCBa opens hook switch HC8a to break the circuit for the coil of relay XCa. As this takes place contacts XC2a separate breaking the circuit for the coil of relay XSa. Relay XSa drops out to engage contacts XS2a to complete a circuit by way of contacts CUIa for the coil of relay VTa, causing car a to be selected. Relay XSa also engages contacts XS3a which together with the engagement of contacts WT2a causes operation of relay XHa and switch VSRa. Switch VSRa causes the reset of switch VDS as previously described. Relay XHa causes the dropping out of relay PRa to cause the lighting of the down hall lantern at the eighth floor. The door and gate are opened and the direction set up is changed to down as previously described as the car is brought to a stop at the eighth floor. It is to be noted that under these conditions switch WTSa is operated as both contacts ML2a and THLIa are engaged. Thus upon the closing of the door and gate after the expiration of the time delay of switch NTTa, a circuit is completed by way of gate contacts GIa, contacts NT2a and contacts WTSIa for the coil of switch KRa to start the car in the down direction.

Should there be an abnormal delay in the arrival of a car at the bottom terminal such that the timing mechanism has completed another half timing interval after the operation of signal switch VUS, detent switch VDE is operated as previously described. Switch VDE engages contacts VDEI to suspend further timing operation. As soon as a car, say car a, arrives at the bottom terminal its door and gate are opened and it is selected. Switch WBa is operated as the car is selected and engages contacts WB6a to cause the lighting of the up hall lantern at the bottom terminal. Also contacts WB3a separate to cause the circuit for the coil of switch VTR to be broken. Switch VTR upon dropping out after its time delay, causes the dropping out of switch WBa. Upon dropping out switch WBa separates contacts WB3a to break the circuit for the coil of switch VL, switch VL in turn engaging contacts VL3 to effect the reset of switch VUS. The resultant separation of contacts VUA3 breaks the circuit for the coil of switch VDE, this switch dropping out to restart the timing mechanism in operation, as previously described. Switch WBa also separates contacts WB6a to discontinue the lighting of the hall lantern at the bottom terminal. It also separates contacts WB5a, so that, upon the expiration of the time delay for switch NTTa, the separation of contacts NTTIa breaks the circuit for the coil of switch NTa. Switch NTa drops out to cause the closing of the door and gate and the starting of the car in the up direction as above described.

Similarly should, after operation of signal switch VDS, another half timing interval expire without a car being dispatched from the top terminal or being selected in the selection zone to receive the dispatching signals, detent switch VDE is operated as a result of contacts VDA4 being in engagement at the time this half timing interval expires. This causes a detent operation to stop further operation of the timing mechanism as previously described. Should the next car have a call at the top terminal, requiring it travel to that terminal, as soon as it arrives there its door and gate are opened and it is selected. Assuming this to be car a, as soon as it is selected, switch WTa is operated to cause the lighting of the down hall lantern. Also switch WTXa is operated to cause operation of switch WTSa. Thus upon the dropping out of switch NT the door and gate are reclosed and the car is started in the down direction as previously described. The down hall lantern is extinguished and switch VDS is reset incident to the starting operation as above described. If the next car is not required to travel to the top terminal, as soon as that car, say car a, arrives in the selection zone, relay XSa is deenergized causing the car to be selected and switch VDS to be reset as previously described, provided it has no call for a floor in the selection zone. The reset of switch VDS causes the deenergization of switch VDE to restart the timing mechanism in operation. The dropping out of relay XSa also causes the car to be slowed down and brought to a stop at the lowest floor in the selection zone, the lighting of the down hall lantern at that floor and the opening of the door and gate as the car is brought to a stop. Also the direction set up is changed to down as the car comes to a stop and upon the closing of the door and gate after the expiration of the time delay, the car is started in the down direction as previously described. If the car entering the zone has a call in the zone or if the car is already in the zone at the time switch VDE operates and has not reached its highest call, switch VDS is reset as the car answers its highest call and the timing mechanism is restarted in operation. Upon the car being brought to a stop at the floor of highest call, the door and gate are opened and upon expiration of the time delay are reclosed and the car is started in the down direction. It is believed that this operation will be understood from previous description.

The system may be set for different traffic conditions by means of traffic selector switch UDTS as previously described. For example, under conditions of interim traffic when traffic becomes predominant in the down direction, switch UDTS is set in position 3. This assigns one more car to the down trip than to the up trip as previously described. Similarly, when traffic becomes predominant in the up direction, switch UDTS is set in position 4. This assigns one more car to the up trip than to the down trip as previously described. Basement service is provided by car a under conditions of predominant traffic in either direction, the same as on "with attendant" operation. During interim periods when traffic is substantially equal in both directions, switches VUS and VDS are operated simultaneously with an even number of cars under dispatching, as previously described. In this way the time allowance for each car for each trip is a multiple of the dispatching timing interval and these time allowances are equal. When an odd number of cars are under dispatching, switches VUS and VDS are operated alternately, as previously described. In this way the time allowance for each car for each trip is a multiple of the dispatching timing interval plus one half interval and these time allowances are equal. In either case, the same number of cars, in effect, are caused to be on an up trip and a down trip at the same time.

During interim traffic periods when traffic is predominant in one direction, switches VUS and VDS are operated alternately with an even number of cars under dispatching, as previously described. When an odd number of cars are under dispatching the switches VUS and VDS are operated simultaneously as previously described. In either case, one more car, in effect, is caused to be on trip for the direction of predominant traffic. In case the predominant traffic is down, the system is operated in such way as to cause one more car to be on the down trip than on the up trip and, in case the predominant traffic is up, to cause one more car to be on the up trip than on the down trip. It is believed that this will be understood from previous description.

Should the cars get out of balance for any reason, the balancing device acts to restore the balance. If the unbalance is in the down direction, switch VUM is operated and acts through switch WUS to cause the operation of switch WBX for a selected car at the bottom terminal. Assuming this to be car $a$, switch WBX$a$ causes the dropping out of switch WB$a$, which in turn breaks the circuit for the coil of switch NT$a$ to effect the closing of the door and gate and starting of the car in the up direction as above described. If the dispatching timing interval expires before a car arrives at the bottom terminal, the car upon arriving at this floor is started on its upward trip as a result of the operation of the timing mechanism. Switch VUM is maintained operated under such conditions to cause reoperation of switch WUS to initiate the starting of a subsequent car to restore the balance. In case of further operations of the timing mechanism to cause the starting of the cars, switch VUM remains operated until it causes the starting of a car to restore the balance. If the unbalance is in the up direction, switch VDM is operated and acts through relay VRR to cause operation of switch WTX for a selected car at the top terminal. Assuming this to be car $a$, switch WTX$a$ causes the operation of switch WTS$a$ which in turn breaks the circuit for the coil of switch NT$a$ to effect the closing of the door and gate and starting of the car in the down direction as above described. If no car is at the top terminal, relay VRR may cause a car to be selected in the selection zone. In such event, the car upon being brought to a stop has its direction set-up changed to down so that upon the closing of the door and gate it is started in the down direction. In either case the balance is restored. If the dispatching timing interval expires before a car arrives at the top terminal or is selected in the selection zone, the timing mechanism takes over. Switch VDM is maintained operated under such conditions and also in case of repeated operations of the timing mechanism until it has effected the restoration of balance. It is believed that these operations will be understood from the description of operation of the balancing mechanism under "with attendant" operation coupled with the description of the control of the cars by the dispatching mechanism.

As on "with attendant" operation, the starter may manually dispatch a car by pressing either button MUSB or MDSB. The pressing of button MUSB causes operation of switch VUM which acts as above described to cause the starting of a car in the up direction. The pressing of button MDSB causes operation of switch VDM which acts as above described to cause the starting of a car in the down direction. In each case the balancing device acts to cause the starting of a car in the opposite direction to restore the balance.

The operation of the elevators on "without attendant" operation under peak traffic conditions will now be described. As previously set forth, for peak incoming traffic conditions switch UDTS is set in position 1, and for peak outgoing traffic conditions switch UDTS is set in position 5. As on "with attendant" operation, the car balancing mechanism is not effective under peak traffic conditions. Also basement service is not provided. However should relay XVB$a$ be operated at the time of switchover, its contacts XVB1$a$ maintain it operated to enable the passenger who touched button D1 to be taken to the basement.

Operation under up peak traffic conditions will first be described. With switch UDTS in position 1, switch VDS is cut out so that only switch VUS responds to the operations of the timing mechanism. As in the case of "with attendant" operation, the timing mechanism is controlled so that switch VUS is operated at the expiration of the timing interval after the departure of a car from the bottom terminal. If a car is at the bottom terminal as the timing interval expires and is selected, it is started as a result of the operation of switch VUS, provided another car is also there to receive further passengers. If not, the starting is delayed either until the arrival of another car or the expiration of another half timing interval, whichever occurs first. If there is no car at the bottom terminal at the expiration of the additional half interval, when a car arrives it is started immediately upon expiration of the time delay for the reclosing of the door and gate. If a car becomes fully loaded it is started without waiting on switch VUS or, if switch VUS is operated, without waiting on another car.

Assume that car $a$ is at the bottom terminal and is selected, causing its door and gate to be open and up hall lantern to be lighted. Assume also that another car arrives at the bottom terminal prior to the expiration of the timing interval. This causes switch VCO to be operated. Thus contacts VCO1 are engaged so that, upon operation of switch VUS, the resultant engagement of contacts VUA5 completes a circuit for the coil of switch WUS. Switch WUS causes the operation of switch WBX$a$ which in turn causes the dropping out of switch WB$a$ to extinguish the hall lantern. Switch WB$a$ also causes switch NT$a$ to drop out as previously described, causing the closing of the door and gate and the starting of the car in the up direction.

If there is no car at the bottom terminal when switch VUS operates or if there is only one car there at this time, switch VCO is not operated. Thus with only car $a$ at the bottom terminal at the expiration of a full timing interval, its hall lantern remains lighted and the door and gate remain open, awaiting arrival of another car or the expiration of the next half timing interval. As soon as another car arrives, switch VCO operates to engage contacts VCO1 causing the operation of switch WUS. This causes the operation of switch WBX$a$ to effect the extinguishing of the hall lantern, the closing of the door and gate and the starting of the car in the up direction as above set forth.

If there is only one car, say car $a$, at the bottom terminal at the end of the next half timing interval, switch VDE is operated, engaging contacts VDE2 to complete a circuit for the coil of switch WUS through contacts VUP6. This causes operation of switch WBX$a$ to effect the extinguishing of the hall lantern, the closing of the door and gate and the starting of the car in the up direction as previously described. If no car is at the bottom terminal at this time, the operation of switch VDE suspends further operation of the timing mechanism. As soon as a car arrives, its door and gate open. Owing to the fact that switch WUS is operated, switch WBXa is operated and contacts WBϑa are separated as the car arrives, so that the door and gate reclose immediately upon the expiration of the time delay and the car is started in the up direction. Also switch VDE is deenergized enabling the timing mechanism to resume operation.

If in the above examples of operation a car, say car a, becomes fully loaded at any time prior to the expiration of one and one half intervals, load dispatching switch LDSa is operated to complete a circuit for the coil of switch WBXa causing the extinguishing of the hall lantern, the reclosing of the door and gate and the starting of the car in the upward direction.

In each of the above examples, upon the starting of the car, say car a, a circuit is completed for the coil of auxiliary reset switch XTa. This switch operates as previously described to cause the operation of signal recycling relay XSR and signal recycling switch SR. Switch SR engages contacts SR1 to cause operation of relay YVT and thus reestablish the charging circuit for condenser QVTC. As the car leaves the floor, brush SDBa disengages contacts SDMa breaking the circuit for the coil of relay XSR which drops out to deenergize switch SR. Switch SR separates contacts SR1 to cause the dropping out of relay YVT and thus discontinue the charging of condenser QVTC, thereby starting a new timing interval from the time of departure of the car.

As a car, say car a, leaves the bottom terminal the disengagement of brush LB2a from contacts MLC2a breaks the circuit for the coil of switch MLa. Thus contacts ML2a engage completing a circuit through contacts THL1a and VC2a in parallel for the coil of switch WTSa. Switch VCa is continuously operated under up peak conditions as previously described, and thus maintains the circuit for the coil of switch WTSa while contacts THL1a are separated with the car at the top terminal. Thus switch WTSa is continuously operated from the time the car leaves the bottom terminal until its return. Contacts WTS1a are therefore engaged in the circuit for the coil of switch KRa so that the car is automatically restarted after each stop upon the reengagement of gate contacts G1a.

As on "with attendant" operation, the cars answer car calls and up landing calls on upward trips and car calls and down landing calls on downward trips. Each car on its upward trip may answer a down landing call provided no call is registered for a floor beyond and an up landing call is not registered for the floor at which the down call is registered. Upon a car answering its highest call, that is a car call or down landing call, its direction set up is changed to down as the car comes to a stop as previously described. This may occur at a floor below the selection zone as the deenergization of the XS relays is not dependent either on the timing mechanism or the cars being in the selection zone owing to the fact that contacts VD4 and VD3 are separated. Thus, if the only call above a car, say car a, is a car call or a down landing call for a floor below the top terminal, as soon as the car reaches this call, its relay XSa is deenergized. Owing to the fact that switch VC is operated, as soon as this highest call is reached, the dropping out of relay XSa completes a circuit for the coil of relay XHa and operating coil of switch VSRa. The operation of relay XHa causes the slowing down and stopping of the car at the landing for which such call is registered and the changing of the direction of travel to down as the car comes to a stop. The door and gate open as the car is brought to a stop and, upon expiration of the time delay, automatically reclose and the car starts in the down direction.

If a car has a car call for the top terminal or a landing call exists for such terminal, the car travels to the top terminal where the door and gate are opened and the direction set up is changed to down as it is brought to a stop as previously described. As the car, say car a, arrives at the top terminal its relay VTa is operated which in turn causes the operation of switch WTa to cause the lighting of the down hall lantern. The coil of switch WTSa is energized by way of contacts VC2a for a stop at the top terminal as previously described. Thus contacts WTS3a are separated which enables switch NTa to drop out to initiate the reclosing of the door and gate upon the expiration of the time delay of switch NTTa. Upon the reclosing of the door and gate the car is started in the down direction, the hall lantern being extinguished incident to the starting of the car as previously described.

Operation under down peak conditions will now be described. With switch UDTS in position 5, switch VUS is cut out so that only switch VDS responds to operations of the timing mechanism. So long as traffic conditions are such that passengers wishing to travel in the down direction do not have to wait unduly for a car, the cars are started on their downward trips or selected in the selection zone to do so in the same way as described for conditions of approximately equal up and down traffic. That is, if a car, say car a, arrives at the top terminal before the expiration of a full timing interval, it is selected, its down hall lantern is lighted and the door and gate are opened and maintained in open position until the timing interval expires. The maintaining of the door and gate in open position is due to the fact that contacts THL2a are engaged with the car at the top terminal completing a circuit for the coil of switch NTa through contacts WTS2a. Switch WTSa is deenergized at this time as contacts THL1a are separated. Upon the expiration of the dispatching timing interval, relay VRR operates to complete a circuit for the coil of switch WTXa which engages contacts WTX1a to cause operation of switch WTSa. Switch WTSa separates contacts WTS3a to break the circuit for the coil of switch NTa. Thus the door and gate reclose and as contacts WTS1a are engaged the circuit is completed for the coil of switch KRa as the door and gate reach closed position, starting the car in the down direction.

As contacts VD3 and VD4 are engaged when the circuits are set for down peak traffic conditions, the cars on their upward trips always travel to the selection zone and the extent of their upward travel is also subject to the dispatching timing mechanism. If the timing interval expires before a car reaches the top terminal it is caused to slow down and stop at the floor of highest call, i. e., car call or down landing call, in the selection zone. The door and gate are opened and the direction of travel is set for down as the car comes to a stop and upon expiration of the time delay the door and gate are closed and the car is started in the down direction as previously described.

When a car arrives at the bottom terminal, upon expiration of the time delay after the opening of the door and gate, the door and gate immediately reclose and the car is started in the up direction. Taking for example car $a$, as it arrives at the bottom terminal it becomes set for upward travel. The resultant engagement of contacts PR2a causes operation of relay VBa which in turn engages contacts VB1a to complete a circuit for the coil of switch WBa through contacts VDP2a of the down peak switch. Inasmuch as contacts VU4 are engaged when the system is set for down peak traffic conditions, switch WBa immediately completes a circuit for the coil of switch WBXa which causes the dropping out of switch WBa to separate contacts WB5a. Thus upon expiration of the time delay of switch NTTa, switch NTa drops out to cause the reclosing of the door and gate and as they reach closed position the car is started in the up direction.

During down peak conditions, cars $a$ and $b$ handle passengers desiring to be carried in the up direction. To provide this operation the up hall lanterns at the bottom terminal for cars $a$ and $b$ are continuously lighted to attract any incoming passengers to these elevators. This is effected by engagement of contacts VDP5a for car $a$ and by the engagement of like contacts for car $b$. Cars $c$ and $d$ are set for non-stop operation as soon as they arrive at the bottom terminal. This is effected by the separation of contacts VDP1c for car $c$ which removes the by-pass for contacts PR1c. Thus as the car arrives at the bottom terminal and becomes set for upward travel, the separation of contacts PR1c breaks the circuit for the coil of non-stop relay NSc. Relay NSc drops out to separate contacts NS1c which prevents the lighting of any of the up hall lanterns for car $c$, including the one at the bottom terminal. It also separates contacts NS2c preventing car $c$ picking up any up landing calls on its upward trip. A like arrangement is provided for car $d$.

When a down landing call for any of certain lower floors has been registered for more than a given length of time it becomes effective to stop an up travelling car having no car call registered for a higher floor and to set the car for downward travel as it comes to a stop. This is effected through the control of preference return tubes FMT as described for "with attendant" operation. Assume that car $a$ is set for upward travel and has no car call. Upon engagement of its brush PRBa with contacts PRCa for a floor at which such down call is registered, tube FMT for that floor is caused to fire and thus cause the operation of switch FMa. Switch FMA acts to cause the slowing down and stopping of the car at the floor as previously described. Also the down hall lantern is lighted, the down call is automatically cancelled and the door and gate are opened and the direction set up is changed to down as the car is brought to a stop. Inasmuch as contacts THL2a and WTS3a are separated under such conditions, switch NTa drops out upon the expiration of the time delay for switch NTTa causing the closing of the door and gate and the starting of the car in the down direction. It is believed that further operation of the preference return circuits on "without attendant" operation will be understood from previous description. In each case of a preference return stop upon the expiration of the time delay after the opening of the door and gate, the door and gate are automatically reclosed and the car is started in the down direction.

When the down traffic becomes excessively heavy, the system is automatically thrown over to "zone return." As on "with attendant" operation when the number of unanswered down calls for floors three, four and five and their cumulative waiting time reaches a certain amount, depending on the number of such calls, or when such calls reach a certain number, zone return relay XVO is operated. Relay XVO causes operation of zone return switch VO which throws the system over to "zone return" operation. The operation of switch VO assigns cars $a$ and $b$ to the high zone and cars $c$ and $d$ to the low zone as before and sets up the circuits so that response is had to calls the same as on "with attendant" operation. Also the operation of switch VO renders the timing mechanism ineffective. It is believed that in view of previous description, the operation of the cars on "zone return" with no attendants will be understood from brief examples of operations.

Referring first to a high zone car, say car $a$, as it arrives at the bottom terminal and becomes set for upward travel, relay VBa is operated which in turn engages contacts VB1a to complete a circuit for the coil of switch WBa through contacts VDP2a. As contacts VU4 are engaged, the engagement of contacts WB2a immediately completes a circuit for the coil of switch WBXa. Switch WBXa causes the dropping out of switch WBa to separate contacts WB5a. Thus upon the expiration of the time delay after the opening of the door and gate, switch NTa drops out to cause the reclosing of the door and gate and the starting of the car in the up direction. Due to the engagement of contacts VO6a, the circuit for the coil of relay XSa is maintained at least until the car reaches the sixth floor, the lowest floor in the high zone. When the car reaches its highest call in the high zone, the circuit for the coil of relay XSa is broken as previously described. This causes the stopping of the car at the landing of highest call, the lighting of the down hall lantern and, as the car comes to a stop, the opening of the door and gate and the changing of the direction set up to down. Inasmuch as contacts WTS3a are separated, the door and gate are reclosed upon expiration of the time delay and the car is started in the down direction.

As to the low zone cars, as car $c$ for example arrives at the bottom terminal its relay VBc is operated, as described for a high zone car which causes the operation of switches WBc and WBXc. Switch WBXc causes the dropping out of switch WBc so that upon the expiration of the time delay after the opening of the door and gate, the door and gate are reclosed and the car is started in the up direction. The circuit for the coil of relay XSc is maintained by way of contacts VO12 to insure the travel of the car above the second floor. After this point, the car travels to its highest down landing call in the low zone. When the car reaches its highest call, the circuit for the coil of relay XSc is broken. This causes the stopping of the car at the landing of highest call and, as the car comes to a stop, the lighting of the down hall lantern, the opening of the door and gate and the changing of the direction set up to down. Upon the expiration of the time delay, the door and gate are reclosed and the car is started in the down direction. Should a low zone car be in the high zone at the time of switch-over to "zone return" operation, it is immediately returned to the low zone. This is effected by the operation of switch ZR for that car which causes the car to be brought to a stop at the next floor at which a stop can be made and, upon the expiration of the time delay after the opening of the door and gate, the reclosing of the door and gate and the starting of the car in the down direction, as previously described. A low zone car may be assigned to the high zone by operating the zone transfer switch ZTS for that car as previously described.

Both high zone cars and low zone cars respond to down landing calls on their downward trips. The high zone cars, if not fully loaded and thus automatically non-stopped, will respond to down landing calls in the low zone to help out the low zone cars. As during down peak operation before switch-over to "zone return," the low zone cars are non-stopped during upward travel, due to the separation of contacts VDP1 for these cars. The high zone cars respond to up calls in both zones and take on incoming passengers at the first floor as before, their up hall lanterns at the first floor being continuously lighted. When the amount of traffic decreases sufficiently, relay XVO is dropped out restoring the circuits for the condition of down peak traffic with all cars assigned to both zones.

For night service, switch UDTS is moved to position 6. In this position switches VU and VD are deenergized so that the dispatching system is shut down. Also, night service relay VN is operated causing the engagement of contacts VN3 to cause the continuous lighting of the up hall lantern for the car on night service when the car is at the bottom terminal. Relay VN also engages contacts VN2a to complete a circuit for the coil of first throw-over switch relay TOSXa, causing this relay to be operated. Relay VN also engages contacts VN4a, rendering door close button DCBa effective also at the terminal floors on night service.

Referring to the circuits for car $a$, as the car arrives at the bottom terminal, the door and gate open. Upon expiration of the time delay, contacts NTT1a separate to deenergize switch NTa which in turn engages contacts NT3a to cause the closing of the door and gate. Thus the car parks at the bottom terminal with the door and gate closed. With the hall lantern continuously lighted while the car is parked, any incoming passenger is attracted to this car. To open the door and gate the passenger touches the hall button for the direction in which he desires to travel. Assuming that a passenger desires to be carried in the up direction and touches up button U1. This causes operation of relay XSMa which engages contacts XSM1a completing a circuit by way of contacts TOSX2a for the coil of door reopen switch ROa. This operation of switch ROa causes the door and gate to open as previously described. Upon entering the car the passenger presses the car button for his desired destination. Assuming this to be the fifth floor, he presses car button C5a which completes a circuit by way of the hook switches HC for the fifth floor and floors above for the coil of highest car call relay XCa. This relay engages contacts XC2a to complete a circuit for the coil of relay XSa. Upon the expiration of its time delay after the opening of the door and gate, switch ROa drops out to cause the reclosing of the door and gate. As the door and gate reach closed position, a circuit is completed through gate contacts G1a, contacts NT2a, TOSX1a and XS1a and switch TO8a for the coil of switch KRa to start the car in the up direction.

The car is stopped at the fifth floor in response to the fifth floor car call as previously described and as this is the only call registered, the direction set up is changed to down as the car is brought to a stop. The door and gate open as the car is brought to a stop and upon the expiration of the time delay, switch NTa drops out to cause the reclosing of the door and gate. As the door and gate reach closed position a circuit for the coil of switch KRa is completed as contacts WTS1a are engaged. Thus the car is started in the down direction. If no other calls are registered the car returns to the bottom terminal where it is brought to a stop as a result of the engagement of brush CABa with stationary contact CP1a rendered alive by way of contacts XC1a and BF3a. The door and gate open automatically as the car comes to a stop and if no further call is registered, they reclose automatically upon expiration of the time delay. The car then parks at the bottom terminal awaiting registration of a call.

Assume now that a down landing call is registered at the fourth floor. This causes the operation of relay XSa which engages contacts XS1a to complete a circuit for the coil of switch KRa by way of contacts TOSX1a and NT2a and gate contacts C1a. This causes immediate starting of the car in the up direction. Assuming no further calls registered, the car travels to the fourth floor where it is brought to a stop and the door and gate open. Owing to the fact that contacts TOSX3a are separated, the automatic cancelling of this landing call is not effected until the door and gate open to cause the operation of switch GHa and thus the engagement of contacts GH5a. Inasmuch as the direction set up is changed to down when the stop is made, upon the expiration of the time delay after the opening of the door and gate, the door and gate reclose and the car is started in the down direction.

During upward travel of the car, stops are made in response to car calls and up landing calls for floors above the car, and in response to a down landing call provided it is the highest call as above described. During downward travel, stops are made in response to car calls and down landing calls for floors below the car. The car always returns to the bottom terminal where it parks with the door and gate closed until further calls are registered. When the motor generator set is shut down after the car parks at the bottom terminal, this delay in cancelling the landing call until the door and gate open enables the passenger who touches a bottom terminal landing button to effect the restarting of the set without holding his finger on the button, as this will allow sufficient time to insure starting the set in operation.

If a basement call is registered, relay BFa is operated causing the car to continue to the basement past the bottom terminal on its downward trip if no car or down landing call is registered for the bottom terminal. This is due to the fact that contacts BF3 are separated. If the car is parked at the bottom terminal when a basement call is registered, the operation of relay BFa changes the direction set up to down as previously described and when this is effected the car is started in the down direction, the circuit for the coil of switch KR being by way of contacts DN2a and ML1a. If the passenger entering the car at the basement presses a car button for a floor above the bottom terminal, the circuit for the coil of relay XCa is completed causing the operation of this relay to separate contacts XC1a. Thus, assuming that the bottom terminal car button C1a is not also pressed, the car is not stopped at the bottom terminal on its upward trip unless an up landing call is registered for that floor.

From the above description it will be seen that there is provided a dispatching and control system for a plurality of elevator cars in which the cars may be operated either with or without attendants and in which the cars are dispatched on their upward and downward trips on both "with attendant" and "without attendant" operation. The dispatching on "with attendant" operation is effected by giving dispatching signals to the cars whereupon the attendants start the cars. On "without attendant" operation, the dispatching is effected by automatically starting the cars. Under up and down traffic conditions, the dispatching operations are initiated at regular intervals of time by timing mechanism for both directions of travel. Under up peak traffic conditions, the up dispatching operations are initiated at timed intervals and the cars are dispatched on their downward trips as soon as available. Under down peak traffic conditions, the down dispatching operations are initiated at regular time intervals and the cars are dispatched on the up trips as soon as available. When down peak traffic becomes excessive, the system is automatically thrown over to "zone return" and the cars are dispatched in both directions as they become available. The timing operation is effected by electromagnetic switching mechanism in which the discharge of a condenser is utilized. This mechanism is controlled so that the condenser is fully charged at the beginning of the timing operation to insure uniform timing intervals. Also the timing mechanism is controlled to operate in two equal time steps for a full dispatching interval to enable the up dispatching operation and down dispatching operation to be initiated simultaneously or alternately.

When traffic in each direction is approximately equal, the up dispatching operation and the down dispatching operation are initiated simultaneously for an even number of cars under dispatching and alternately for an odd number of cars under dispatching. This distributes the cars on the up and down trips on an equal time basis. When, with up and down traffic, traffic predominates in the up direction or in the down direction, the cars are distributed so that more of them are on the trip in the direction of predominant traffic than on the trip in the other direction. This allows more time for the trip in the direction of predominant traffic. For this condition the dispatching operations are initiated simultaneously when an odd number of cars are under dispatching and alternately when an even number of cars are under dispatching. The dispatching mechanism is controlled to provide the proper simultaneous or alternate relationship of up and down dispatching operations for the different traffic conditions automatically in accordance with whether an odd or even number of cars is under dispatching. Should the system get out of balance under any of these conditions or as a result of changing from one condition to another, the balancing device acts to dispatch a car in a direction to restore the balance.

The cars are selected for dispatching at the terminal floors when the dispatching from those floors is initiated by the timing mechanism. When a car is at the bottom terminal but not selected because of the presence of another car, it parks with the doors, i. e., hoistway door and car gate, closed. Upon being selected, the doors are reopened. If a car is late it may be selected to be dispatched on its downward trip from a floor in an upper selection zone instead of at the top terminal. In case of abnormal delay in the arrival of a car at the bottom terminal, or of a car leaving the top terminal, or as a result of a car not being available for selection in the selection zone, the timing mechanism is detented. When a car is selected for dispatching from the bottom terminal, its up hall lantern is lighted to advise intending passengers that this car is next to be dispatched. The hall lantern is extinguished as soon as the up dispatching operation is initiated so that the hall lantern for the next selected car may be immediately lighted. However, if a car is late in arriving at the bottom terminal, the hall lantern is maintained lighted for a sufficient interval for incoming passengers to notice the lantern.

During travel of a car in the up direction, stops are made in response to its car calls and to up landing calls. Also, if the car is late, a stop may be made in the selection zone at the floor of highest call, i. e., car call or down landing call. The stop may also be made at a floor in the selection zone having no call provided the car has answered its highest call. When such stop is made in the selection zone, the direction of travel is changed to down so that the car is started from that floor in the down direction. During downward travel of the car, stops are made in response to its car calls and to down landing calls. In each case the stops are made in the order in which the floors are reached, regardless of the order in which the calls are registered.

Basement service is provided by at least one car when the system is set for up and down traffic conditions. When a car is on basement service, it is automatically stopped at the bottom terminal, provided no car call is registered for the basement and, in the case of "without attendant" operation, no landing call is registered for the basement. If such basement call is registered, no stop is made at the bottom terminal unless a car call or down landing call is registered for that terminal. If such terminal call is registered, the car continues to the basement after stopping at the terminal. When the car travels to the basement, a stop is made at the bottom terminal on the subsequent upward trip. If the basement car upon making a stop at the bottom terminal is selected, a trip to the basement is prevented unless the starter removes the car from the dispatching system. However, if a basement car call and, on "without attendant" operation, a basement landing call is already registered, the selection of the car at the terminal is prevented. In the case of "with attendant" operation, when a basement landing call is registered, a basement light is lighted to advise the attendant of such a call. The attendant then registers a car call for the basement. If this car call is registered before the car arrives at the terminal, it prevents selection of the car if a stop is made at the terminal. Selection is also prevented on "without attendant" operation in case a down landing call is in registration for the bottom terminal. This enables the car to travel to the basement. If the car is parked at the bottom terminal awaiting selection, the touching of the down landing button at that floor prevents selection of the car so that the passenger may be taken to the basement.

When the system is set for up peak traffic conditions, timed dispatching takes place only from the bottom terminal. The cars on their upward trips travel only as high as the floor of highest call from which point they are dispatched on their downward trips immediately. The dispatching interval for the upward trips starts from the departure of the preceding car from the bottom terminal. The cars are selected for dispatching from the bottom terminal. If another car is at the terminal, the selected car is dispatched at the expiration of the timing interval. If not, the dispatching is delayed either until the arrival of another car or the expiration of a further interval, here illustrated as half a timing interval, whichever occurs first. If after a car leaves no car is at the bottom terminal at the expiration of the timing interval plus the further interval, as soon as a car arrives it is dispatched on its upward trip. Its up hall lantern is maintained lighted for a certain period under such conditions, as when a car is late under up and down traffic conditions. If a car at the bottom terminal becomes fully loaded, it is dispatched immediately without regard to the timing interval or presence of another car and the timing interval is reestablished incident to the departure of the car.

When the system is set for down peak traffic conditions, timed dispatching is effective only for the downward trips. The cars are dispatched on their upward trips as soon as they arrive at the bottom terminal. The cars are dispatched on their downward trips from the top terminal when they arrive at that terminal before the timing interval expires. If no car is at the top terminal when the timing interval expires, a car may be dispatched on its downward trip from a floor in the selection zone, provided it has reached its highest call. Certain cars handle up traffic during the down peak period. These cars answer up landing calls on their upward trips and take on incoming passengers at the bottom terminal, their up hall lanterns at this floor being permanently lighted. The other cars are automatically non-stopped so as not to respond to up landing calls on their upward trips and their up hall lanterns are not lighted at the bottom terminal so that incoming passengers know that these cars do not carry passengers in the up direction.

When a down landing call for any of certain lower floors has been registered for more than a given length of time it becomes effective to stop an available up travelling car, i. e., the car having no car call for a floor above. Upon being brought to a stop, the car has its direction of travel set for down and, when the passenger transfer has been effected, it is dispatched immediately in the down direction. This preference return operation is effected through the control of electronic gas tubes, one for each of these floors. Each of these tubes is biased against firing. When a down call is registered for a floor for which the tube is provided this bias is gradually decreased until at the expiration of the timing interval the tube is able to fire. When an available up car reaches the particular floor, the firing of the tube takes place, which causes the car to be brought to a stop at the floor.

When the down traffic at certain lower floors becomes excessively heavy, the system is automatically thrown over to "zone return" operation. This is effected by controlling electronic vacuum tubes for these lower floors to measure the waiting time for unanswered down landing calls for these floors and by controlling an electronic gas tube in accordance with this measured cumulative waiting time for such calls and the number of the calls registered. The gas tube is fired as soon as these down calls reach a certain number or, in case of a less number, as soon as the cumulative waiting time reaches a certain amount, depending on the number of such calls. When on "zone return" the timing mechanism is ineffective and the cars are dispatched on their upward and downward trips as soon as they become available. Certain of the cars are assigned to the high zone and the other cars are assigned to the low zone. Should a low zone car be on an up trip in the high zone at the time of switch-over to "zone return" it is stopped at the next floor at which a stop can be made and started in the down direction. Each car travels to the highest call in its zone where it is brought to a stop and from which point it starts on its downward trip. Each car on its downward trip responds to down calls in its zone and the high zone cars, if not fully loaded, may make stops in the low zone to answer down calls to help out the low zone cars. The high zone cars handle the up traffic. Preference return operation is provided for certain of the floors in both zones when on "zone return" but the time interval before a down call becomes effective to stop an up travelling car is greater than when not on "zone return" operation. When the amount of down traffic at these lower floors decreases sufficiently, the system is automatically restored to the condition where all cars are assigned to all floors.

As each stop is made the doors open automatically. On "with attendant" operation, the attendant effects the closing of the doors incident to the starting operation by pressing the starting button in the car. On "without attendant" operation the doors close automatically upon the expiration of a time delay sufficient for the passenger transfer to be effected and the car starts as the doors reach closed position. However, this is subject to the dispatching mechanism when a stop is made at a terminal floor. If the timing interval has expired when a car reaches either terminal, the doors are retained in open position for only the duration of the time delay. When under timed dispatching from the top terminal, if the timing interval has not expired when a car stops at the top terminal, the doors are retained in open position until the timing interval does expire whereupon the doors close automatically and the car starts in the down direction. When under timed dispatching from the bottom terminal, if the timing interval has not expired when the car reaches the bottom terminal and the car is selected for dispatching, the doors are retained in open position until the timing interval expires whereupon they close automatically and the car starts in the up direction. If the car is not selected, the doors close automatically to await selection. As soon as the car is selected, the doors automatically reopen and upon expiration of the dispatching timing interval close immediately and the car starts in the up direction. The closing of the doors when awaiting selection at the bottom terminal on "with attendant" operation and the subsequent reopening upon being selected are effected by manual operations on the part of the attendant. A door close button is effective on "without attendant" operation to close the doors at floors other than the terminals without waiting on the time delay, where conditions warrant. Also, the door closing operation is effected at a slower speed on "without attendant" operation than on "with attendant" operation.

On "with attendant" operation, the doors, if closing, may be reopened by the attendant releasing the starting button. On "without attendant" operation, the doors if closing may be reopened by pressing a door open button in the car or by touching the landing button for the direction of car travel at the floor at which the car is stopped. Also if a person starts to enter or leave the car, the doors are automatically reopened if they approach within a certain distance of the person in closing, and if open may be prevented from closing by the closeness of a person. In each of these cases on "without attendant" operation, the closing of the doors after they have been reopened or prevented from closing is delayed for a certain time interval.

When the door closing operation is initiated on "without attendant" operation, a soft buzz is sounded as a warning to passengers. Should the closing be considerably delayed, a harsh buzzer is intermittently sounded to advise passengers that someone is holding up the closing operation. When the car is held up at a floor for this or some other reason, the position indicator light for that car for that floor is caused to blink to advise the starter of this condition so that he may have it corrected. Should the car be unduly held up, it is automatically removed from the dispatching system until the condition is corrected.

On "with attendant" operation, when a car makes a stop at a floor under conditions where it cannot take on all of the waiting passengers, the landing call which effected the stop may be automatically reregistered by pressing a call reregistration button within the car. Should a car be fully loaded, its non-stop button is pressed to prevent the car responding to further landing calls until room is again provided in the car by the discharge of passengers. On "without attendant" operation, a fully loaded car is automatically prevented from responding to landing calls until room is provided in the car by the discharge of passengers.

On night service, the dispatching system is shut down and the night service car serves all floors including the basement. On "with attendant" operation the car parks at the bottom terminal during which time the up hall lantern is continuously lighted and the doors are open. The attendant registers the car calls for the incoming passengers. If a landing call is registered for a floor above, an audible indication is given in the car and also a call above light is lighted. Upon receiving passengers at the bottom terminal desiring to be carried in the up direction or upon the registration of a landing call above, the attendant presses the start button which closes the doors and starts the car in the up direction. If an entering passenger wishes to be carried to the basement or a basement landing call is registered, the attendant registers a basement car call. When a basement car call is registered, the car starts in the down direction.

When operating without an attendant on night service, the car automatically returns to the main landing as a home station. The car then parks at this floor with its up hall lantern lighted and the doors closed. Any incoming passenger desiring to be carried in the up direction touches the up landing button. This causes opening of the doors and the passenger enters and presses the car button for the floor above which is his destination. Upon expiration of a time delay the doors close and the car starts in the up direction. If a landing call is registered for a floor above while the car is parked at the main landing, the car immediately starts in the up direction. If with the car parked at the main landing an incoming passenger wishes to be carried to the basement, he touches the down landing button. This causes opening of the doors and the passenger enters and presses the basement car button. After expiration of the time delay the car starts in the down direction. Should a basement landing call be registered while the car is parked at the main landing the car starts downward immediately.

On both "with attendant" and "without attendant" operation during night service the car stops on its upward trip at floors for which car calls and up landing calls are registered and also at the floor for which a down call is registered provided this is the highest call. When the car answers its highest call it is set for downward travel as it is brought to a stop. On the downward trip, the car responds to car calls and down landing calls. If a basement car call is registered or, on "without attendant" operation a basement landing call is registered, the car continues past the main landing if no car call or down landing call is registered for that floor and stops at the basement. On "with attendant" operation, the car stops at the main landing on its subsequent upward trip. On "without attendant" operation, however, if a passenger enters the car at the basement and presses the car button for a floor above the main landing, the car is not stopped at the main landing on its upward trip unless a car call or an up landing call is in registration for that floor. On "with attendant" operation, the attendant presses the starting button after each stop to effect the closing of the doors and starting of the car whereas on "without attendant" operation, the doors close automatically upon the expiration of a time delay after each stop and the car starts automatically as the doors reach closed position.

While the invention has been described as applied to a system having "with attendant" operation and "without attendant" operation, it is applicable to systems arranged only for "with attendant" operation or only for "without attendant" operation. Also the invention is applicable to installations in which night service is not provided. It is also applicable to installations in which basement service is not provided. While described as applied to a system in which landing calls are registered by firing gas tubes, the landing calls may be registered in other ways. Other circuit arrangements and mechanisms for controlling the starting and stopping of the cars may be employed. Also the cars may be controlled in other ways, as for example, on "with attendant" operation stopping may be controlled by the car attendants with stops for intending passengers indicated by signals.

While a four car, nine floor installation has been described, it is to be understood that the invention is applicable for installations of other numbers of cars and other numbers of floors. The number of floors in the selection zone may be varied. Also there may be a selection zone for the upper zone for "zone return" operation, as is done for example for the lower zone as indicated by the circuits for the second floor. Also switch ZTS2c and the corresponding switch for car d may be omitted in which event on down peak these cars do not respond to up landing calls when serving the upper zone. Regular dispatching intervals may be provided for up peak operation instead of starting the interval from the time of departure of the preceding car, especially when load dispatching is not provided, other operations remaining the same. The circuits may be arranged so that only certain cars handle down traffic under up peak traffic conditions as by controlling the non-stop relays for the other cars by contacts on switch VUP, as is done by contacts VDPlc under down peak conditions to non-stop car c on up trips so as not to respond to up landing calls. Also load dispatching may be made effective under up and down traffic conditions by omitting contacts VUPl or by by-passing these contacts as by a TSOS switch so as to be effective only on "with attendant" operation or vice versa. When load dispatching is effective and a car comes to the bottom terminal fully loaded, contacts TUD2 for that car prevent the immediate dispatching of the car, thus giving time for the car to be unloaded. Also automatic load non-stop may be provided for "with attendant" operation in which event it would be preferred that it be set for a higher percentage of car capacity as by providing a separate circuit for "with attendant" operation.

The invention is applicable to installations in which preference return is not provided. When preference return is provided contacts VO3 and VO9 may be omitted, thus rendering preference return effective at the sixth floor for down peak operation both on "zone return" and when "zone return" is not effective and also rendering preference return effective at the fifth floor on "zone return" operation. Other forms of down call seconds totalizers may be employed. Also the particular arrangement shown may be varied. The call accumulative resistors RCA may be omitted in which case relay XVO will be controlled by the accumulated time of call registration alone. Other forms of door protective apparatus may be utilized. Contacts THL3 for each car may be omitted in which event door close button DCB for that car is effective at the top terminal to close the doors without waiting on the time delay, provided the car is selected and the dispatching timing interval has expired. The odd or even number of cars determinental circuit may be varied as by changing the CS breaking contacts to making contacts and making contacts to breaking contacts in which event the cars out of dispatching would be determined and the information used accordingly.

It is not intended to set forth all the variations that may be made, but it is contemplated that many of the features of the invention disclosed may be carried out in other ways and may be used in connection with apparatus and circuits different from those specifically described and that many apparently widely different embodiments of the invention can be made without departure from the spirit and scope of the invention. It is therefore intended that all matter contained in the above description or shown in the accompanying drawings shall be interpreted as illustrative and not in a limiting sense.

What is claimed is:

1. A dispatching and control system for a plurality of elevator cars comprising; starting mechanism for each car; stopping mechanism for each car for stopping that car as it reaches a terminal floor; timing mechanism operable at regular intervals of time to provide dispatching intervals; selecting mechanism for preselecting the cars at said terminal floor for dispatching; and dispatching mechanism controlled by said timing mechanism and operable, when a car which makes such stop at said terminal floor is preselected for dispatching and the dispatching interval has expired, to cause starting of such car by its starting mechanism to dispatch the car from said terminal.

2. A dispatching and control system for a plurality of elevator cars comprising; starting mechanism for each car; stopping mechanism for each car; closure means for each car; closure operating mechanism for each car; means for each car for causing operation of said stopping mechanism for that car to stop the car at the floor which is at the end of a trip in a given direction and to cause opening of its closure means by its closure operating mechanism as such stop is made; dispatching mechanism operable when such stop is made to cause operation of said closure operating mechanism and starting mechanism for the car which makes the stop to close said closure means for that car and start the car in the other direction; and mechanism operable when more than one car is at said floor for causing such cars to be dispatched by said dispatching mechanism in the order of their arrival at said floor, regardless of the order of their previous departure.

3. A dispatching and control system for a plurality of elevator cars comprising; starting mechanism for each car; stopping mechanism for each car; closure means for each car; closure operating mechanism for each closure means; means for each car for causing operation of said stopping mechanism for that car to stop the car as it reaches a terminal floor and for causing opening of said closure means for that car by its closure operating mechanism as such stop is made; mechanism for providing dispatching intervals; mechanism for preselecting the cars for dispatching in their order of arrival at said floor; and dispatching mechanism controlled by said interval mechanism and operable to cause the closing of such closure means for said selected car by its closure operating mechanism and starting of such car by its starting mechanism to dispatch the car from said terminal floor.

4. A dispatching and control system for a plurality of elevator cars comprising; starting mechanism for each car; stopping mechanism for each car; closure means for each car; closure operating mechanism for each closure means; time delay mechanism for each car operable upon opening of said closure means for that car by its closure operating mechanism to delay reclosure thereof by such closure operating mechanism for a predetermined time delay; means for each car for causing operation of said stopping mechanism for that car to stop that car as it reaches the bottom terminal floor and to cause opening of said closure means for that car by its closure operating mechanism as such stop is made; timing mechanism operable at regular intervals of time to provide dispatching intervals; and dispatching mechanism controlled by said timing mechanism and operable, when a car makes such stop at the bottom terminal and both the dispatching interval and time delay have expired to cause closing of said closure means for that car by its closure operating mechanism and starting of such car by its starting mechanism to dispatch the car in the up direction from said terminal.

5. A dispatching and control system for a plurality of elevator cars comprising; starting mechanism for each car; stopping mechanism for each car; a car door for each car; a hoistway door for each car at the bottom terminal floor; door operating mechanism for each car; time delay mechanism for each car operable upon opening of said doors for that car by their door operating mechanism to delay reclosure thereof by such door operating mechanism for a predetermined time delay; means for each car for causing operation of said stopping mechanism for that car to stop the car as it reaches said bottom terminal floor and to cause opening of its doors by their door operating mechanism as such stop is made; timing mechanism operable at regular intervals of time to provide dispatching intervals; selecting mechanism for selecting the cars at the bottom terminal floor for dispatching; and dispatching mechanism controlled by said timing mechanism and operable, when a car which makes such stop at the bottom terminal floor is selected for dispatching and both the dispatching interval and the time delay for that car have expired, to cause closing of said doors for that car by their door operating mechanism and starting of such car by its starting mechanism to dispatch the car in the up direction from said terminal.

6. A dispatching and control system for a plurality of elevator cars comprising; starting mechanism for each car; stopping mechanism for each car for stopping that car at the floors served by that car; closure means for each car; closure operating mechanism for each car; means for each car operable upon stopping that car at a floor to cause opening of the closure means for that car by its closure operating mechanism and operable upon expiration of a time delay to cause closure of such closure means by its closure operating mechanism and operation of said starting mechanism for that car to start the car; timing mechanism operable at regular intervals of time to provide dispatching intervals; and means operable when a car stops at a terminal floor to delay the closing of said closure means for that car and the starting of that car when said dispatching interval has not expired upon the expiration of said time delay.

7. A dispatching and control system for a plurality of elevator cars comprising; starting mechanism for each car; a plurality of landing call registering means, one for each of a plurality of floors; call pick-up mechanism for each car for causing stopping of that car in response to said landing calls at the floors for which such calls are registered; a car door for each car; a hoistway door at each floor for each car; door operating mechanism for each car; means for each car operable upon stopping that car at a floor to cause opening of its car door and of its hoistway door at that floor by its door operating mechanism and operable upon expiration of a time delay after the doors reach open position to cause closure of such doors by its door operating mechanism and operation of said starting mechanism for that car to start the car as the doors reach closed position; timing mechanism operable at regular intervals of time to provide dispatching intervals; selecting mechanism for selecting the cars for dispatching from a given terminal floor; and means operable when a car stopped at said given terminal floor is selected for dispatching and said time delay expires before the expiration of said dispatching interval to delay the closing of said doors for that car and the starting of that car until said dispatching interval expires but when such car is not selected being ineffective to delay closure of the doors upon expiration of said time delay.

8. A dispatching and control system for a plurality of elevator cars comprising; starting mechanism for each car; stopping mechanism for each car; a car door for each car; a hoistway door at each floor for each car; door operating mechanism for each car; means for each car operable upon stopping that car at a floor to cause opening of its car door and of its hoistway door at that floor by its door operating mechanism and operable upon expiration of a time delay after the doors reach open position to cause closure of such doors by its door operating mechanism and operation of said starting mechanism for that car to start the car as the doors reach closed position; timing mechanism operable at regular intervals of time to provide dispatching intervals; selecting mechanism for selecting the cars for dispatching from a given terminal floor; and means controlled by said selecting mechanism and operable when a car stopped at said given terminal floor is selected for dispatching and said time delay expires before the expiration of said dispatching interval to delay the closing of said doors for that car and the starting of that car until said dispatching interval expires but when such car is not selected being ineffective to delay the closing of the doors upon expiration of said time delay, said last named means being operable upon selection of a car parked at such terminal with its doors closed to cause operation of said door operating mechanism for that car to reopen the doors and to close them upon expiration of the next dispatching interval and to cause operation of said starting mechanism for that car to start the car as the doors reach closed position.

9. A dispatching and control system for a plurality of elevator cars comprising; starting mechanism for each car; stopping mechanism for each car; a car door for each car; a hoistway door at each floor for each car; door operating mechanism for each car; timing mechanism operable at regular intervals of time to provide dispatching intervals; selecting mechanism for selecting the cars for dispatching from a given terminal floor; means for each car for causing operation of said stopping mechanism for that car to stop the car at said given terminal floor and to cause opening of its car door and of its hoistway door at that floor by its door operating mechanism; and means controlled by said selecting mechanism and operable when a car stopped at said given terminal floor is not selected for dispatching to cause operation of said door operating mechanism for that car to close the doors upon expiration of a given time delay after the doors reach open position and operable upon selection of that car to cause operation of said door operating mechanism for that car to reopen the doors and upon the next expiration of said dispatching interval to close the doors and to cause operation of said starting mechanism for that car to start the car as the doors reach closed position.

10. A dispatching and control system for a plurality of elevator cars comprising; starting mechanism for each car; stopping mechanism for each car; a car door for each car; a hoistway door at the top terminal floor for each car; door operating mechanism for each car; timing mechanism operable at regular intervals of time to provide dispatching intervals; means for each car for causing operation of said stopping mechanism for that car to stop the car at said top terminal floor and to cause opening of its car door and of its hoistway door at that floor by its door operating mechanism; and means for each car controlled by said timing mechanism and operable if the next dispatching interval has expired to cause operation of said door operating mechanism and starting mechanism for that car to close the doors upon the expiration of a given time delay after the doors reach open position and to start the car as the doors reach closed position and if said interval has not expired to delay the door closing and starting operation until said interval does expire.

11. A dispatching and control system for a plurality of elevator cars comprising; starting mechanism for each car; stopping mechanism for each car; a car door for each car; a hoistway door at the bottom terminal floor for each car; door operating mechanism for each car; selecting mechanism for selecting the cars for dispatching from said bottom terminal floor; means for each car for causing operation of said stopping mechanism for that car to stop the car at said bottom terminal floor and to cause opening of its car door and of its hoistway door at that floor by its door operating mechanism; and means for each car controlled by said selecting mechanism and operable if such car is not selected to cause operation of said door operating mechanism for that car to close its doors upon the expiration of a given time delay after the doors reach open position so as to cause the car to park with the doors closed until selected.

12. A dispatching and control system for a plurality of elevator cars comprising; starting mechanism for each car; stopping mechanism for each car; a car door for each car; a hoistway door at the bottom terminal floor for each car; door operating mechanism for each car; timing mechanism operable at regular intervals of time to provide dispatching intervals; selecting mechanism for selecting the cars for dispatching from said terminal floor; means for each car for causing operation of said stopping mechanism for that car to stop the car at said terminal floor and to cause opening of its car door and of its hoistway door at that floor by its door operating mechanism; and means for each car controlled by said selecting mechanism and operable if such car is selected to cause operation of said door operating mechanism and starting mechanism for that car to close the doors upon the expiration of a given time delay after the doors reach open position and to start the car as the doors reach closed position provided the next dispatching interval has expired and if said interval has not expired to delay the door closing and starting operation until said interval does expire.

13. A dispatching and control system for a plurality of elevator cars comprising; starting mechanism for each car; stopping mechanism for each car; a car door for each car; a hoistway door at the bottom terminal floor for each car; door operating mechanism for each car; timing mechanism operable at regular intervals of time to provide dispatching intervals; selecting mechanism for selecting the cars for dispatching from said bottom terminal floor; means for each car for causing operation of said stopping mechanism for that car to stop the car at said bottom terminal floor and to cause opening of its car door and of its hoistway door at that floor by its door operating mechanism; and means for each car controlled by said selecting mechanism for controlling the operation of said door operating mechanism and starting mechanism for that car at said bottom terminal, said controlled means being operable if such car is selected to cause operation of said door operating mechanism and starting mechanism for that car to close the doors upon the expiration of a given time delay after the doors reach open position and to start the car as the doors reach closed position provided the next dispatching interval has expired and if said interval has not expired to delay the door closing and starting operation until said interval does expire, and said controlled means being operable if such car is not selected to cause operation of said door operating mechanism for that car to close the doors upon expiration of said given time delay, to reopen the doors upon selection of that car and to close the doors upon the next expiration of said dispatching interval and to cause operation of said starting mechanism for that car to start the car as the doors reach closed position.

14. A dispatching and control system for a plurality of elevator cars comprising; timing mechanism for providing dispatching intervals for dispatching the cars from a terminal floor; and mechanism for dispatching a car from said floor at the expiration of a dispatching interval provided another car is at said floor at that time but for delaying the dispatching of such car if there is only one car there at that time.

15. A dispatching and control system for a plurality of elevator cars comprising; dispatching mechanism for the cars for dispatching a car from a terminal floor upon expiration of a given timing interval after the departure of the preceding car from said terminal floor; and mechanism controlled by the number of cars at said terminal floor for delaying the dispatching of a car from said terminal floor if another car is not at said terminal floor as said interval expires.

16. A dispatching and control system for a plurality of elevator cars comprising; timing mechanism for providing a given dispatching interval; means for each car responsive to the departure of that car from a given terminal floor for starting said timing mechanism in operation; dispatching mechanism for the cars for dispatching a car from said terminal floor upon expiration of said dispatching interval after the departure of the preceding car from said terminal floor; and mechanism controlled by the number of cars at said terminal floor for delaying for an additional interval the dispatching of a car from said terminal floor if another car is not at said terminal floor.

17. A dispatching and control system for a plurality of elevator cars comprising; timing mechanism for providing a given dispatching interval; means for each car responsive to the departure of that car from the bottom terminal floor for starting said timing mechanism in operation; dispatching mechanism for the cars for dispatching a car from said terminal floor upon expiration of said dispatching interval after the departure of the preceding car from said terminal floor, provided another car is also at said terminal floor; and mechanism controlled by the cars at said terminal floor and operable if another car is not at said terminal floor as said dispatching interval expires for delaying the dispatching of said car from said terminal floor either until the expiration of an additional half dispatching interval or the arrival of another car at said terminal floor, whichever occurs first.

18. A dispatching and control system for a plurality of elevator cars comprising; a plurality of up dispatching signals, one for each car; timing mechanism for providing a given dispatching interval; means for each car responsive to the departure of that car from the bottom terminal floor for restarting said timing mechanism in operation; dispatching mechanism for the cars for giving to a selected car at said bottom terminal floor upon expiration of said dispatching interval after the departure of the preceding car from said bottom terminal floor its up dispatching signal to dispatch that car from said bottom terminal floor on its upward trip, provided another car is also at said bottom terminal floor at that time; and mechanism controlled by the cars at said bottom terminal floor and operable if another car is not at said bottom terminal floor as said dispatching interval expires for delaying the giving of the up dispatching signal to said selected car either until the expiration of an additional half dispatching interval or the arrival of another car at said bottom terminal floor, whichever occurs first and also operable if no car arrives at said bottom terminal floor before the expiration of one and one half dispatching intervals after the departure of the preceding car to cause said dispatching mechanism to give to a car its dispatching signal as soon as it arrives at said bottom terminal floor.

19. A dispatching and control system for a plurality of elevator cars comprising; timing mechanism for providing dispatching intervals; load responsive mechanism for each car; and mechanism for dispatching said cars from a given terminal floor, said dispatching mechanism being controlled by said timing mechanism to effect the dispatching of a car from said floor at the expiration of said dispatching interval and being also controlled by said load responsive mechanism for a car at said floor to effect the dispatching of that car as soon after unloading as it becomes loaded to a certain percentage of capacity.

20. A dispatching and control system for a plurality of elevator cars comprising; dispatching mechanism for said cars; timing mechanism for controlling said dispatching mechanism to cause the dispatching of a car from a terminal floor upon the expiration of a certain interval from the start of the timing mechanism operation; load responsive mechanism for each car for controlling said dispatching mechanism to cause the immediate dispatching of a car from said terminal floor when entering traffic loads that car to a certain percentage of capacity; and means responsive to the departure of a car from said terminal floor for restarting said timing mechanism in operation, regardless of the time which has elapsed from the preceding start of the timing mechanism in operation.

21. A dispatching and control system for a plurality of elevator cars comprising; timing mechanism; load responsive mechanism for each car controlled by the load in that car; dispatching mechanism controlled by said timing mechanism and by said load responsive mechanism for a car at a given terminal floor for dispatching that car from said terminal floor upon expiration of a certain interval from the start of a timing operation by said timing mechanism or when the load in that car increases to a certain percentage of capacity, whichever occurs first; and means responsive to the departure of a car from said terminal floor for restarting said timing mechanism in operation, regardless of when the departure occurs.

22. A dispatching and control system for a plurality of elevator cars comprising; a plurality of up dispatching signals, one for each car; timing mechanism for providing a given dispatching interval; dispatching mechanism for the cars for giving to a selected car at the bottom terminal floor its dispatching signal upon expiration of said dispatching interval, provided another car is also at said terminal floor, and if not upon the expiration of an additional half dispatching interval or the arrival of another car at said terminal floor, whichever occurs first; load responsive mechanism for each car operable as soon as that car at said terminal floor has taken on full load to cause its dispatching signal to be immediately given; and means responsive to the departure of any car from said terminal floor for restarting said timing mechanism in operation so as to measure said dispatching interval from the time of departure of the preceding car from said terminal floor.

23. A dispatching and control system for a plurality of elevator cars comprising; starting mechanism for each car; timing mechanism for controlling said starting mechanism for each car at the bottom terminal to cause the starting of that car upon expiration of a certain interval from the start of a timing operation; load responsive mechanism for each car for controlling said starting mechanism for that car at said terminal floor to cause the immediate starting of the car when it has taken on sufficient passengers to load it to a certain percent of capacity; and means responsive to the departure of a car from said terminal floor for restarting said timing mechanism in operation.

24. A dispatching and control system for a plurality of elevator cars comprising; timing mechanism for providing a given dispatching interval; means for each car responsive to the departure of that car from the bottom terminal floor for starting said timing mechanism in operation; selecting mechanism for selecting the cars for dispatching from said terminal floor; dispatching mechanism for the cars for starting a selected car from said terminal floor upon expiration of said dispatching interval after the departure of the preceding car from said terminal floor, provided another car is also at said terminal floor; and mechanism controlled by the number of cars at said terminal floor and operable if another car is not at said terminal floor as said dispatching interval expires for delaying the starting of said car from said terminal floor either until the expiration of an additional half dispatching interval or the arrival of another car at said terminal floor, whichever occurs first.

25. A dispatching and control system for a plurality of elevator cars comprising; starting mechanism for each car; timing mechanism for providing a given dispatching interval; dispatching mechanism for the cars for causing the starting of a selected car from the bottom terminal by its starting mechanism upon expiration of said dispatching interval, provided another car is also at said terminal floor, and if not upon the expiration of an additional half interval or the arrival of another car at said terminal floor, whichever occurs first; load responsive mechanism for each car operable when that car at said terminal floor has its load increased to a certain value to cause the immediate starting of the car by its starting mechanism; and means responsive to the departure of any car from said terminal floor for restarting said timing mechanism in operation so as to measure said dispatching interval from the time of departure of the preceding car from said terminal floor.

26. A dispatching and control system for a plurality of elevator cars comprising; starting mechanism for each car; closure means for each car; closure operating mechanism for each car; timing mechanism for providing a given dispatching interval; means for each car responsive to the departure of that car from the bottom terminal floor for starting said timing mechanism in operation; dispatching mechanism for the cars for causing upon expiration of said dispatching interval after the departure of the preceding car from said terminal floor closure of said closure means for a car at said terminal floor by its closure operating mechanism and starting of said car by its starting mechanism to dispatch the car from said terminal floor, provided another car is also at said terminal floor; and mechanism for each car controlled by the load in that car at said terminal floor for causing when after unloading that car becomes fully loaded the immediate closure of said closure means for that car by its closure operating mechanism and the starting of the car by its starting mechanism, thus dispatching the car from said terminal floor without waiting on the expiration of said dispatching interval.

27. A dispatching and control system for a plurality of elevator cars comprising; starting mechanism for each car; a door for each car; door operating mechanism for each car; timing mechanism for providing a given dispatching interval; mechanism for selecting the cars for dispatching from the bottom terminal floor; dispatching mechanism for the cars for causing upon expiration of said dispatching interval closure of said door for a selected car at said terminal floor by its door operating mechanism and starting of said car by its starting mechanism to dispatch the car from said terminal floor, provided another car is also at said terminal floor; mechanism controlled by the number of cars at said terminal floor and operable if another car is not at said terminal floor for delaying said dispatching of said selected car; load responsive mechanism for each car operable when that car at said terminal floor has taken on sufficient passengers to load the car to cause the immediate closure of said closure means for that car by its closure operating mechanism and the starting of the car by its starting mechanism, thus dispatching the car from said terminal floor without waiting on the expiration of said dispatching interval; and means responsive to the departure of any car from said terminal floor for restarting said timing mechanism in operation so as to measure said dispatching interval from the time of departure of the preceding car from said terminal floor.

28. A dispatching and control system for a plurality of elevator cars in which landing call registering means is provided for registering calls for each of a plurality of floors, in which the calls are answered by the cars, and in which the cars are dispatched on their downward trips at regular intervals of time, characterized in that highest call mechanism controlled by the number of unanswered landing calls for certain floors is provided for dispatching said cars on their downward trips from the floors of highest landing call as soon as such highest calls are answered.

29. A dispatching and control system for a plurality of elevator cars in which landing call registering means is provided for registering calls for each of a plurality of floors, in which the calls are answered by the cars, and in which the cars are dispatched on their downward trips by timing mechanism operating at regular intervals of time, characterized in that zoning mechanism controlled by the number of unanswered landing calls for certain floors is provided for assigning certain cars to a low zone of said floors and the other cars to a high zone of said floors and for rendering said timing mechanism ineffective, and that highest call mechanism is provided for dispatching said cars on their downward trips from the floors of highest landing call in their zones.

30. A dispatching and control system for a plurality of elevator cars comprising; call registering means for each of a plurality of floors; call pick-up mechanism for each car for causing stopping of that car in response to registered calls at the floors for which such calls are registered and the automatic cancelling of said calls as the calls are answered; timing mechanism for initiating the dispatching of the cars on their downward trips at regular intervals of time; and mechanism responsive to calls for certain floors remaining registered for a certain total time for causing, upon each car completing its upward trip, the immediate dispatching of that car on its downward trip.

31. A dispatching and control system for a plurality of elevator cars comprising; call registering means for each of a plurality of floors; call pick-up mechanism for each car for causing stopping of that car in response to registered calls at the floors for which such calls are registered and the automatic cancelling of said calls as the calls are answered; timing mechanism for initiating the dispatching of the cars on their downward trips at regular intervals of time; highest call mechanism for causing, upon each car completing its upward trip, the immediate dispatching of that car on its downward trip; and call time measuring mechanism for determining whether said timing mechanism or said highest call mechanism is effective to dispatch the cars.

32. A dispatching and control system for a plurality of elevator cars comprising; call registering means for each of a plurality of floors; call pick-up and stop initiating mechanism for each car for causing stopping of that car in response to registered calls at the floors for which such calls are registered; timing mechanism operable at regular intervals of time to provide dispatching intervals; dispatching mechanism for the cars controlled by said timing mechanism for causing the starting of the cars on their downward trips; and mechanism responsive to the total accumulated time that unanswered calls for certain floors have been registered for rendering said timing mechanism ineffective and for causing, upon each car answering its highest call, the starting of that car on its downward trip.

33. A dispatching and control system for a plurality of elevator cars serving a plurality of floors in which all the cars are assigned to respond to down landing calls at all of said floors for which such calls are registered, in which the calls are automatically cancelled as they are answered, characterized in that zoning mechanism is provided for assigning certain cars to respond to down landing calls at floors in a low zone of said floors and for assigning the other cars to respond to down landing calls at floors in a high zone of said floors and also to those down landing calls at floors in said low zone if there be room in the cars, and that switch-over mechanism is provided which is controlled by the accumulated time that unanswered down landing calls have been registered for certain floors for determining whether said cars are assigned to all of said floors or whether they are assigned to said zones of floors.

34. A dispatching and control system for a plurality of elevator cars in which the cars stop in response to landing calls at the floors for which such calls are registered, in which the calls are automatically cancelled as they are answered, and in which under down peak conditions the cars are dispatched on their downward trips at regular intervals of time, characterized in that zoning mechanism is provided for assigning certain cars to a low zone of said floors and the other cars to a high zone of said floors, that highest call mechanism is provided for dispatching said cars on their downward trips from their floors of highest landing call, and that switch-over mechanism is provided which is controlled by the unanswered landing calls for certain floors for determining whether said cars are to be dispatched at regular intervals of time or whether said cars are to be assigned to zones and dispatched by said highest call mechanism.

35. A dispatching and control system for a plurality of elevator cars comprising; call registering means for each of a plurality of floors; call pick-up and stop initiating mechanism for each car for causing stopping of that car in response to registered calls at the floors for which such calls are registered and the automatic cancelling of such calls as they are answered; timing mechanism operable at regular intervals of time to provide dispatching intervals; dispatching mechanism for the cars operable upon the expiration of each dispatching interval to cause the starting of a car on its downward trip; circuit control mechanism for assigning certain of said cars to a high zone of floors and for assigning the other cars to a low zone of floors and for causing, upon each car answering its highest call in its zone, the starting of that car in the down direction; and mechanism responsive to the total accumulated time that unanswered calls for certain floors have been registered for determining whether or not the cars are under the control of said dispatching mechanism or said circuit control mechanism.

36. A dispatching and control system for a plurality of elevator cars, each car having closure means for controlling access to the car for each floor served and operating mechanism therefor, said system comprising; call registering means for each of a plurality of floors; call pick-up and stop initiating mechanism for each car for causing stopping of that car in response to registered calls at the floors for which such calls are registered; timing mechanism operable at regular intervals of time to provide dispatching intervals; dispatching mechanism for the cars rendered effective by said timing mechanism upon the expiration of each timing interval to cause the closure of said closure means for a car and the starting of that car in the down direction either from the top terminal or a floor below; and mechanism responsive to the total accumulated time that unanswered calls for certain floors have been registered for assigning certain of said cars to a high zone of floors and for assigning the other cars to a low zone of floors and for causing, upon each car answering its highest call in its zone, closure of said closure means for that car and the starting of the car in the down direction, irrespective of said timing interval.

37. A dispatching and control system for a plurality of elevator cars in which the cars on their downward trips stop in response to down landing calls at the floors for which such calls are registered, in which the calls are automatically cancelled as they are answered, in which the cars are given down dispatching signals to dispatch them on their downward trips and in which under down peak conditions the giving of the down dispatching signals to the cars is initiated by interval timing mechanism operable at regular intervals of time, characterized in that zoning mechanism is provided for assigning certain cars to respond to down calls at floors in a low zone of said floors and for assigning the other cars to respond to down calls at all of said floors, that highest call mechanism is provided for causing each car on its upward trip to stop in response to the highest down landing call of those for the floors to which that car is assigned and for causing the down dispatching signal to be given that car upon its being stopped at the floor at which such call is registered, and that switch-over mechanism is provided which is controlled by the accumulated time that unanswered down landing calls have been registered for certain floors for determining whether said cars are to be dispatched by said interval timing mechanism or whether said certain cars are to be assigned to said low zone and all cars dispatched by said highest call mechanism.

38. A dispatching and control system for a plurality of elevator cars, each car having a car door and a hoistway door for each of a plurality of floors and operating mechanism therefor, said system comprising; call registering means for each of said floors; call pick-up and stop initiating mechanism for each car for causing stopping of that car in response to registered calls at the floors for which such calls are registered and the automatic cancelling of such calls as they are answered; timing mechanism operable at regular intervals of time to provide dispatching intervals; dispatching mechanism for the cars operable upon the expiration of each timing interval to start a car in the down direction from the top terminal or a floor below upon the closure of said doors, thus dispatching that car on its downward trip; mechanism for measuring the total accumulated time that unanswered calls for certain floors have been registered; and switching mechanism responsive to said measured accumulated time reaching a certain amount for assigning certain of said cars to a high zone of floors and for assigning the other cars to a low zone of floors, for rendering said interval timing mechanism ineffective, and for causing each car that has answered its highest call in its zone to start in the down direction upon the closure of its doors, thus dispatching the car on its downward trip.

39. A dispatching and control system for a plurality of elevator cars in which the cars on their downward trips stop in response to down landing calls at the floors for which such calls are registered, in which the calls are automatically cancelled as they are answered, in which the cars are given down dispatching signals to dispatch them on their downward trips and in which under down peak conditions the giving of the down dispatching signals to the cars is initiated by interval timing mechanism operable at regular intervals of time, characterized in that zoning mechanism is provided for assigning certain cars to a high zone of floors and the other cars to a low zone of floors, that highest call mechanism is provided for causing each car on its upward trip to stop in response to the highest down landing call in its zone and for causing the down dispatching signal to be given that car upon its being stopped at the floor at which such call is registered, that call time measuring mechanism is provided for measuring the accumulated time that unanswered down landing calls have been registered for certain floors, and that switch-over mechanism is provided which is controlled by said call time measuring mechanism for determining whether said cars are to be dispatched by said interval timing mechanism or whether they are to be assigned to said zones and dispatched by said highest call mechanism.

40. A dispatching and control system for a plurality of elevator cars, each car having a car door and a hoistway door for each of a plurality of floors and operating mechanism therefor, said system comprising; call registering means common to the cars for registering an up landing call and a down landing call for each of said floors; call registering means for each car for registering a car call for each of said floors; call pick-up and stop initiating mechanism for each car for causing stopping of that car in response to registered calls at the floors for which such calls are registered; up dispatching mechanism for the cars operable when each car arrives at the bottom terminal to start that car in the up direction upon the closure of the doors, thus dispatching that car on its upward trip; timing mechanism operable at regular intervals of time to provide dispatching intervals; down dispatching mechanism for the cars operable upon the expiration of each timing interval to start a car in the down direction from the top terminal of floor below upon the closure of the doors, thus dispatching that car on its downward trip; mechanism for measuring the total accumulated time that unanswered down landing calls for certain floors have been registered; and switching mechanism responsive to said measured accumulated time reaching a certain amount, depending on the number of such calls, for assigning certain of said cars to a high zone of floors and for assigning the other cars to a low zone of floors, for rendering said interval timing mechanism ineffective, and for causing each car that has answered its highest call in its zone to start in the down direction upon the closure of its doors, thus dispatching the car on its downward trip.

41. A dispatching and control system for a plurality of elevator cars in which the cars on their downward trips stop in response to down landing calls at the floors for which such calls are registered, in which the calls are automatically cancelled as they are answered, in which the cars are given up dispatching signals to dispatch them on their upward trips and are given down dispatching signals to dispatch them on their downward trips, and in which under down peak conditions the giving of the up dispatching signals to the cars is effected by mechanism responsive to the arrival of the cars at the bottom terminal and the giving of the down dispatching signals to the cars is initiated by timing mechanism operable at regular intervals of time and is effected at the top terminal if a car arrives at that terminal before the expiration of the timing interval and may be effected at a floor below the top terminal if the timing interval has expired, characterized in that electrical time measuring circuits are provided for measuring the accumulated time that unanswered down landing calls have been registered for certain floors, that switching mechanism is provided which is responsive to said measured accumulated time reaching a certain amount, depending on the number of such calls for rendering said timing mechanism ineffective and for causing upward travel of certain of said cars above a certain intermediate floor and for preventing further upward travel of the other cars above said certain floor, thereby assigning said certain cars to a high zone and said other cars to a low zone, and that highest call mechanism is provided which is effective upon operation of said switching mechanism for causing each car on its upward trip to stop in response to the highest down landing call in its zone and for causing the down dispatching signal to be given that car upon its being stopped at the floor at which such call is registered.

42. A dispatching and control system for a plurality of elevator cars comprising; down call registering means for each of a plurality of floors; up call registering means for each of said floors; call pick-up mechanism for each of certain of said cars for causing stopping of that car in response to registered up calls during its up trip and in response to registered down calls during its down trip at the floors for which such calls are registered; call pick-up mechanism for each of the other cars for causing stopping of that car in response to registered down calls during its down trip at the floors for which such calls are registered; circuit control mechanism for each of such other cars for preventing the operation of the call pick-up mechanism for that car to stop the car in response to up registered calls; call cancelling mechanism for causing the automatic cancelling of said calls as the calls are answered; mechanism for initiating the dispatching of the cars on their downward trips at regular intervals of time; and mechanism responsive to calls for certain floors remaining registered for a certain total time for assigning said certain cars to an up zone of said floors and said other cars to a low zone of said floors and for causing, upon each car completing its upward trip in its zone, the immediate dispatching of that car on its downward trip.

43. A dispatching and control system for a plurality of elevator cars comprising; down call registering means for each of a plurality of floors; up call registering means for each of said floors; call pick-up mechanism for each of certain of said cars for causing stopping of that car in response to registered up calls during its up trip and in response to registered down calls during its down trip at the floors for which such calls are registered; call pick-up mechanism for each of the other cars for causing stopping of that car in response to registered down calls during its down trip at the floors for which such calls are registered; circuit control mechanism for each of such other cars for preventing the operation of the call pick-up mechanism for that car to stop the car in response to up registered calls; call cancelling mechanism for causing the automatic cancelling of said calls as the calls are answered; timing mechanism for initiating the dispatching of the cars on their downward trips at regular intervals of time; circuit controlling mechanism for assigning said certain cars to an up zone of said floors and said other cars to a low zone of said floors and for causing, upon each car completing its upward trip in its zone, the immediate dispatching of that car on its downward trip; electrical time measuring circuits for measuring the total time that calls for certain floors remain unanswered; and switching mechanism controlled by said time measuring circuits for determining whether the cars are dispatched by said timing mechanism or said circuit controlling mechanism.

44. A dispatching and control system for a plurality of elevator cars in which landing call registering means is provided for registering calls for each of a plurality of floors, in which the calls are answered by the cars, and in which the floors are divided into zones, characterized in that switch-over mechanism is provided for assigning all cars to both zones or for assigning certain cars to the low zone, and that position responsive mechanism is provided for each low zone car operable in the event that such low zone car is an up car in the high zone at the time of operation of said switch-over mechanism to prevent further upward travel of that car above the next floor at which a stop can be made.

45. A dispatching and control system for a plurality of elevator cars in which call registering means is provided for registering down landing calls for each of a plurality of floors, in which during downward travel of the cars stops are made in response to such calls at the floors for which the calls are registered, and in which the floors are divided into zones, characterized in that electrical time measuring circuits are provided for measuring the accumulated time that unanswered down landing calls have been registered for certain floors, that switching mechanism is provided which is controlled by said time measuring circuits for assigning all cars to both zones or for assigning certain cars to the low zone depending upon the amount of said accumulated time, and that position responsive mechanism is provided for each low zone car operable in the event that such low zone car is an up car in the high zone at the time of operation of said switch-over mechanism to cause that car to stop at the next floor at which a stop can be made and become set for downward travel.

46. A dispatching and control system for a plurality of elevator cars comprising; a plurality of down landing call registering means, one for each of a plurality of floors; switching mechanism for assigning certain cars to a high zone of said floors and the other cars to a low zone of said floors; call pick-up mechanism for each car for causing stopping of that car on its downward trip in response to registered down landing calls in its zone at the floors for which such calls are registered; and means for each of certain floors in each zone rendered effective in response to a down landing call for such floor which remains unanswered for more than a certain period of time to cause operation of the call pick-up mechanism for a car serving the zone in which such floor is located to stop that car at such floor during its upward travel, said means being ineffective if such down landing call has been registered for less than said certain period of time.

47. A dispatching and control system for a plurality of elevator cars comprising; a plurality of down landing call registering means, one for each of a plurality of floors; call pick-up mechanism for each car for causing stopping of that car on its downward trip in response to registered down landing calls at the floors for which such calls are registered; switch-over mechanism controlled by the unanswered landing calls for certain of said floors for assigning certain cars to a high zone of said floors and the other cars to a low zone of said floors; means for each of certain floors in each zone rendered effective in response to a down landing call for such floor which remains unanswered for more than a certain period of time to cause operation of the call pick-up mechanism for a car serving the zone in which such floor is located to stop that car at such floor during its upward travel, said means being ineffective if such down landing call has been registered for less than said certain period of time; and direction mechanism for each car operable when that car on its upward trip stops in response to a call which has remained unanswered for said certain period of time to set the car for travel in the down direction.

48. A dispatching and control system for a plurality of elevator cars comprising; a plurality of down landing call registering means, one for each of a plurality of floors; call pick-up mechanism for each car for causing stopping of that car on its downward trip in response to registered down landing calls at the floors for which such calls are registered; electrical time measuring circuits for measuring the accumulated time that unanswered down landing calls have been registered for certain of said floors; switching mechanism responsive to said measured accumulated time reaching a certain amount for assigning certain cars to a high zone of said floors and the other cars to a low zone of said floors; highest call mechanism rendered effective upon operation of said switching mechanism to cause each car on its upward trip to stop in response to the highest down landing call in its zone; means for each of certain floors in each zone rendered effective in response to a call registered by said down landing call registering means for such floor which remains unanswered for more than a certain period of time to cause operation of the call pick-up mechanism for a car serving the zone in which such floor is located to stop that car at such floor during its upward travel, irrespective of whether it be the highest call; and direction mechanism for each car operable when that car on its upward trip stops in response to its highest call or to a call which has remained unanswered for said certain period of time to set the car for travel in the down direction.

49. A dispatching and control system for a plurality of elevator cars comprising; a plurality of landing call registering means, one for each of a plurality of floors; call pick-up mechanism for each car for causing during travel of that car in a certain direction stopping of that car in response to said landing calls at the floors for which such calls are registered; preference mechanism for each of certain of said floors rendered effective in response to a landing call for such floor which remains unanswered for more than a certain period of time to cause operation of the call pick-up mechanism for a car to stop that car at such floor during its travel in the opposite direction, said means being ineffective if such call has been registered for less than said certain period of time; and time measuring means operable in response to the accumulated time that certain landing calls remain unanswered for increasing said period of time for said preference mechanism to become effective.

50. A dispatching and control system for a plurality of elevator cars comprising; a plurality of down landing call registering means, one for each of a plurality of floors; call pick-up mechanism for each car for causing during the downward trip of that car stopping of that car in response to registered down landing calls at the floors for which such calls are registered; preference mechanism for each of certain of said floors rendered effective in response to a down landing call for such floor which remains unanswered for more than a certain period of time to cause operation of the call pick-up mechanism for a car to stop that car at such floor during its upward travel, said means being ineffective if such down landing call has been registered for less than said certain period of time; and time measuring means operable in response to the accumulated time that certain down landing calls remain unanswered for increasing said period of time which a down landing call for each of said certain floors remains unanswered in order for said preference mechanism for such floor to become effective.

51. A dispatching and control system for a plurality of elevator cars serving a plurality of floors, at least one car also serving a floor beyond a given terminal floor, said system comprising; selecting mechanism for selecting the cars at said terminal floor for dispatching; call registering means; means for stopping said floor beyond serving car at said terminal floor; and mechanism responsive to the operation of said call registering means for preventing selection for dispatching of said floor beyond serving car by said selecting mechanism.

52. A dispatching and control system for a plurality of elevator cars serving a plurality of floors, at least one car also serving a basement floor below the bottom terminal floor, said system comprising; selecting mechanism for preselecting the cars at the bottom terminal floor for dispatching on their upward trips; timing mechanism for initiating said dispatching of the cars preselected; call registering means for each of said floors for registering a call for that floor; and mechanism responsive to said registered basement floor call for preventing, when said basement serving car is stopped at said bottom terminal floor, its selection by said selecting mechanism for dispatching.

53. A dispatching and control system for a plurality of elevator cars serving a plurality of floors, at least one car also serving a basement floor below the bottom terminal floor, said system comprising; selecting mechanism for selecting the cars at the bottom terminal floor for dispatching on their upward trips; timing mechanism for initiating said dispatching of the cars selected; call registering means for said basement floor for registering a call for that floor; means for stopping said basement serving car at said bottom terminal floor; and mechanism responsive to the registration of said call, either before the stopping of said basement serving car at said bottom terminal floor or while it is stopped at such floor, for preventing selection of that car by said selecting mechanism for dispatching until such call is answered.

54. A dispatching and control system for a plurality of elevator cars serving a plurality of floors, at least one car also serving a basement floor below the bottom terminal floor, said system comprising; selecting mechanism for selecting the cars at the bottom terminal floor for dispatching on their upward trips; timing mechanism for initiating said dispatching of the cars selected; call registering means for said basement floor for registering a call for that floor; means for said basement serving car for causing it to answer said basement floor call; mechanism responsive to the registration of said call, either before the stopping of said basement serving car at said bottom terminal floor or while it is stopped at such floor, for preventing selection of that car by said selecting mechanism for dispatching until such call is answered; and means controlled by said selecting mechanism for preventing interruption of the dispatching of said basement serving car by said basement floor call when such call is registered after the selection of that car.

55. A dispatching and control system for a plurality of elevator cars serving a plurality of floors, at least one car also serving a basement floor below the bottom terminal floor, said system comprising; selecting mechanism for selecting the cars at the bottom terminal floor for dispatching on their upward trips; timing mechanism for initiating said dispatching of the cars selected; car call registering means for each car for each of said floors including in the case of said basement serving car the basement floor for registering a car call for that car for that floor; and mechanism responsive to the registration of said basement floor car call for said basement serving car for preventing, when that car is stopped at said bottom terminal floor, selection of that car by said selecting mechanism for dispatching.

56. A dispatching and control system for a plurality of elevator cars serving a plurality of floors, at least one car also serving a basement floor below the bottom terminal floor, said system comprising; selecting mechanism for selecting the cars at the bottom terminal floor for dispatching on their upward trips; timing mechanism for initiating said dispatching of the cars selected; landing call registering means for each of said floors for registering a call for that floor; call pick-up mechanism for each car responsive to said calls for stopping that car during its downward travel at the floors for which such calls are registered; means for each car for causing stopping of that car during its downward travel at said bottom terminal floor when said call for that floor is not registered, provided said call for said basement floor is not registered; and mechanism responsive to said registered basement floor for preventing, when said basement serving car is stopped at said bottom terminal floor, its selection by said selecting mechanism for dispatching.

57. A dispatching and control system for a plurality of elevator cars serving a plurality of floors, at least one car also serving a basement floor below the bottom terminal floor, said system comprising; selecting mechanism for selecting the cars at the bottom terminal floor for dispatching on their upward trips; timing mechanism for initiating said dispatching of the cars selected; landing call registering means for each of said floors for registering a landing call for that floor; car call registering means for each car for each floor, including in the case of said basement serving car the basement floor, for registering a car call for that floor; call pick-up mechanism for each car responsive to said landing calls and to said car calls for that car for stopping that car during its downward travel at the floors for which such calls are registered; means for each car for causing stopping of that car during its downward travel at said bottom terminal floor when said landing call for that floor and car call for that car for that floor are not registered; provided said landing call for said basement floor is not registered and in the case of said basement serving car its basement car is not registered; and mechanism responsive to said registered basement landing call or said registered basement car call for said basement serving car for preventing, when that car is stopped at said bottom terminal floor, its selection by said selecting mechanism for dispatching.

58. A dispatching and control system for a plurality of elevator cars serving a plurality of floors, at least one car also serving a basement floor below the bottom terminal floor, said system comprising; selecting mechanism for selecting the cars at the bottom terminal floor for dispatching on their upward trips; timing mechanism for initiating said dispatching of the cars selected; landing call registering means for each of said floors for registering a landing call for that floor; car call registering means for each car for each floor, including in the case of said basement serving car the basement floor, for registering a car call for that floor; call pick-up mechanism for each car responsive to said landing calls and to said car calls for that car for stopping that car during its downward travel at the floors for which such calls are registered; means for each car for causing stopping of that car during its downward travel at said bottom terminal floor when said landing call for that floor and car call for that car for that floor are not registered, provided said landing call for said basement floor is not registered and in the case of said basement serving car its basement car call is not registered; mechanism responsive to said basement landing call or said registered basement car call for said basement serving car when registered prior to the selection of that car for preventing the selection of that car until such call is responded to; and means controlled by said selecting mechanism for preventing either of said basement calls interrupting the dispatching of said basement serving car when such call is registered before the initiation of said dispatching operation but after the car has been selected.

59. A dispatching and control system for a plurality of elevator cars serving a plurality of floors, at least one car also serving a basement floor below the bottom terminal floor, said system comprising; selecting mechanism for selecting the cars at the bottom terminal floor for dispatching on their upward trips; call registering means for said bottom terminal floor for registering a call for that floor; means for stopping said basement car at said bottom terminal floor; and mechanism responsive to the operation of said bottom terminal call registering means for preventing selection of said basement serving car by said selecting mechanism until the expiration of a certain time interval after it has stopped at said bottom terminal floor.

60. A dispatching and control system for a plurality of elevator cars serving a plurality of floors, at least one car also serving a basement floor below the bottom terminal floor, said system comprising; selecting mechanism for selecting the cars at the bottom terminal floor for dispatching on their upward trips; timing mechanism for initiating said dispatching of the selected cars; down landing call registering means for said bottom terminal floor for registering a call for that floor; means for stopping said basement serving car at said bottom terminal floor; and mechanism responsive to the operation of said bottom terminal call registering means, either before the stopping of said basement serving car at said bottom terminal floor or while it is stopped at such floor, for preventing selection of that car by said selecting mechanism until the expiration of a certain time interval after the car stops at said bottom terminal floor.

61. A dispatching and control system for a plurality of elevator cars serving a plurality of floors, at least one car also serving a basement floor below the bottom terminal floor, said system comprising; selecting mechanism for selecting the cars at the bottom terminal floor for dispatching on their upward trips; timing mechanism for initiating said dispatching of the selected cars; down landing call registering means for said bottom terminal floor for registering a call for that floor; car call registering means for registering a basement car call for said basement serving car; means responsive to said bottom terminal call for stopping said basement serving car at said bottom terminal floor on its downward trip; and mechanism responsive to the operation of said bottom terminal call registering means, either before the stopping of said basement serving car at said bottom terminal floor or while it is stopped at such floor, for preventing selection of that car by said selecting mechanism until the expiration of a certain time interval sufficient for the passenger who operated said landing call registering means to enter the car and operate said basement car call registering means.

62. A dispatching and control system for a plurality of elevator cars comprising; mechanism for initiating dispatching of the cars at regular intervals of time from a terminal floor; starting mechanism for each car; and time delay means for each car for taking that car out of dispatching when starting of that car from said terminal floor is delayed for a certain interval of time after operation of said dispatching mechanism.

63. A dispatching and control system for a plurality of elevator cars comprising; dispatching mechanism for said cars; mechanism for each car for stopping that car at each of a plurality of floors served by the cars; mechanism for each car for starting said car after each of such stops; time delay mechanism for each car; and means for each car controlled by said time delay mechanism for that car for removing that car from being subject to said dispatching mechanism if the starting of that car after any of such stops is delayed for a certain interval of time.

64. A dispatching and control system for a plurality of elevator cars comprising; dispatching mechanism for said cars; mechanism for each car for stopping that car at each of a plurality of floors served by the cars; time delay mechanism for each car; mechanism for each car controlled by said time delay mechanism for that car for automatically starting said car upon the expiration of a given time interval after each of such stops; additional time delay mechanism for each car; and means for each car controlled by said additional time delay mechanism for that car for taking that car out of dispatching if the starting of that car after any of such stops is delayed for a certain interval of time, longer than said given time interval.

65. A dispatching and control system for a plurality of elevator cars comprising; mechanism for selecting the cars for dispatching from the terminal floors; mechanism for dispatching the cars at regular intervals of time; starting mechanism for each car for starting that car from each terminal floor, when selected, upon operation of said dispatching mechanism; time delay mechanism for each car; and means for each car controlled by said time delay mechanism for that car for taking that car out of dispatching when starting of that car from a terminal floor is delayed for the time interval of said time delay mechanism after the car has been selected and the dispatching mechanism has operated.

66. A dispatching and control system for a plurality of elevator cars comprising; dispatching mechanism for said cars; closure means for each car; operating mechanism for each closure means; mechanism for each car for stopping that car at each of a plurality of floors served by the cars and for causing opening of said closure means for that car by its operating mechanism as each stop is made; time delay mechanism for each car; mechanism for each car controlled by said time delay mechanism for that car for causing closing of said closure means for that car upon the expiration of a given time interval after each of said stops; starting mechanism for each car for starting that car as the closure means for that car reaches closed position; additional time delay mechanism for each car; and means for each car controlled by said additional time delay mechanism for that car for taking that car out of dispatching if the closing of said closure means for that car and the starting of that car after any of such stops is delayed for a certain interval of time, longer than said given time interval, said last named means acting upon the subsequent closure of said closure means and starting of that car to restore the car to dispatching.

67. A dispatching and control system for a plurality of elevator cars comprising; mechanism for dispatching the cars at regular intervals of time from a terminal floor; closure means for each car; operating mechanism for each closure means; mechanism for each car for starting that car upon closure of said closure means for that car; an audible signal for each car; and time delay means for each car for causing the giving of said audible signal for that car when the closing of said closure means is prevented for a certain interval of time after operation of said dispatching mechanism to dispatch the car.

68. A dispatching and control system for a plurality of elevator cars comprising; mechanism for selecting the cars for dispatching from a terminal floor; mechanism for dispatching the selected cars at regular intervals of time; closure means for each car; operating mechanism for each closure means; mechanism for each car for starting that car upon closure of said closure means for that car; a harsh buzzer for each car; and means for each car for causing when that car has been selected for dispatching from said terminal floor the intermittent sounding of said buzzer for that car when the closing of said closure means is prevented for a certain interval of time after operation of said dispatching mechanism.

69. A control system for an elevator car comprising; mechanism for stopping the car at each of a plurality of floors served by the car; closure means; operating mechanism for opening said closure means as each of such stops is made and for reclosing said closure means upon expiration of a time delay; mechanism for starting said car after each stop; a buzzer; and means controlled by said closure means for causing said buzzer to intermittently sound a loud buzz when closing of said closure means is prevented for more than a certain time interval after the stop is made.

70. A control system for an elevator car comprising; mechanism for stopping the car at each of a plurality of floors served by the car; time delay mechanism; a door on said car; operating mechanism for said door, said operating mechanism being controlled by said stopping mechanism to open said door as each of such stops is made and by said time delay mechanism to reclose said door upon expiration of a time delay after said door reaches open position; mechanism for starting said car after each stop; additional time delay mechanism; and a buzzer controlled by said additional time delay mechanism for intermittently sounding a harsh buzz when closing of said door is prevented after the expiration after the stop is made of a given time terminal longer than said time delay plus door closing time.

71. A control system for an elevator car comprising; a plurality of call registering means, one for each of a plurality of floors served; mechanism for stopping the car in response to said calls at the floors for which such calls are registered; time delay mechanism; a door on said car; operating mechanism for said door, said operating mechanism being controlled by said stopping mechanism to open said door as each of such stops is made and by said time delay mechanism to reclose said door upon expiration of a time delay after said door reaches open position; mechanism for starting said car as said door reaches closed position; mechanism for controlling operation of said operating mechanism to reopen said door while closing and for holding said door in open position; additional time delay mechanism; a buzzer controlled by said additional time delay mechanism and by said reopening mechanism for intermittently sounding a harsh buzz when closing of said door is prevented after the expiration after the stop is made of a given time interval longer than said time delay plus door closing time; and means for preventing sounding of said buzzer when said door is being closed.

72. A control system for an elevator car comprising; starting mechanism for said car; closure means; operating mechanism for said closure means; a plurality of call registering means, one for each of a plurality of floors served; call pickup mechanism for causing stopping of the car in response to said calls at the floors for which such calls are registered and the opening of said closure means by said operating mechanism as such stop is made; time delay means for causing upon expiration of a time delay reclosing of said closure means by said operating mechanism and the restarting of said car by its starting mechanism; and a buzzer controlled by said time delay means for sounding a soft buzz during closing of said closure means.

73. A control system for an elevator car comprising; starting mechanism for said car; closure means; operating mechanism for said closure means; a plurality of call registering means, one for each of a plurality of floors served; call pickup mechanism for causing stopping of the car in response to said calls at the floors for which such calls are registered and the opening of said closure means by said operating mechanism as such stop is made; time delay means for causing upon expiration of a time delay reclosing of said closure means by said operating mechanism and the restarting of said car by its starting mechanism; buzzer mechanism; and means controlled by said closure means for causing said buzzer mechanism to sound a soft buzz during closing of said closure means and a harsh buzz when closing of said closure means is prevented after the expiration of a given time interval after the stop is made.

74. A control system for an elevator car comprising; a plurality of call registering means, one for each of a plurality of floors served; mechanism for stopping the car in response to said calls at the floors for which such calls are registered; time delay mechanism; a door on said car; operating mechanism for said door, said operating mechanism being controlled by said stopping mechanism to open said door as such stops are made and by said time delay mechanism to reclose said door upon expiration of a time delay after said door reaches open position; mechanism for starting said car as said door reaches closed position; a buzzer controlled by said time delay mechanism for sounding a soft buzz during closing of said door; additional time delay mechanism; and a second buzzer controlled by said additional time delay mechanism for sounding a loud buzz when closing of said door is prevented after the expiration of a given time interval after the stop is made.

75. A dispatching and control system for a plurality of elevator cars comprising; mechanism for each for stopping that car at the floors served thereby; starting mechanism for each car; flashing signal mechanism for each car; and means for each car for causing operation of said flashing signal mechanism for that car when the car is unduly held up at any of such floors.

76. A dispatching and control system for a plurality of elevator cars comprising; mechanism for each car for stopping that car at the floors served thereby; starting mechanism for each car; a position indicator for each car having a light for each floor; means for each car actuated by car movement for causing lighting of said lights for that car in accordance with the position of that car; and means for each car controlled by said starting mechanism for that car for causing the flashing of the position indicator light for that car for the floor at which the car is stopped when the starting of the car from such floor is delayed for a certain interval of time.

77. A dispatching and control system for a plurality of elevator cars comprising; closure means for each car; operating mechanism for each closure means; mechanism for each car for stopping that car at the floors served thereby and for causing opening of the closure means for that car by its operating mechanism as the stop is made; mechanism for each car for causing after each stop of that car closing of said closure means for that car by its operating mechanism and the starting of the car; a position indicator for each car at the starter's station, each having a light for each floor; means for each car actuated by car movement for causing lighting of said lights for that car in the order in which the floors are reached by the car; and means for each car responsive to the stopping of that car at any floor for causing the lighting of the position indicator light for that car for the floor at which the car is stopped to become intermittent when the closing of said closure means for that car is delayed for a certain interval of time after the stop is made.

78. A dispatching and control system for each of a plurality of floors comprising; mechanism operable at regular intervals of time to provide dispatching intervals; mechanism for selecting the cars for dispatching from the bottom terminal floor; an up hall lantern for each car at said terminal floor; mechanism for each car controlled by said selecting mechanism and operable when that car is at said terminal floor for causing lighting of said hall lantern for that car upon the selection of that car for dispatching and controlled by said dispatching mechanism for extinguishing such hall lantern upon the expiration of said dispatching interval; and time delay means for delaying for a certain interval the extinguishing of said hall lantern for a car when said dispatching interval has expired at the time such lantern is lighted.

79. A dispatching and control system for a plurality of elevator cars in which the dispatching of the cars is initiated at regular intervals by timing mechanism, characterized in that said timing mechanism comprises a timing condenser, a source of direct current, a charging switch for controlling the connection of said condenser to said source, a timing switch timed in dropping out by the discharge of said condenser upon disconnection thereof from said source, said timing switch controlling the operation of said charging switch, and means for delaying the dropping out of said charging switch after operation thereof to connect said condenser to said source so as to insure the full charging of said condenser.

80. A dispatching and control system for a plurality of elevator cars in which the dispatching of the cars is initiated at regular intervals by timing mechanism, characterized in that said timing mechanism comprises a timing condenser, a charging source for said condenser, an electromagnetic charging switch operable upon connection of its operating coil to said source to connect said condenser to said source for charging said condenser and upon disconnection of said coil from said source to disconnect said condenser from said source, an electromagnetic timing switch operated by having its operating coil connected to said source along with said condenser by said charging switch and delayed in dropping out by the discharge of said condenser into its coil upon said disconnection of its coil and said condenser from said source to provide half of said dispatching interval, said timing switch upon dropping out connecting said charging switch coil to said source and upon reoperation disconnecting said charging switch coil from said source, and a delaying condenser connected across the coil of said charging switch for delaying the dropping out of said charging switch upon disconnection of its coil from said source to insure the full charging of said charging condenser.

81. A dispatching and control system for a plurality of elevator cars in which the dispatching of the cars is initiated at regular intervals by timing mechanism, characterized in that said timing mechanism comprises a timing condenser, a source of direct current, a charging switch for controlling the connection of said condenser to said source, and a timing switch timed in dropping out by the discharge of said condenser upon disconnection thereof from said source to provide half of said dispatching interval, said timing switch controlling the operation of said charging switch to repeat said condenser timing cycle so as to obtain the full dispatching interval.

82. A dispatching and control system for a plurality of elevator cars in which the dispatching of the cars is initiated at regular intervals by timing mechanism, characterized in that said timing mechanism comprises a timing condenser, a source of direct current, a timing switch having an operating coil, and a charging switch adapted upon operation to connect said condenser and coil to said source and upon dropping out to disconnect them from said source, said timing switch being timed in dropping out by the discharge of said condenser upon the dropping out of said charging switch to provide half of said dispatching interval, said charging switch having an operating coil and said timing switch upon dropping out causing the connection of said charging switch coil to said source to effect the operation thereof and thus the operation of said timing switch and charging of said condenser and upon operation the disconnection of said charging switch coil and condenser from said source to repeat said condenser discharge cycle and thus provide another half dispatching interval so as to enable alternate dispatching intervals to be obtained.

83. A dispatching and control system for a plurality of elevator cars comprising; dispatching control circuits for each car; circuit controlling means for each car for rendering said dispatching control circuits for that car effective; and means controlled by said circuit controlling means for determining whether the number of cars under dispatching is odd or even.

84. A dispatching and control system for a plurality of elevator cars comprising; dispatching control circuits for each car; a switch for each car operable to render said dispatching control circuits for that car effective; timing mechanism for initiating the up and down dispatching operations; and means controlled by said switches that are operated for determining whether said up and down dispatching operations are initiated alternately or simultaneously.

85. A dispatching and control system for a plurality of elevator cars comprising; an electromagnetic switch for each car controlled in accordance with whether that car is in or out of dispatching; contacts on each of said switches connected in series relationship in a given sequence of said switches in a circuit; contacts on each of the intermediate of said switches of said sequence connected in series relationship in said sequence in a second circuit; additional contacts on each of said switches interconnecting said circuits; and an electroresponsive device controlled by said circuits in accordance with whether the number of cars under dispatching is odd or even.

86. A dispatching and control system for a plurality of elevator cars comprising; an electromagnetic switch for each car controlled in accordance with whether that car is in or out of dispatching; circuit opening contacts on each of said switches connected in series relationship in a given sequence of said switches in a circuit; circuit opening contacts on each of the intermediate of said switches of said sequence connected in series relationship in said sequence in a second circuit; circuit closing contacts on each of said switches for connecting when that switch is operated the circuit opening contacts of that switch in each circuit in parallel with the circuit opening contacts on each of the adjacent switches in said sequence in the other circuit; and an electromagnetic switch controlled by said circuit opening contacts and circuit closing contacts in accordance with whether the number of cars under dispatching is odd or even.

87. A dispatching and control system for a plurality of elevator cars comprising; an electromagnetic switch for each car controlled in accordance with whether that car is in or out of dispatching; circuit opening contacts on each of said switches connected in series relationship in a given sequence of said switches in a circuit; circuit opening contacts on each of the intermediate of said switches of said sequence connected in series relationship in said sequence in a second circuit; circuit closing contacts on each of the first and last of said switches in said sequence for connecting when that switch is operated the corresponding end of the first circuit to that of the other; and circuit closing contacts on each intermediate switch in said sequence for switching over when that switch is operated from each circuit to the other around the circuit opening contacts of that switch; and an electromagnetic switch having its operating coil connected in series relationship in said first named circuit at one end thereof to be controlled by said circuit opening contacts and circuit closing contacts in accordance with whether the number of cars under dispatching is odd or even.

88. A dispatching and control system for a plurality of elevator cars comprising; an electromagnetic switch for each car controlled in accordance with whether that car is in or out of dispatching, each switch having circuit closing and circuit opening contacts; a circuit having certain of said circuit opening contacts of each of said switches connected in series relationship therein in a given sequence of said switches; a second circuit having other of said circuit opening contacts of each of said switches except the end ones in said sequence connected in series relationship therein in said given switch sequence, said circuit closing contacts of each of said switches connecting one side of said circuit opening contacts of that switch of the first named series circuit with said one side of said circuit opening contacts of the next switch of the sequence of the second named series circuit and connecting the other side of said circuit opening contacts of that switch of said first named series circuit with said other side of said circuit opening contacts of the previous switch of the sequence; and an electromagnetic switch having its operating coil connected in series relationship in said first named series circuit at one end thereof to be controlled by said circuit opening contacts and circuit closing contacts in accordance with whether the number of cars under dispatching is odd or even.

89. A dispatching and control system for a plurality of elevator cars comprising; an electromagnetic switch for each car controlled in accordance with whether that car is in or out of dispatching; circuit opening contacts on each of said switches connected in series relationship in a given sequence of said switches in a circuit; circuit opening contacts on each of the intermediate of said switches of said sequence connected in series relationship in said sequence in a second circuit; circuit closing contacts on each of said switches for each of said circuit opening contacts of that switch, those on the first switch of said sequence connecting one side of said circuit opening contacts of that switch in the first named circuit with said one side of said circuit opening contacts of the next switch of the sequence of the other of said circuits and those in the last switch of said sequence connecting the other side of the said circuit opening contacts of that switch in the first named circuit with said other side of said circuit opening contacts of the next to the last switch of the sequence in the second named circuit, the circuit closing contacts of each of the intermediate switches of the sequence connecting each side of the circuit opening contacts of that switch in the first named circuit with the opposite side of the circuit opening contacts of that switch in the second named circuit; and an electromagnetic switch having its operating coil connected in series relationship in said first named circuit at one end thereof to be controlled by said circuit opening contacts and circuit closing contacts in accordance with whether the number of cars under dispatching is odd or even.

90. A dispatching and control system for a plurality of elevator cars comprising; dispatching control circuits for each car; a manually operable switch for each car for controlling said dispatching control circuits for that car to place that car under dispatching or to remove it from dispatching; an electromagnetic switch for each car controlled by said manually operable switch for that car; an electroresponsive device; a control circuit for said electroresponsive device including a pair of breaking contacts on each of said electromagnetic switches connected in series relationship in a given sequence of said electromagnetic switches in a circuit, an additional pair of breaking contacts on each of said electromagnetic switches except the end ones in said sequence connected in series relationship in the same switch sequence in an additional circuit, and making contacts on each of said electromagnetic switches interconnecting said series circuits so as to break the circuit for said electroresponsive device when the number of cars under dispatching is odd and to complete such circuit when the number of cars under dispatching is even; timing mechanism for initiating the up and down dispatching operations; and means controlled by said electroresponsive device for determining whether the up and down dispatching operations are initiated alternately or simultaneously.

91. A dispatching and control system for a plurality of elevator cars comprising; control mechanism for each car for conditioning that car either for operation with an attendant or for operation without an attendant; dispatching mechanism for said cars; and mechanism for controlling the manner of dispatching of said cars by said dispatching mechanism so that certain of said cars may be on attendant operation and others of said cars may be on non-attendant operation at the same time.

92. A dispatching and control system for a plurality of elevator cars comprising; a dispatching signal for each of said cars; starting mechanism for each of said cars; dispatching mechanism for said cars; and mechanism for controlling the manner of dispatching said cars by said dispatching mechanism so as to cause certain of said cars to be dispatched by being given their dispatching signals in response to operation of said dispatching mechanism and others of said cars to be dispatched by being started by their starting mechanism in response to operation of said dispatching mechanism.

93. A dispatching and control system for a plurality of elevator cars comprising; a dispatching signal for each of said cars; starting mechanism for each of said cars; timing mechanism operable at regular intervals of time to provide dispatching intervals; selecting mechanism for selecting the cars for dispatching from a terminal floor; control mechanism for each car for conditioning that car either for dispatching by being given its dispatching signal or for dispatching by being started by its starting mechanism; and dispatching mechanism for dispatching said selected car from said terminal floor at the expiration of each dispatching interval in the manner determined by said control mechanism for that car.

94. A dispatching and control system for a plurality of elevator cars comprising; a dispatching signal for each of said cars; starting mechanism for each of said cars; timing mechanism operable at regular intervals of time to provide dispatching intervals; selecting mechanism for selecting the cars for dispatching from a terminal floor; a manually operable throw-over switch for each car; control mechanism for each car controlled by said throw-over switch for that car and operable when that switch is in one position to condition that car for dispatching by being given its dispatching signal and operable when that switch is in another position to condition that car for dispatching by being started by its starting mechanism; and dispatching mechanism for dispatching from said terminal floor at the expiration of each dispatching interval the car which has been selected by said selecting mechanism and in the manner determined by the position of said throw-over switch for that car, thereby enabling some of the cars to be dispatched on signals while others are dispatched by automatic starting.

WILLIAM FRANK GLASER.
STEPHEN ANTHONY HORNUNG.

REFERENCES CITED

The following references are of record in the file of this patent:

UNITED STATES PATENTS

| Number | Name | Date |
| --- | --- | --- |
| 2,042,201 | Williams et al. | May 16, 1936 |
| 2,057,480 | Eames | Oct. 12, 1936 |